US012553062B2

(12) United States Patent
Fritscher et al.

(10) Patent No.: US 12,553,062 B2
(45) Date of Patent: Feb. 17, 2026

(54) AAV COMPOSITIONS

(71) Applicant: TAKEDA PHARMACEUTICAL COMPANY LIMITED, Osaka (JP)

(72) Inventors: Eva Fritscher, Vienna (AT); Christian Fiedler, Vienna (AT); Tanvir Tabish, Vienna (AT); Dominik Mittergradnegger, Vienna (AT); Stefan Reuberger, Vienna (AT)

(73) Assignee: TAKEDA PHARMACEUTICAL COMPANY LIMITED, Osaka (JP)

(*) Notice: Subject to any disclaimer, the term of this patent is extended or adjusted under 35 U.S.C. 154(b) by 1104 days.

(21) Appl. No.: 17/258,516

(22) PCT Filed: Jul. 11, 2019

(86) PCT No.: PCT/US2019/041398
§ 371 (c)(1),
(2) Date: Jan. 7, 2021

(87) PCT Pub. No.: WO2020/014479
PCT Pub. Date: Jan. 16, 2020

(65) Prior Publication Data
US 2021/0163990 A1 Jun. 3, 2021

Related U.S. Application Data

(60) Provisional application No. 62/696,792, filed on Jul. 11, 2018.

(51) Int. Cl.
*C12N 15/86* (2006.01)
*A61K 47/18* (2017.01)
*A61K 47/26* (2006.01)

(52) U.S. Cl.
CPC ............ *C12N 15/86* (2013.01); *A61K 47/183* (2013.01); *A61K 47/26* (2013.01); *C12N 2750/14143* (2013.01)

(58) Field of Classification Search
None
See application file for complete search history.

(56) References Cited

U.S. PATENT DOCUMENTS

| 6,764,845 | B2  |   | 7/2004 | Sista |
| 9,051,542 | B2  |   | 6/2015 | Wright |
| 2002/0041884 | A1 | * | 4/2002 | Evans ............. A61P 31/12 424/233.1 |
| 2003/0153065 | A1 |   | 8/2003 | Kovesdi et al. |
| 2011/0076744 | A1 | * | 3/2011 | Wright ............. C12N 7/00 435/235.1 |
| 2011/0229455 | A1 | * | 9/2011 | Matthiessen ....... A61K 38/4886 424/94.67 |
| 2012/0141528 | A1 |   | 6/2012 | Coffey |
| 2015/0224155 | A1 | * | 8/2015 | Coffey ................ A61K 35/765 424/93.2 |
| 2016/0199496 | A1 |   | 7/2016 | Jezek et al. |
| 2017/0130208 | A1 |   | 5/2017 | Potter et al. |
| 2021/0123028 | A1 | * | 4/2021 | Knop ................... A61K 47/26 |

FOREIGN PATENT DOCUMENTS

| JP | 2003525909 |   | 9/2003 |   |
| JP | 2011517955 |   | 6/2011 |   |
| JP | 2012143233 |   | 8/2012 |   |
| JP | 2014501493 |   | 1/2014 |   |
| WO | 1989006542 |   | 7/1989 |   |
| WO | 199510601 |   | 4/1995 |   |
| WO | 199945966 |   | 9/1999 |   |
| WO | 200166137 |   | 9/2001 |   |
| WO | 2001066137 |   | 9/2001 |   |
| WO | 2005118792 |   | 12/2005 |   |
| WO | 2013036961 |   | 3/2013 |   |
| WO | 2013130393 |   | 9/2013 |   |
| WO | 2015040234 |   | 3/2015 |   |
| WO | WO-2015040234 A1 | * | 3/2015 | ............. A61K 47/02 |
| WO | 2015121501 |   | 8/2015 |   |
| WO | 2016154055 |   | 9/2016 |   |
| WO | WO-2017096039 A1 | * | 6/2017 | ............. C12N 15/85 |
| WO | 20180128689 A1 |   | 7/2018 |   |
| WO | WO-2018128689 A1 | * | 7/2018 | ........... A61K 31/195 |

OTHER PUBLICATIONS

Sigma catalogue (www.sigmaaldrich.com/US/en/support/ calculators-and-apps/1x-phosphate-buffered-saline, pp. 1-2 (Year: 2017).*
Evans et al (Journal of Pharmaceutical Science, 93(10), 2458-2475 (Year: 2004).*
First Office Action issued Jun. 20, 2023 in connection with Japanese Application No. 2020-572381.
First Office Action issued Jul. 3, 2023 in connection with Japanese Application No. 2022-113804.
International Search Report mailed Sep. 27, 2019 in connection with PCT/US19/041398.
Written Opinion mailed Sep. 27, 2019 in connection with PCT/US19/041398.
Office Action issued Jun. 13, 2023 in connection with. Russian Patent Application No. 2020142674.
Supplementary Search Report mailed May 9, 2022 in connection with EP 19833959.0.
Decision of Rejection issued Apr. 14, 2022 in connection with JP Application No. 2019-522442.
Wright J.F. et al., "Identification of factors that contribute to recombinant AAV2 particle aggregation and tmethods to prevent its occurrence during vectoor purificcation and formulation", Molecular Therapy: The Journal of the American Society of Gene Therapy, Academic Press; Nature Publishing Group, US, vol. 12, No. 1, Jul. 1, 2005, pp. 171-178.

(Continued)

*Primary Examiner* — Anoop K Singh
(74) *Attorney, Agent, or Firm* — Troutman Pepper Locke LLP

(57) ABSTRACT

The AAV compositions comprising an AAV and a buffer. These AAV compositions are appropriate for us in intracerebroventricular (ICV) and intraparenchymal (IPA) administration, as well as other routes of administration and can be provided in frozen, liquid or potentially freeze dried (lyophilized) state.

10 Claims, 31 Drawing Sheets

(56) References Cited

OTHER PUBLICATIONS

International Preliminary Report on Patentability mailed May 7, 2019 in connection with International Application No. PCT/US17/59971.
International Search Report and Written Opinion mailed Jun. 28, 2018 in connection with PCT/US17/059971.
Monahan, Gene therapy in an era of emerging treatment options for hemophilia B, J. Thromb. Haemost, Jun. 2015: 13 ; S151-S160.
Rayaprolu et al., Comparative analysis of adeno-associated virus capsid stability and dynamics, J. Virol. Dec. 2013; 87 (24):13150-160 Epub Sep. 25, 2013.
International Preliminary Report on Patentability issued Jan. 12, 2021 in connection with PCT/US19/041398.
Office Action issued Jan. 7, 2021 in connection with U.S. Appl. No. 16/347,107.
Final Office Action issued Jul. 7, 2021 in connection with U.S. Appl. No. 16/347,107.
Office Action and Search Report mailed Jan. 20, 2023 in connection with Russian Patent Application No. 2020142674.
Wang L. et al. Sustained correction of bleeding disorder in hemophilia B mice by gene therapy. Proc. Natl. Acad. Sci. USA, Mar. 30, 1999; 96(7): 3906-3910. doi: 10.1073/pnas.96.7.3906.
Office Action issued Nov. 22, 2021 in connection with U.S. Appl. No. 16/347,107.

* cited by examiner

Form 2 ≤ -60 °C
0 months

Form 2 +5±3 °C
4 months

Form 2 ≤ -60 °C
6 months

> 10% broken AAV
Particles, small AAV
cluster

> 10% broken AAV
Particles

> 10% broken AAV
Particles

Form 3 ≤ -60 °C
0 months

Form 3 +5±3 °C
4 months

Form 3 ≤ -60 °C
6 months

> 10% broken AAV
Particles, background
debris

> 10% broken AAV
Particles, background
debris

> 10% broken AAV
Particles, background
debris

Reference ≤ -60 °C
0 months

Reference +5±3 °C
4 months

Reference ≤ -60 °C
6 months

> 10% broken AAV Particles, background debris

> 10% broken AAV Particles, small AAV cluster, background debris

> 10% broken AAV Particles, 50% background debris

AAV COMPOSITIONS

This application is a 371 National Stage of PCT/US19/41398, filed Jul. 11, 2019, which claims priority pursuant to 35 U.S.C. § 119(e) to U.S. Provisional Patent Application No. 62/696,792, filed Jul. 11, 2018, which are hereby incorporated by reference in their entirety.

BACKGROUND

Adeno-associated virus (AAV) is a small, non-enveloped virus that packages a linear single-stranded DNA genome. AAV belongs to the family Parvoviridae and the genus Dependovirus, since productive infection by AAV occurs only in the presence of a helper virus, such as, for example, adenovirus or herpes virus. Even in the absence of a helper virus, AAV (serotype 2) can achieve latency by integrating into chromosome 19q13.4 of a host human genome. It is the only mammalian DNA virus known to be capable of site-specific integration (Daya and Berns, Clinical Microbiology Reviews, pages 583-593 (2008)).

For AAV to be safely used in the clinic, AAV has been genetically modified at several locations within its genome. For example, the Rep gene, which is required for viral replication, and the element required for site-specific integration have been eliminated from the AAV genome in many viral vectors. This recombinant AAV (rAAV), exists in an extrachromosomal state and have very low integration efficiency into the genomic DNA. The possibility of rAAV inducing random mutagenesis in a host cell is thus reduced, if not eliminated altogether. Because of these properties and the lack of pathogenicity, rAAV has shown great promise as a gene therapy vector in multiple aspects of pre-clinical and clinical applications. New serotypes and self-complementary vectors are being tested in the clinic. Alongside these ongoing vector developments, continued effort has focused on scalable manufacturing processes that can efficiently generate high titer quantities of rAAV vectors with high purity and potency.

AAV research also has focused on AAV compositions intended for human administration. It is understood that such AAV compositions should be not only safe, sterile, and of good manufacturing practice (GMP) grade, these compositions should also exhibit and promote the long-term stability of the AAV, minimizing loss of AAV potency during the manufacture, packaging, and storage processes. The compositions should furthermore prevent adsorption to the surfaces of the containers in which the AAV are packaged and stored and of the machinery used during manufacture. Though the efforts to design such AAV compositions have been great, there still remains a need for improved AAV compositions, especially for intracerebroventricular (ICV) and intraparenchymal (IPA) administration. Described compositions are also a possibility for the Intrathecal (IT) as well as Intravenous (IV), Sub-cutaneous (SC), Intramuscular (IM) and Intravitreal (IVT) administration.

SUMMARY

The present disclosure provides compositions (e.g., storage and/or pharmaceutical compositions) compatible for human administration (e.g., intracerebroventricular (ICV) and intraparenchymal (IPA), Intrathecal (IT) as well as Intravenous (IV), Sub-cutaneous (SC), Intramuscular (IM) and Intravitreal (IVT) administration) which address the unmet needs described above. Advantageously, in some embodiments, the compositions are suitable for long-term storage of AAV, minimizing loss of AAV potency, and advantageously prevent visible particle formation and prevent adsorption to the surfaces of the containers in which the AAV are packaged and stored and of the machinery used during manufacture.

Methods of treating a subject for a disorder treatable by gene therapy are provided by the present disclosure. In exemplary aspects, the method comprises administering to the subject a pharmaceutical composition as described herein in an amount effective to treat the disease or disorder.

In certain aspects, the present invention provides an aqueous composition comprising a viral vector and a buffer formulation comprising: about 0.5 mM to about 30 mM stabilizing agent; about 0 mM to about 250 mM pharmaceutically acceptable salt; about 0.0001% (w/w) to about 0.01% (w/w) non-ionic surfactant; and about 0.1 mM to about 20 mM sugar, sugar alcohol, or combination thereof.

In other aspects, the present invention provides an aqueous composition comprising a viral vector and a buffer formulation comprising: about 1 mM to about 100 mM stabilizing agent; about 0 mM to about 250 mM pharmaceutically acceptable salt; and about 0.0001% (w/w) to about 0.01% (w/w) non-ionic surfactant.

In other aspects, the present invention provides an aqueous composition comprising a viral vector and a buffer formulation comprising: about 0.5 mM to about 30 mM stabilizing agent; about 0 mM to about 250 mM pharmaceutically acceptable salt; and optionally about 0.0001% (w/w) to about 0.01% (w/w) non-ionic surfactant.

In additional aspects, the present invention provides an aqueous composition comprising a viral vector and a buffer formulation comprising: about 1 mM to about 40 mM stabilizing agent; about 0 mM to about 250 mM pharmaceutically acceptable salt; and optionally about 0.0001% (w/w) to about 0.01% (w/w) non-ionic surfactant.

In certain embodiments, the buffer formulations of the present invention comprise L-histidine. In certain embodiments, the buffer formulations comprise 1 mM to about 20 mM, about 1 mM to about 15 mM, about 5 mM to about 15 mM, about 30 mM to about 75 mM, about 25 mM to about 75 mM or about 40 mM to about 60 mM L-histidine.

In certain embodiments, the buffer formulations of the present invention comprise sodium citrate. In certain embodiments, the buffer formulations comprise about 1 mM to about 20 mM, about 1 mM to about 15 mM, or about 5 mM to about 15 mM sodium citrate.

In certain embodiments, the buffer formulations of the present invention comprise is sodium bicarbonate. In certain embodiments, the buffer formulations comprise about 5 mM to about 35 mM, about 10 mM to about 30 mM or about 15 mM to about 25 mM sodium bicarbonate.

In certain embodiments, the pharmaceutically acceptable salt is a sodium salt, ammonium salt, or potassium salt. In certain embodiments, the salt is sodium chloride.

In certain embodiments, the buffer formulations of the present invention comprise about 0 to about 100 mM, about 30 mM to about 100 mM, about 50 mM to about 150 mM, about 110 mM to about 130 mM, about 100 mM to about 250 mM, about 150 mM to about 200 mM, about 125 mM to about 175 mM, about 140 mM to about 160 mM, or about 150 mM to about 160 mM of a pharmaceutically acceptable salt. In certain embodiments, the pharmaceutically acceptable salt is sodium chloride.

In certain embodiments, the buffer formulations of the present invention comprise about 0.0005% to about 0.006% (w/w), about 0.001% to about 0.005% (w/w), or about 0.002% to about 0.004% (w/w) of the non-ionic surfactant.

In certain embodiments, the non-ionic surfactant is Polysorbate 80, Pluronic F-68, or a combination thereof. In certain embodiments, the non-ionic surfactant is Polysorbate 80. In certain embodiments, the Polysorbate 80 is Super Refined™ PS80.

In certain embodiments, the buffer formulations of the present invention comprise about 0.5 mM to about 15 mM, about 1 mM to about 10 mM, or about 4 mM to about 6 mM of a sugar, sugar alcohol, or a combination thereof. In certain embodiments, the sugar is sucrose, glucose, or a combination thereof.

In certain embodiments, the compositions of the present invention comprise water.

In certain aspects, the present invention provides an aqueous composition comprising a viral vector and a buffer formulation comprising: about 10 mM L-histidine, about 154 mM sodium chloride, about 0.003% (w/w) polysorbate 80 (PS80), about 5 mM sucrose; and water.

In certain aspects, the present invention provides an aqueous composition comprising a viral vector and a buffer formulation comprising: about 50 mM L-histidine, about 154 mM sodium chloride, and about 0.003% (w/w) polysorbate 80 (PS80), and water.

In certain aspects, the present invention provides an aqueous composition comprising a viral vector and a buffer formulation comprising: about 10 mM sodium citrate, about 150 mM sodium chloride, about 0.003% (w/w) polysorbate 80 (PS80); and water.

In certain aspects, the present invention provides an aqueous composition comprising a viral vector and a buffer formulation comprising: about 20 mM sodium bicarbonate, about 120 mM sodium chloride, about 0.003% (w/w) polysorbate 80 (PS80); and water.

In certain embodiments, the compositions of the present invention have a pH of about 6.9 to about 7.7, optionally, about 7.0 or about 7.4.

In certain embodiments, the compositions of the present invention do not comprise glycine, glucose, or both glycine and glucose.

Generally, the AAV compositions provided herein are suitable for pharmaceutical administration. In certain embodiments, the AAV can be AAV1, AAV2, AAV3, AAV4, AAV5, AAV6, AAV7, AAV8, AAV9, or AAV10. In certain embodiments, the AAV can be AAV2, AAV5, AAV6, AAV8, or AAV9. In certain embodiments, the AAV can be AAV6. In certain embodiments, the AAV can be AAV8. In certain embodiments, the AAV can be AAV9. In certain embodiments, the AAV vector is genetically and/or chemically modified.

In certain embodiments, the composition is liquid. In certain embodiments, the composition is lyophilized. In certain embodiments, the composition is present in a unit dosage container. In certain embodiments, the unit dosage container is a vial. In certain embodiments, the vial is a sealed glass vial.

In certain aspects, the present invention provides a lyophilized storage stable composition, wherein the lyophilized storage stable composition is substantially dehydrated and is capable of forming any of the aqueous compositions described herein by reconstituting the lyophilized storage stable composition with diluent. In certain embodiments, reconstituting comprises combining the lyophilized storage stable composition with water for injection (WFI).

In certain aspects, the present invention provides a method of treating a neurological disorder in a subject, comprising administering to the subject any of the compositions described here in an amount effective to treat a disorder or disease. In certain embodiments, the disorder or disease is a neurodegenerative disorder. In certain embodiments, the neurodegenerative disorder is multiple sclerosis ("MS"), AIDS-related neurodegeneration and Alzheimer's disease, infectious meningitis, encephalomyelitis, Parkinson's disease, Huntington's disease, Hunter disease, amyotrophic lateral sclerosis, or encephalitis.

In certain aspects, the present invention provides a method of treating a bleeding disorder in a subject, comprising administering to the subject any of the compositions described herein in an amount effective to treat a disorder or disease. In certain embodiments, the disorder or disease is a bleeding disorder. In certain embodiments, the bleeding disorder is hemophilia A, hemophilia B, hemophilia C, Von Willebrand disease (VWD), Factor I deficiency, Factor II deficiency, Factor V deficiency, Factor VII deficiency, Factor VIII deficiency, Factor IX deficiency, Factor X deficiency, Factor XI deficiency, Factor XII deficiency, or Factor XIII deficiency.

In certain aspects, the present invention provides a method of preparing an aqueous composition comprising adeno-associated virus (AAV), comprising: a) combining L-histidine, polysorbate 80 (PS80), sucrose, water, and optionally sodium chloride to a concentration of about 0.5 mM to about 30 mM L-histidine, about 0 mM to about 250 mM sodium chloride, about 0.0001% (w/w) to about 0.01% (w/w) polysorbate 80 (PS80), and about 0.1 mM to about 20 mM sucrose, and b) adding AAV particles, thereby obtaining a composition comprising AAV.

In certain aspects, the present invention provides a method of preparing an aqueous composition comprising adeno-associated virus (AAV), comprising: a) combining L-histidine, polysorbate 80 (PS80), water, and optionally sodium chloride to a concentration of about 1 mM to about 100 mM L-histidine, about 0 mM to about 250 mM sodium chloride, and about 0.0001% (w/w) to about 0.01% (w/w) polysorbate 80 (PS80), and b) adding AAV, thereby obtaining a composition comprising AAV.

In certain aspects, the present invention provides a method of preparing an aqueous composition comprising adeno-associated virus (AAV), comprising: a) combining sodium citrate, polysorbate 80 (PS80), water and optionally sodium chloride to a concentration of about 0.5 mM to about 30 mM sodium citrate, about 0 mM to about 250 mM sodium chloride, about 0.0001% (w/w) to about 0.01% (w/w) polysorbate 80 (PS80), and b) adding AAV, thereby obtaining a composition comprising AAV.

In certain aspects, the present invention provides a method of preparing an aqueous composition comprising adeno-associated virus (AAV), comprising: a) combining sodium bicarbonate, polysorbate 80 (PS80), water and optionally sodium chloride to a concentration of about 1 mM to about 40 mM sodium bicarbonate, about 0 mM to about 250 mM sodium chloride, about 0.0001% (w/w) to about 0.01% (w/w) polysorbate 80 (PS80), and b) adding AAV, thereby obtaining a composition comprising AAV.

In certain aspects, the present invention provides a method of stably storing a composition comprising a viral vector, comprising combining the stabilizing agent, the non-ionic surfactant, and optionally the pharmaceutically acceptable salt and/or the sugar, sugar alcohol, or combinations thereof of the pharmaceutical composition of any of the composition described herein.

In certain aspects, the present invention provides a method of making a lyophilized AAV composition of any one of the compositions described herein in a manner sufficient to produce a lyophilized storage stable AAV composition.

In certain embodiments, the method comprises introducing an aqueous concentrate composition into a unit dosage container and lyophilizing the aqueous concentrate composition in the unit dosage container. In certain embodiments, the unit dosage container is a vial. In certain embodiments, the method further comprises sealing the lyophilized composition in the unit dosage container.

In certain embodiments, the viral vector has a titer that is stable when stored at a temperature range of about −80° C. to about 40° C. for at least 6 months. In certain embodiments, the viral vector has a titer that is stable when stored at a temperature range of about −80° C. to about 25° C. for at least 6 months. In certain embodiments, the viral vector has a titer that is stable when stored at a temperature range of about −20° C. to about 18° C. for at least 6 months. In certain embodiments, the viral vector has a titer that is stable when stored at a temperature range of about −20° C. to about 4° C. for at least at least 6 months. In certain embodiments, the viral vector has a titer that is stable when stored at a temperature range of about 4° C. to about 40° C. for at least at least 6 months. In certain embodiments, the viral vector has a titer that is stable when stored at a temperature range of about 4° C. to about 25° C. for at least at least 6 months. In certain embodiments, the viral vector has a titer that is stable when stored at a temperature range of about 4° C. to about 18° C. for at least 6 months.

DETAILED DESCRIPTION

Figure 1:
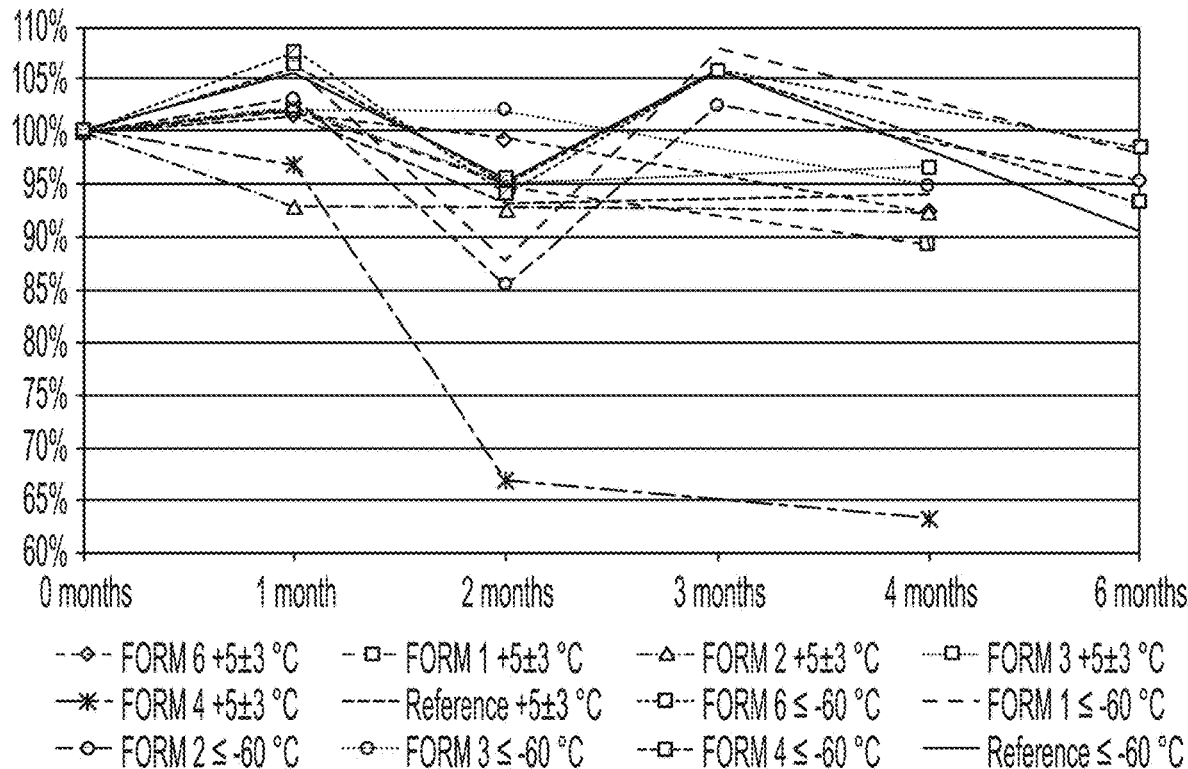
FIG. 1 is a graph of the percent recovery of the Total AAV8 particles titer as measured by ELISA after storage at +5±3° C. for up to 4 months and at ≤−60° C. for up to 6 months.

The present disclosure provides compositions, e.g., pharmaceutical compositions, compatible for human or veterinarian administration which also are suitable for long-term storage of AAV and minimizing loss of AAV potency. The compositions provided herein are advantageous, because the compositions prevent visible particle formation and also prevent adsorption to the surfaces of the containers in which the AAV are packaged and stored and prevent adsorption to the machinery used during manufacture. In certain embodiments, the compositions provided herein retain significant AAV activity when stored for extended periods of time. In certain embodiments, the compositions provided herein reduce or retard degradation and/or aggregation.

Definitions

As used herein, the term "viral vector" may refer either to a virus or viral particle capable of transferring a nucleic acid into a cell or to the transferred nucleic acid itself. Viral vectors and transfer plasm ids contain structural and/or functional genetic elements that are primarily derived from a virus.

As used herein, the term "AAV" refers to adeno-associated viral vector in both naturally occurring and recombinant forms (rAAV) and encompasses mutant forms of AAV. The term AAV further includes, but is not limited to, AAV type 1, AAV type 2, AAV type 3, AAV type 4, AAV type 5, AAV type 6, AAV type 7, AAV type 8, AAV type 9, AAV type 10, avian AAV, bovine AAV, canine AAV, equine AAV, ovine AAV, primate AAV, and non-primate AAV. In certain embodiments, the AAV can be AAV6. In certain embodiments, the AAV can be AAV8. In certain embodiments, the AAV can be AAV9. In certain embodiments, the AAV can be genetically modified. In certain embodiments, the AAV are chemically modified.

The phrase "pharmaceutically acceptable," as used in connection with compositions described herein, refers to molecular entities and other ingredients of such compositions that are physiologically tolerable and do not typically produce untoward reactions when administered to a subject. Preferably, the term "pharmaceutically acceptable" means approved by a regulatory agency of the Federal or a state government or listed in the U.S. Pharmacopeia or other generally recognized pharmacopeia for use in mammals, and more particularly in humans. A "pharmaceutically acceptable salt" is a salt that can be formulated into a compound or conjugate for pharmaceutical use including, e.g., metal salts (sodium, potassium, magnesium, calcium, etc.) and salts of ammonia or organic amines that is safe for administration to a subject (e.g., a human) in a drug composition (see, for example, Berge, et al. "Pharmaceutical Salts," J. Pharm. Sci. 1977; 66:1, which is incorporated herein by reference in its entirety and for all purposes.). Suitable "pharmaceutically acceptable salts" include, but are not limited to, metal salts such as sodium, potassium and cesium salts; alkaline earth metal salts such as calcium and magnesium salts; organic amine salts such as triethylamine, guanidine and N-substituted guanidine salts, acetamidine and N-substituted acetamidine, pyridine, picoline, ethanolamine, triethanolamine, dicyclohexylamine, and N,N'-dibenzylethylenediamine salts. "Pharmaceutically acceptable salts" (of basic nitrogen centers) include, but are not limited to inorganic acid salts such as the hydrochloride, hydrobromide, sulfate, phosphate; organic acid salts such as trifluoroacetate and maleate salts; sulfonates such as methanesulfonate, ethanesulfonate, benzenesulfonate, p-toluenesulfonate, camphor sulfonate and naphthalenesulfonate; amino acid salts such as arginate, alaninate, asparginate and glutamate; and carbohydrate salts such as gluconate and galacturonate. The selection and use of pharmaceutically acceptable salts is well known in the art, for example, see Stahl and Wermuth, Pharmaceutical Salts: Properties, Selection, and Use, 2nd Revised edition, Wiley, Hoboken, N.J., which is incorporated herein by reference in its entirety and for all purposes. Non-limiting examples of pharmaceutically acceptable salts include, without limitation, sodium salts, ammonium salts, potassium salts (e.g., sodium, ammonium, and potassium chloride; sodium, ammonium, and potassium acetate; sodium, ammonium, and potassium citrate; sodium, ammonium, and potassium phosphate; sodium, ammonium, and potassium fluoride; sodium, ammonium, and potassium bromide; and sodium, ammonium, and potassium iodide).

As used herein, the terms "treat" or "treatment" of a state, disorder or condition include: (1) preventing, delaying, or reducing the incidence and/or likelihood of the appearance of at least one clinical or sub-clinical symptom of the state, disorder or condition developing in a subject that may be afflicted with or predisposed to the state, disorder or condition, but does not yet experience or display clinical or subclinical symptoms of the state, disorder or condition; or (2) inhibiting the state, disorder or condition, i.e., arresting, reducing or slowing the development/progression of the disease or a relapse thereof or at least one clinical or sub-clinical symptom thereof; or (3) relieving the disease, i.e., causing regression of the state, disorder or condition or at least one of its clinical or sub-clinical symptoms. As used these terms, do not necessarily imply 100% or complete treatment. Rather, there are varying degrees of treatment of which one of ordinary skill in the art recognizes as having a potential benefit or therapeutic effect. The benefit to a subject to be treated is either statistically significant or at least perceptible to the patient or to the physician. In this respect, the methods of treating a disorder, e.g., a bleeding or neurological disease or disorder, of the present disclosure can provide any amount or any level of treatment. Furthermore, the treatment provided by the method of the present disclosure may include treatment of one or more conditions or symptoms or signs of the disorder, being treated.

As used herein, a "therapeutically effective amount or dose" or "sufficient amount or dose" refers to a dose that produces effects for which it is administered. The exact dose will depend on the purpose of the treatment, and will be ascertainable by one skilled in the art using known techniques (see, e.g., Lieberman, Pharmaceutical Dosage Forms (vols. 1-3, 1992); Lloyd, The Art, Science and Technology of Pharmaceutical Compounding (1999); Pickar, Dosage Calculations (1999); and Remington: The Science and Practice of Pharmacy, 20th Edition, 2003, Gennaro, Ed., Lippincott, Williams & Wilkins).

The terms "patient" and "subject" are used interchangeably and are used in their conventional sense to refer to a living organism suffering from or prone to a condition that can be prevented or treated by administration of a composition of the present disclosure, and includes both humans and non-human animals. Examples of subjects include, but are not limited to, humans, chimpanzees and other apes and monkey species; farm animals such as cattle, sheep, pigs, goats and horses; domestic mammals such as dogs and cats; laboratory animals including rodents such as mice, rats and guinea pigs; birds, including domestic, wild and game birds such as chickens, turkeys and other gallinaceous birds, ducks, geese, and the like. The term does not denote a particular age. Thus, adult, juvenile and newborn individuals are of interest.

As used herein, "storage" means that a composition is not immediately administered to a subject once prepared, but is kept for a period of time under particular conditions (e.g. particular temperature, etc.) prior to use. For example, a liquid or lyophilized composition can be kept for days, weeks, months, one month, two months, three months, four months, five months, six months, seven months, eight months, nine months, 10 months, 11 months, one year, two year, three years, four years, five years, six years, seven years, or eight years, prior to administration to a subject under varied temperatures such as refrigerated (0° C. to +10° C.) or (0° C. to +18° C.), frozen (0° C. to −190° C.), or room temperature (e.g., temperature up to +20° C. to +32° C.). In certain embodiments, the composition is stable at about +4° C. to about +18° C. for at least 6 months.

As used herein, the term "about" denotes an approximate range of plus or minus 10% from a specified value. For instance, the language "about 20%" encompasses a range of 18-22%. As used herein, about also includes the exact amount. Hence "about 20%" means "about 20%" and also "20%.

As used herein, the term "and/or" refers to and encompasses any and all possible combinations of one or more of the associated listed items, as well as the lack of combinations when interpreted in the alternative ("or").

As used herein, the term "or" refers to any one member of a particular list and also includes any combination of members of that list.

As used herein, the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range and each endpoint, unless otherwise indicated herein, and each separate value and endpoint is incorporated into the specification as if it were individually recited herein.

Viral Compositions

In one aspect, the present invention provides stabilized aqueous compositions for viral vector (e.g., AAV) storage and/or administration. In certain embodiments, the compositions are stable for at least about six months. In certain embodiments, the compositions are stable when stored at temperatures up to at least about 40° C. for at least about six months. In other embodiments, the compositions provided herein retain significant viral (e.g., AAV) vector biopotency (e.g., gene delivery, infectivity, expression of the protein of interest etc. . . . ) when stored for extended periods of time. In yet other embodiments, the compositions of the invention reduce or retard degradation and/or aggregation of viral (e.g., AAV) particles. In other embodiments, the compositions provided herein retain viral (e.g., AAV) capsid integrity.

In one embodiment, the present invention provides compositions of viral capsids (e.g., AAV) comprising a therapeutically effective amount or dose of the viral (e.g., AAV) particles, a sub-physiological to physiological concentration of a pharmaceutically acceptable salt, a stabilizing concentration of one or more sugars, sugar alcohols and/or amino acids, a non-ionic surfactant and optionally a buffering agent. Generally, the stabilized viral (e.g., AAV) compositions provided herein are suitable for pharmaceutical administration. In certain embodiments, the virus is AAV. In certain embodiments, the AAV is AAV2, AAV5, AAV6, AAV8, or AAV9.

In certain embodiments, the viral (e.g., AAV) compositions are liquid compositions. In other embodiments, the viral (e.g., AAV) compositions are lyophilized compositions that are lyophilized from a liquid composition as provided herein.

In certain instances, the composition can be a sterile composition. By "sterile" it is meant that there are substantially no microbes or other living microorganisms (e.g., fungi, bacteria, additional viruses, spore forms, etc.).

In exemplary aspects, the buffer formulation of the present disclosure comprises about 0.5 mM to about 75 mM, about 0.5 mM to about 50 mM, about 0.5 mM to about 30 mM, about 0.5 mM to about 20 mM, about 0.5 mM to about 15 mM, about 0.5 mM to about 10 mM, about 1 mM to about 100 mM, about 1 mM to about 75 mM, about 1 mM to about 50 mM, about 1 to about 40 mM, about 1 mM to about 30 mM, about 1 mM to about 20 mM, about 1 mM to about 15 mM, about 1 mM to about 10 mM, about 5 mM to about 75 mM, about 5 mM to about 50 mM, about 5 mM to about 30 mM, about 5 mM to about 35 mM, about 5 mM to about 20 mM, about 5 mM to about 15 mM, about 5 mM to about 10 mM, about 10 mM to about 75 mM, about 10 mM to about 50 mM, about 10 mM to about 30 mM, about 10 mM to about 20 mM, about 10 mM to about 15 mM, about 15 mM to about 25 mM, about 20 mM to about 75 mM, about 20 mM to about 50 mM, about 20 mM to about 30 mM about 25 mM to about 75 mM, about 30 mM to about 75 mM, about 30 mM to about 50 mM, about 40 mM to about 75 mM, about 40 mM to about 60 mM, about 40 mM to about 50 mM, or about 50 mM to about 75 mM of a stabilizing agent. In exemplary aspects, the buffer formulation comprises about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM, about 20 mM, about 21 mM, about 22 mM, about 23 mM, about 24 mM, about 25 mM, about 26 mM, about 27 mM, about 28 mM, about 29 mM, about 30 mM, about 35 mM, about 40 mM, about 45 mM, about 50 mM, about 55 mM, about 60 mM, about 65 mM, about 70 mM, or about 75 mM of a stabilizing agent. In certain embodiments, the stabilizing agent can be about 10 mM. In certain embodiments, the stabilizing agent can be about 20 mM. In certain embodiments, the stabilizing agent can be about 50 mM.

Pharmaceutically acceptable stabilizing agents are well known in the art, and include without limitation, phosphate buffers, histidine, sodium citrate, HEPES, Tris, Bicine, glycine, N-glycylglycine, sodium acetate, sodium carbonate, sodium bicarbonate (NaHCO$_3$), glycyl glycine, lysine, arginine, sodium phosphate, and mixtures thereof. In certain embodiments, the stabilizing agent can be histidine (e.g., L-histidine). In certain embodiments, the stabilizing agent can be sodium citrate. In certain embodiments, the stabilizing agent can be sodium bicarbonate. In certain embodiments, the stabilizing agent is not sodium bicarbonate. In certain embodiments, the stabilizing agent is not glycine.

In exemplary aspects, the buffer formulation of the present disclosure comprises about 0.5 mM to about 75 mM, about 0.5 mM to about 50 mM, about 0.5 mM to about 30 mM, about 0.5 mM to about 20 mM, about 0.5 mM to about 15 mM, about 0.5 mM to about 10 mM, about 1 mM to about 100 mM, about 1 mM to about 75 mM, about 1 mM to about 50 mM, about 1 to about 40 mM, about 1 mM to about 30 mM, about 1 mM to about 20 mM, about 1 mM to about 15 mM, about 1 mM to about 10 mM, about 5 mM to about 75 mM, about 5 mM to about 50 mM, about 5 mM to about 35 mM, about 5 mM to about 30 mM, about 5 mM to about 20 mM, about 5 mM to about 15 mM, about 5 mM to about 10 mM, about 10 mM to about 75 mM, about 10 mM to about 50 mM, about 10 mM to about 30 mM, about 10 mM to about 20 mM, about 10 mM to about 15 mM, about 15 mM to about 25 mM, about 20 mM to about 75 mM, about 20 mM to about 50 mM, about 20 mM to about 30 mM, about 25 mM to about 75 mM, about 30 mM to about 75 mM, about 30 mM to about 50 mM, about 40 mM to about 75 mM, about 40 mM to about 60 mM, about 40 mM to about 50 mM, or about 50 mM to about 75 mM of L-histidine. In exemplary aspects, the buffer formulation of the present disclosure comprises about 0.5 mM to about 30 mM, about 1 mM to about 100 mM, about 1 mM to about 75 mM, about 1 mM to about 20 mM, about 1 mM to about 15 mM, about 5 mM to about 50 mM, about 5 mM to about 35 mM, about 5 mM to about 25 mM, about 5 mM to about 15 mM, about 10 mM to about 30 mM, about 10 mM to about 20 mM, about 15 mM to about 25 mM, about 25 mM to about 75 mM, or about 40 mM to about 60 mM L-histidine. In exemplary aspects, the buffer formulation of the present disclosure comprises about 1 mM to about 75 mM, about 5 mM to about 75 mM, about 10 mM to about 75 mM, about 5 mM to about 60 mM, about 10 mM to about 60 mM, about 20 mM to about 60 mM, about 30 mM to about 60 mM, or about 40 mM to about 60 mM L-histidine. In exemplary aspects, the buffer formulation comprises about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM, about 20 mM, about 21 mM, about 22 mM, about 23 mM, about 24 mM, about 25 mM, about 26 mM, about 27 mM, about 28 mM, about 29 mM, about 30 mM, about 35 mM, about 40 mM, about 45 mM, about 50 mM, about 55 mM, about 60 mM, about 65 mM, about 70 mM, or about 75 mM of L-histidine. In certain embodiments, the buffer formulation comprises about 10 mM L-histidine. In certain embodiments, the buffer formulation comprises about 50 mM L-histidine.

In certain embodiments, the L-histidine buffer formulations do not precipitate at temperature ranges below +8° C.

In exemplary aspects, the buffer formulation of the present disclosure comprises about 0.5 mM to about 30 mM, about 0.5 mM to about 15 mM, about 1 mM to about 100 mM, about 1 mM to about 40 mM, about 1 mM to about 30 mM, about 1 mM to about 20 mM, about 1 mM to about 15 mM, about 1 mM to about 10 mM, about 5 mM to about 35 mM, about 5 mM to about 15 mM, about 5 mM to about 10 mM, about 5 mM to about 15 mM, about 10 mM to about 30 mM, about 10 mM to about 20 mM, or about 15 mM to about 25 mM sodium citrate or sodium bicarbonate. In exemplary aspects, the buffer formulation comprises about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM, about 20 mM, about 21 mM, about 22 mM, about 23 mM, about 24 mM, about 25 mM sodium citrate or sodium bicarbonate. In certain embodiments, the buffer formulation comprises about 10 mM sodium citrate. In certain embodiments, the buffer formulation comprises about 20 mM sodium bicarbonate.

In exemplary aspects, the buffer formulation of the present disclosure comprises about 100 mM to about 250 mM, about 100 mM to about 200 mM, about 120 mM to about 250 mM, about 150 mM to about 250 mM, about 154 mM to about 250 mM, about 100 mM to about 200 mM, about 120 mM to about 200 mM, about 150 mM to about 200 mM, about 154 mM to about 200 mM, about 100 mM to about 175 mM, about 120 mM to about 175 mM, about 125 mM to about 175 mM, about 150 mM to about 175 mM, about 154 mM to about 175 mM, about 140 mM to about 160 mM, or about 150 mM to about 160 mM of a pharmaceutically acceptable salt (as defined above). In exemplary aspects, the buffer formulation of the present disclosure comprises about 100 mM, about 105 mM, about 110 mM, about 115 mM, about 120 mM, about 125 mM, about 130 mM, about 135 mM, about 140 mM, about 145 mM, about 150 mM, about 154 mM, about 155 mM, about 160 mM, about 170 mM, about 175 mM, about 180 mM, about 190 mM, about 200 mM, about 210 mM, about 220 mM, about 225 mM, about 230 mM, about 240 mM, or about 250 mM of a pharmaceutically acceptable salt. In certain embodiments, the pharmaceutically acceptable salt can be a sodium salt (e.g., sodium chloride). In certain embodiments, the concentration of the pharmaceutically acceptable salt can be about 120 mM sodium chloride. In certain embodiments, the concentration of the pharmaceutically acceptable salt can be about 150 mM sodium chloride. In certain embodiments, the concentration of the pharmaceutically acceptable salt can be about 154 mM sodium chloride.

Without being bound to theory, sub-physiological concentration of a pharmaceutically acceptable salt can form compact lyocakes with lower moisture content and assists in the formation of an improved lyocake. In certain embodiments, the sub-physiological concentration of the pharmaceutically acceptable salt results in white, compact and homogenous lyocakes. Accordingly, in certain embodiments, the present disclosure provides low salt compositions containing a sub-physiological concentration of a pharmaceutically acceptable salt, for example, less than about 100 mM of a pharmaceutically acceptable salt. In one embodiment, a low salt composition provided herein contains less than about 100 mM of a pharmaceutical salt. In certain embodiments, a low salt composition provided herein contains less than about 80 mM of a pharmaceutical salt. In certain embodiments, a low salt composition provided herein contains less than about 70 mM of a pharmaceutical salt. In another embodiment, a low salt composition provided herein contains less than about 60 mM of a pharmaceutical salt. In another embodiment, a low salt composition provided herein contains less than about 50 mM of a pharmaceutical salt. In another embodiment, a low salt composition provided herein contains less than about 40 mM of a pharmaceutical salt. In another embodiment, a low salt composition provided herein contains less than about 30 mM of a pharmaceutical salt. In another embodiment, a low salt composition provided herein contains less than about 20 mM of a pharmaceutical salt. In another embodiment, a low salt composition provided herein contains less than about 10 mM of a pharmaceutical salt. In certain embodiments, no pharmaceutical salts are present. In another embodiment, a low salt composition contains between about 30 mM and about 60 mM of a pharmaceutically acceptable salt. In yet other embodiments, a low salt composition contains about 0 mM, about 5 mM, about 10 mM, about 15 mM, about 20 mM, about 25 mM, about 30 mM, about 35 mM, about 40 mM, about 45 mM, about 50 mM, about 55 mM, about 60 mM, about 65 mM, about 70 mM, about 75 mM, about 80 mM, about 85 mM, about 90 mM, about 95 mM, or about 100 mM of a pharmaceutically acceptable salt. In certain embodiments, the composition of the present disclosure comprises about 0 mM of a pharmaceutically acceptable salt. In certain embodiments, the composition of the present disclosure comprises about 30 mM of a pharmaceutically acceptable salt. In certain embodiments, the composition of the present disclosure comprises about 40 mM of a pharmaceutically acceptable salt. In certain embodiments, the composition of the present disclosure comprises about 50 mM of a pharmaceutically acceptable salt. In certain embodiments, the composition of the present disclosure comprises about 60 mM of a pharmaceutically acceptable salt. In certain embodiments, the composition of the present disclosure comprises about 70 mM of a pharmaceutically acceptable salt. In certain embodiments, the composition of the present disclosure comprises about 80 mM of a pharmaceutically acceptable salt. In a preferred embodiment, a low salt composition is a lyophilized composition. In a preferred embodiment, the salt is a sodium salt (e.g., sodium chloride).

Advantageously, it was also found that the inclusion of a non-ionic surfactant substantially reduces the loss of viruses (e.g., AAV) on surfaces and prevents formation of visible particles of the compositions. Accordingly, in certain embodiments, compositions containing a stabilizing concentration of a non-ionic detergent are provided. Pharmaceutically acceptable non-ionic surfactants that may be used in the compositions disclosed herein are known in the art of pharmaceutical science, and include, without limitation, Polysorbate 80 (Tween 80; PS80), Polysorbate 20 (Tween 20; PS20), and various poloxamers or pluronics, including Pluronic F-68, and BRIJ 35, or mixtures thereof. In certain embodiments, the non-ionic surfactant used in the buffer formulation can be Polysorbate 80. In exemplary aspects, the buffer formulation of the present disclosure comprises Super Refined™ PS80 commercially available from Croda Health Care (Snaith, UK). In certain embodiments, the non-ionic surfactant used in the buffer formulation can be Pluronic F-68. In certain embodiments, the non-ionic surfactant used in the buffer formulation can be Polysorbate 80 and Pluronic F-68.

In certain embodiments, the buffer formulation of the present disclosure comprises about 0.0001% (w/w) to about 0.01% (w/w), about 0.0005% (w/w) to about 0.006% (w/w), about 0.001% (w/w) to about 0.01% (w/w), about 0.001% (w/w) to about 0.006% (w/w), about 0.001% (w/w) to about 0.0075% (w/w), about 0.005% (w/w), about 0.0025% (w/w) to about 0.0075% (w/w), about 0.005% (w/w) to about 0.006% (w/w), or about 0.002% (w/w) to about 0.004% (w/w) non-ionic surfactant. In exemplary aspects, the buffer formulation comprises about 0.001% (w/w), about 0.0015% (w/w), about 0.002% (w/w), about 0.0025% (w/w), about 0.003% (w/w), about 0.0035% (w/w), about 0.004% (w/w), about 0.0045% (w/w), about 0.005% (w/w), about 0.0055% (w/w), about 0.006% (w/w), about 0.0065% (w/w), about 0.007% (w/w), about 0.0075% (w/w), about 0.008% (w/w), about 0.0085% (w/w), about 0.009% (w/w), about 0.0095% (w/w), about 0.001% (w/w), about 0.002% (w/w), about 0.003% (w/w), about 0.004% (w/w), or about 0.005% non-ionic surfactant. In certain embodiments, the buffer composition of the present disclosure comprises about 0.003% (w/w) non-ionic surfactant. In certain embodiments, the buffer formulation of the present disclosure comprises about 0.005% (w/w) non-ionic surfactant. In certain embodiments, the buffer formulation of the present disclosure comprises about 0.006% (w/w) non-ionic surfactant.

In exemplary aspects, the buffer formulation of the present disclosure comprises about 0.0001% (w/w) to about 0.01% (w/w), about 0.0005% (w/w) to about 0.006% (w/w), about 0.001% (w/w) to about 0.01% (w/w), about 0.001% (w/w) to about 0.006% (w/w), about 0.001% (w/w) to about 0.005% (w/w), about 0.0025% (w/w) to about 0.0075% (w/w), about 0.005% (w/w) to about 0.006% (w/w), or about 0.002% (w/w) to about 0.004% (w/w) polysorbate 80 (e.g., Super Refined™ PS80) and/or Pluronic F-68. In exemplary aspects, the buffer formulation comprises about 0.001% (w/w), about 0.0015% (w/w), about 0.002% (w/w), about 0.0025% (w/w), about 0.003% (w/w), about 0.0035% (w/w), about 0.004% (w/w), about 0.0045% (w/w), about 0.005% (w/w), about 0.0055% (w/w), about 0.006% (w/w), about 0.0065% (w/w), about 0.007% (w/w), about 0.0075% (w/w), about 0.008% (w/w), about 0.0085% (w/w), about 0.009% (w/w), about 0.0095% (w/w), about 0.001% (w/w), about 0.002% (w/w), about 0.003% (w/w), about 0.004% (w/w), or about 0.005% PS80 and/or Pluronic F-68. In certain embodiments, the buffer formulation of the present disclosure comprises about 0.003% (w/w) PS80. In certain embodiments, the buffer formulation of the present disclosure comprises about 0.005% (w/w) PS80 and/or Pluronic F-68. In certain embodiments, the buffer formulation of the present disclosure comprises about 0.003% (w/w) Pluronic F-68. In certain embodiments, the buffer formulation of the present disclosure comprises about 0.005% (w/w) Pluronic F-68. In certain embodiments, the buffer formulation of the present disclosure comprises about 0.003% (w/w) PS80 and Pluronic F-68. In certain embodiments, the buffer formulation of the present disclosure comprises about 0.005% to about 0.006% (w/w) PS80 and Pluronic F-68.

In certain embodiments, the buffer formulation of the present disclosure comprises about 0.1 mM to about 20 mM of one or more sugar and/or sugar alcohol. Any sugar such as mono-, di-, or polysaccharides, or water-soluble glucans, including for example fructose, glucose, mannose, sorbose, xylose, maltose, lactose, sucrose, dextran, trehalose, pullulan, dextrin, cyclodextrin, soluble starch, hydroxyethyl starch, and carboxymethylcellulose may be used. In a particular embodiment, the sugar can be sucrose, glucose, trehalose, or a combination thereof. In certain embodiments, the trehalose can be trehalose dihydrate. Sugar alcohols are defined as a hydrocarbon having between about 4 and about 8 carbon atoms and a hydroxyl group. Non-limiting examples of sugar alcohols that may be used in the buffer formulations provided herein include, mannitol, sorbitol, inositol, galactitol, dulcitol, xylitol, and arabitol. In certain embodiments, mannitol can be used as a sugar alcohol additive. In certain embodiments, a buffer formulation contains both a sugar and a sugar alcohol additive. In certain embodiments, the sugar can be sucrose. In certain embodiments, the sugar is glucose. In certain embodiments, the sugar is not glucose. In certain embodiments, the composition does not comprise sugar, sugar alcohol, or a combination thereof.

Without being bound to theory, sucrose is added to the buffer formulation because sucrose is able to pass through neural membranes, which can help transport the AAV vector into the cell.

The sugars and sugar alcohols may be used individually or in combination. In some embodiments, the sugar, sugar alcohol, or combination thereof will be present in the composition at a concentration of about 0.1 mM to about 20 mM, 0.1 mM to about 15 mM, 0.1 mM to about 10 mM, 0.5 mM to about 15 mM, about 1 mM to about 20 mM, about 1 mM to about 15 mM, about 1 mM to about 10 mM, about 1 mM to about 5 mM, about 2 mM to about 20 mM, 2 mM to about 15 mM, 2 mM to about 10 mM, about 2 mM to about 5 mM, about 3 mM to about 20 mM, 3 mM to about 15 mM, 3 mM to about 10 mM, about 3 mM to about 5 mM, about 4 mM to about 20 mM, 4 mM to about 15 mM, 4 mM to about 10 mM, about 4 mM to about 6 mM, about 4 mM to about 5 mM, about 5 mM to about 20 mM, 5 mM to about 15 mM, 5 mM to about 10 mM, or about 10 mM to about 20 mM. In exemplary aspects, the buffer formulation of the present disclosure comprises about 0.1 mM, about 0.5 mM, about 1 mM, 2 mM, about 3 mM, about 4 mM, about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM, about 20 mM, about 25 mM, or about 30 mM sugar, sugar alcohol, or combination thereof. In certain embodiments, the sugar can be sucrose, glucose, or a combination thereof. In certain embodiments, the sugar can be sucrose. In certain embodiments, the sugar can be 5 mM sucrose. In certain embodiments, the sugar is glucose. In certain embodiments, the sugar can be 5 mM glucose. In certain embodiments, the sugar is not glucose.

In exemplary aspects, the buffer formulation of the present disclosure does not comprise glycine.

In exemplary aspects, the composition of the present disclosure does not comprise mannitol. In exemplary aspects, the composition of the present disclosure does not comprise trehalose.

In exemplary aspects, the aqueous composition (e.g., storage and/or pharmaceutically acceptable compositions) of the present disclosure comprises: adeno-associated virus (AAV) and a buffer formulation comprising about 1 mM to about 15 mM of a stabilizing agent, about 100 mM to about 250 mM of a pharmaceutically acceptable salt, about 0.0001% (w/w) to about 0.005% (w/w) of a non-ionic surfactant, and about 0.1 mM to about 20 mM of a sugar, sugar alcohol, or a combination thereof.

In exemplary aspects, the aqueous composition (e.g., storage and/or pharmaceutically acceptable compositions) of the present disclosure comprises: adeno-associated virus (AAV) and a buffer formulation comprising about 30 mM to about 75 mM of a stabilizing agent, about 100 mM to about 250 mM of a pharmaceutically acceptable salt, and about 0.0001% (w/w) to about 0.005% (w/w) of a non-ionic surfactant.

In exemplary aspects, the aqueous composition (e.g., storage and/or pharmaceutically acceptable compositions) of the present disclosure comprises: adeno-associated virus (AAV) and a buffer formulation comprising about 1 mM to about 30 mM of a stabilizing agent, about 100 mM to about 250 mM of a pharmaceutically acceptable salt, and optionally about 0.0001% (w/w) to about 0.01% (w/w) of a non-ionic surfactant.

In exemplary aspects, the aqueous composition (e.g., storage and/or pharmaceutically acceptable compositions) of the present disclosure comprises: adeno-associated virus (AAV) and a buffer formulation comprising about 0.5 mM to about 30 mM, about 1 mM to about 20 mM, about 1 mM to about 15 mM, or about 5 mM to about 15 mM of a stabilizing agent; about 0 mM to about 250 mM, about 1 mM to about 100 mM, about 30 mM to about 100 mM, about 100 mM to about 250 mM, about 150 mM to about 200 mM, about 125 mM to about 175 mM, about 140 mM to about 160 mM, or about 150 mM to about 160 mM of a pharmaceutically acceptable salt; about 0.0001% (w/w) to about 0.01% (w/w), about 0.0005% (w/w) to about 0.006% (w/w), about 0.001% (w/w) to about 0.005% (w/w), or about 0.002% (w/w) to about 0.004% (w/w) of a non-ionic surfactant; and about 0.1 mM to about 20 mM, about 0.5 mM to about 15 mM, about 1 mM to about 10 mM, or about 4 mM to about 6 mM of a sugar, sugar alcohol, or a combination thereof. In certain embodiments the stabilizing agent can be L-histidine, sodium bicarbonate, or sodium citrate. In certain embodiments the stabilizing agent can be L-histidine. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68. In certain embodiments, the sugar can be sucrose and/or glucose.

In exemplary aspects, the aqueous composition (e.g., storage and/or pharmaceutically acceptable compositions) of the present disclosure comprises: adeno-associated virus (AAV) and a buffer formulation comprising about 0.5 mM to about 30 mM of a stabilizing agent; about 30 mM to about 100 mM of a pharmaceutically acceptable salt; about 0.0001% (w/w) to about 0.01% (w/w) of a non-ionic surfactant; and about 0.1 mM to about 20 mM of a sugar, sugar alcohol, or a combination thereof. In certain embodiments the stabilizing agent can be L-histidine, sodium bicarbonate, or sodium citrate. In certain embodiments the stabilizing agent can be L-histidine. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68. In certain embodiments, the sugar can be sucrose and/or glucose In exemplary aspects, the aqueous composition (e.g., storage and/or pharmaceutically acceptable compositions) of the present disclosure comprises: adeno-associated virus (AAV) and a buffer formulation comprising about 0.5 mM to about 30 mM of a stabilizing agent; about 0 mM to about 250 mM of a pharmaceutically acceptable salt; about 0.0001% (w/w) to about 0.01% (w/w) of a non-ionic surfactant; and about 0.1 mM to about 20 mM of a sugar, sugar alcohol, or a combination thereof. In certain embodiments the stabilizing agent can be L-histidine, sodium bicarbonate, or sodium citrate. In certain embodiments the stabilizing agent can be L-histidine. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68. In certain embodiments, the sugar can be sucrose and/or glucose.

In exemplary aspects, the aqueous composition (e.g., storage and/or pharmaceutically acceptable compositions) of the present disclosure comprises: adeno-associated virus (AAV) and a buffer formulation comprising about 1 mM to about 20 mM of a stabilizing agent; about 100 mM to about 200 mM of a pharmaceutically acceptable salt; about 0.0005% (w/w) to about 0.006% (w/w) of a non-ionic surfactant; and about 0.5 mM to about 15 mM of a sugar, sugar alcohol, or a combination thereof. In certain embodiments the stabilizing agent can be L-histidine, sodium bicarbonate, or sodium citrate. In certain embodiments the stabilizing agent can be L-histidine. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68. In certain embodiments, the sugar can be sucrose and/or glucose.

In exemplary aspects, the aqueous composition (e.g., storage and/or pharmaceutically acceptable compositions) of the present disclosure comprises: adeno-associated virus (AAV) and a buffer formulation comprising about 1 mM to about 15 mM of a stabilizing agent; about 125 mM to about 175 mM of a pharmaceutically acceptable salt; about 0.001% (w/w) to about 0.005% (w/w) of a non-ionic surfactant; and about 1 mM to about 10 mM of a sugar, sugar alcohol, or a combination thereof. In certain embodiments the stabilizing agent can be L-histidine, sodium bicarbonate, or sodium citrate. In certain embodiments the stabilizing agent can be L-histidine. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68. In certain embodiments, the sugar can be sucrose and/or glucose.

In exemplary aspects, the aqueous composition (e.g., storage and/or pharmaceutically acceptable compositions) of the present disclosure comprises: adeno-associated virus (AAV) and a buffer formulation comprising about 5 mM to about 15 mM of a stabilizing agent; about 150 mM to about 160 mM of a pharmaceutically acceptable salt; about 0.002% (w/w) to about 0.004% (w/w) of a non-ionic surfactant; and about 4 mM to about 6 mM of a sugar, sugar alcohol, or a combination thereof. In certain embodiments the stabilizing agent can be L-histidine or sodium citrate. In certain embodiments the stabilizing agent can be L-histidine. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68. In certain embodiments, the sugar can be sucrose and/or glucose.

In exemplary aspects, the aqueous composition (e.g., storage and/or pharmaceutically acceptable compositions) of the present disclosure comprises: adeno-associated virus (AAV) and a buffer formulation comprising about 10 mM of a stabilizing agent; about 154 mM of a pharmaceutically acceptable salt; about 0.003% (w/w) of a non-ionic surfactant; and about 5 mM of a sugar, sugar alcohol, or a combination thereof. In certain embodiments the stabilizing agent can be L-histidine, sodium bicarbonate, or sodium citrate. In certain embodiments the stabilizing agent can be L-histidine. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68. In certain embodiments, the sugar can be sucrose and/or glucose.

In exemplary aspects, the aqueous composition (e.g., storage and/or pharmaceutically acceptable compositions) of the present disclosure comprises: adeno-associated virus (AAV) and a buffer formulation comprising about 1 mM to about 100 mM, about 30 mM to about 75 mM, about 25 mM to about 75 mM, or about 40 mM to about 60 mM of a stabilizing agent; about 0 mM to about 250 mM, about 1 mM to about 100 mM, about 30 mM to about 100 mM, about 100 mM to about 250 mM, about 100 mM to about 200 mM, about 125 mM to about 175 mM, or about 140 mM to about 160 mM, or 150 mM to about 160 mM of a pharmaceutically acceptable salt; and about 0.0001% (w/w) to about 0.005% (w/w), about 0.0005% (w/w) to about 0.006% (w/w), about 0.001% (w/w) to about 0.005% (w/w), or about 0.002% (w/w) to about 0.004% (w/w) of a non-ionic surfactant. In certain embodiments the stabilizing agent can be L-histidine, sodium bicarbonate, or sodium citrate. In certain embodiments the stabilizing agent can be L-histidine. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 1 mM to about 100 mM of a stabilizing agent; about 30 mM to about 100 mM of a pharmaceutically acceptable salt; and about 0.0001% (w/v) to about 0.01% (w/w) of a non-ionic surfactant. In certain embodiments the stabilizing agent can be L-histidine, sodium bicarbonate, or sodium citrate. In certain embodiments the stabilizing agent can be L-histidine. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 1 mM to about 100 mM of a stabilizing agent; about 0 mM to about 250 mM of a pharmaceutically acceptable salt; and about 0.0001% (w/v) to about 0.01% (w/w) of a non-ionic surfactant. In certain embodiments the stabilizing agent can be L-histidine, sodium bicarbonate, or sodium citrate. In certain embodiments the stabilizing agent can be L-histidine. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 30 mM to about 75 mM of a stabilizing agent; about 100 mM to about 200 mM of a pharmaceutically acceptable salt; and about 0.0005% (w/v) to about 0.006% (w/w) of a non-ionic surfactant. In certain embodiments the stabilizing agent can be L-histidine, sodium bicarbonate, or sodium citrate. In certain embodiments the stabilizing agent can be L-histidine. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 25 mM to about 75 mM of a stabilizing agent; about 125 mM to about 175 mM of a pharmaceutically acceptable salt; and about 0.001% (w/w) to about 0.005% (w/w) of a non-ionic surfactant. In certain embodiments the stabilizing agent can be L-histidine, sodium bicarbonate, or sodium citrate. In certain embodiments the stabilizing agent can be L-histidine. In certain embodiments, the pharmaceutically acceptable salt can be sodium chloride. In certain embodiments, the nonionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 40 mM to about 60 mM of a stabilizing agent; about 150 mM to about 160 mM of a pharmaceutically acceptable salt; and or about 0.002% (w/w) to about 0.004% (w/w) of a non-ionic surfactant. In certain embodiments the stabilizing agent can be L-histidine, sodium bicarbonate, or sodium citrate. In certain embodiments the stabilizing agent can be L-histidine. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 50 mM of a stabilizing agent; about 154 mM of a pharmaceutically acceptable salt; and or about 0.003% (w/w) of a non-ionic surfactant. In certain embodiments the stabilizing agent can be L-histidine, sodium bicarbonate, or sodium citrate. In certain embodiments the stabilizing agent can be L-histidine. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 0.5 mM to about 30 mM, about 1 mM to about 20 mM, about 1 mM to about 15 mM, or about 5 mM to about 15 mM of a stabilizing agent; about 0 mM to about 250 mM, about 1 mM to about 100 mM, about 30 mM to about 100 mM, about 100 mM to about 250 mM, about 100 mM to about 200 mM, or about 140 mM to about 160 mM of a pharmaceutically acceptable salt; and about 0.0001% (w/w) to about 0.01% (w/w), about 0.0005% (w/w) to about 0.006% (w/w), about 0.001% (w/w) to about 0.005% (w/w), or about 0.002% (w/w) to about 0.004% (w/w) of a non-ionic surfactant. In certain embodiments the stabilizing agent can be L-histidine, sodium bicarbonate, or sodium citrate. In certain embodiments the stabilizing agent can be sodium citrate. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 0.5 mM to about 30 mM of a stabilizing agent; about 30 mM to about 100 mM of a pharmaceutically acceptable salt; and about 0.0001% (w/w) to about 0.01% (w/w) of a non-ionic surfactant. In certain embodiments the stabilizing agent can be L-histidine, sodium bicarbonate, or sodium citrate. In certain embodiments the stabilizing agent can be sodium citrate. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 0.5 mM to about 30 mM of a stabilizing agent; about 0 mM to about 250 mM of a pharmaceutically acceptable salt; and about 0.0001% (w/w) to about 0.01% (w/w) of a non-ionic surfactant. In certain embodiments the stabilizing agent can be L-histidine, sodium bicarbonate, or sodium citrate. In certain embodiments the stabilizing agent can be sodium citrate. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 1 mM to about 20 mM of a stabilizing agent; about 100 mM to about 200 mM of a pharmaceutically acceptable salt; and about 0.0005% (w/w) to about 0.006% (w/w) of a non-ionic surfactant. In certain embodiments the stabilizing agent can be L-histidine, sodium bicarbonate, or sodium citrate. In certain embodiments the stabilizing agent can be sodium citrate. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 1 mM to about 15 mM of a stabilizing agent; about 125 mM to about 175 mM of a pharmaceutically acceptable salt; and about 0.001% (w/w) to about 0.005% (w/w) of a non-ionic surfactant. In certain embodiments the stabilizing agent can be L-histidine, sodium bicarbonate, or sodium citrate. In certain embodiments the stabilizing agent can be sodium citrate. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 5 mM to about 15 mM of a stabilizing agent; about 140 mM to about 160 mM of a pharmaceutically acceptable salt; and about 0.002% (w/w) to about 0.004% (w/w) of a non-ionic surfactant. In certain embodiments the stabilizing agent can be L-histidine, sodium bicarbonate, or sodium citrate. In certain embodiments the stabilizing agent can be sodium citrate. In certain embodiments, the pharmaceutically acceptable salt can be sodium chloride. In certain embodiments, the nonionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 10 mM of a stabilizing agent; about 150 mM of a pharmaceutically acceptable salt; and about 0.003% (w/w) of a non-ionic surfactant. In certain embodiments the stabilizing agent can be L-histidine, sodium bicarbonate, or sodium citrate. In certain embodiments the stabilizing agent can be sodium citrate. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 1 mM to about 40 mM, about 5 mM to about 35 mM, about 10 mM to about 30 mM, or about 15 mM to about 25 mM of a stabilizing agent; about 0 mM to about 250 mM, about 1 mM to about 100 mM, about 30 mM to about 100 mM, about 100 mM to about 250 mM, about 50 mM to about 150 mM, about 100 mM to about 150 mM, or about 110 mM to about 130 mM of a pharmaceutically acceptable salt; and about 0.0001% (w/w) to about 0.01% (w/w), about 0.0005% (w/w) to about 0.006% (w/w), about 0.001% (w/w) to about 0.005% (w/w), or about 0.002% (w/w) to about 0.004% (w/w) of a non-ionic surfactant. In certain embodiments the stabilizing agent can be L-histidine, sodium bicarbonate, or sodium citrate. In certain embodiments the stabilizing agent can be sodium bicarbonate. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 1 mM to about 40 mM of a stabilizing agent; about 30 mM to about 100 mM of a pharmaceutically acceptable salt; and about 0.0001% (w/w) to about 0.01% (w/w) of a non-ionic surfactant. In certain embodiments the stabilizing agent can be L-histidine, sodium bicarbonate, or sodium citrate. In certain embodiments the stabilizing agent can be sodium bicarbonate. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 1 mM to about 40 mM of a stabilizing agent; about 0 mM to about 250 mM of a pharmaceutically acceptable salt; and about 0.0001% (w/w) to about 0.01% (w/w) of a non-ionic surfactant. In certain embodiments the stabilizing agent can be L-histidine, sodium bicarbonate, or sodium citrate. In certain embodiments the stabilizing agent can be sodium bicarbonate. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 5 mM to about 35 mM of a stabilizing agent; about 100 mM to about 250 mM of a pharmaceutically acceptable salt; and about 0.0005% (w/w) to about 0.006% (w/w) of a non-ionic surfactant. In certain embodiments the stabilizing agent can be L-histidine, sodium bicarbonate, or sodium citrate. In certain embodiments the stabilizing agent can be sodium bicarbonate. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 10 mM to about 30 mM of a stabilizing agent; about 50 mM to about 150 mM of a pharmaceutically acceptable salt; and about 0.001% (w/w) to about 0.005% (w/w) of a non-ionic surfactant. In certain embodiments the stabilizing agent can be L-histidine, sodium bicarbonate, or sodium citrate. In certain embodiments the stabilizing agent can be sodium bicarbonate. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 15 mM to about 25 mM of a stabilizing agent; about 110 mM to about 130 mM of a pharmaceutically acceptable salt; and about 0.002% (w/w) to about 0.004% (w/w) of a non-ionic surfactant. In certain embodiments the stabilizing agent can be L-histidine, sodium bicarbonate, or sodium citrate. In certain embodiments the stabilizing agent can be sodium bicarbonate. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

In exemplary aspects, the aqueous composition (e.g., storage and/or pharmaceutically acceptable compositions) of the present disclosure comprises: adeno-associated virus (AAV) and a buffer formulation comprising about 20 mM of a stabilizing agent; about 120 mM of a pharmaceutically acceptable salt; and about 0.003% (w/w) of a non-ionic surfactant. In certain embodiments the stabilizing agent can be L-histidine or sodium citrate. In certain embodiments the stabilizing agent can be sodium citrate. In certain embodiments, the pharmaceutically acceptable salt can be sodium chloride. In certain embodiments, the non-ionic surfactant can be PS80. In certain embodiments, the non-ionic surfactant can be Pluronic F-68. In certain embodiments, the non-ionic surfactant can be PS80 and Pluronic F-68.

Additional Components

In exemplary embodiments, the compositions of the present disclosure comprise additional pharmaceutically acceptable ingredients. In exemplary aspects, the compositions comprise any one or a combination of the following: acidifying agents, additives, adsorbents, aerosol propellants, air displacement agents, alkalizing agents, anticaking agents, anticoagulants, antimicrobial preservatives, antioxidants, antiseptics, bases, binders, buffering agents, chelating agents, coating agents, coloring agents, desiccants, detergents, diluents, disinfectants, disintegrants, dispersing agents, dissolution enhancing agents, dyes, emollients, emulsifying agents, emulsion stabilizers, fillers, film forming agents, flavor enhancers, flavoring agents, flow enhancers, gelling agents, granulating agents, humectants, lubricants, mucoadhesives, ointment bases, ointments, oleaginous vehicles, organic bases, pastille bases, pigments, plasticizers, polishing agents, preservatives, sequestering agents, skin penetrants, solubilizing agents, solvents, stabilizing agents, suppository bases, surface active agents, surfactants, suspending agents, sweetening agents, therapeutic agents, thickening agents, tonicity agents, toxicity agents, viscosity-increasing agents, water-absorbing agents, water-miscible cosolvents, water softeners, or wetting agents. In some embodiments, the compositions of the present disclosure comprise any one or a combination of the following components: acacia, acesulfame potassium, acetyltributyl citrate, acetyltriethyl citrate, agar, albumin, alcohol, dehydrated alcohol, denatured alcohol, dilute alcohol, aleuritic acid, alginic acid, aliphatic polyesters, alumina, aluminum hydroxide, aluminum stearate, amylopectin, α-amylose, ascorbic acid, ascorbyl palmitate, aspartame, bacteriostatic water for injection, bentonite, bentonite magma, benzalkonium chloride, benzethonium chloride, benzoic acid, benzyl alcohol, benzyl benzoate, bronopol, butylated hydroxyanisole, butylated hydroxytoluene, butylparaben, butylparaben sodium, calcium alginate, calcium ascorbate, calcium carbonate, calcium cyclamate, dibasic anhydrous calcium phosphate, dibasic dehydrate calcium phosphate, tribasic calcium phosphate, calcium propionate, calcium silicate, calcium sorbate, calcium stearate, calcium sulfate, calcium sulfate hemihydrate, canola oil, carbomer, carbon dioxide, carboxymethyl cellulose calcium, carboxymethyl cellulose sodium, β-carotene, carrageenan, castor oil, hydrogenated castor oil, cationic emulsifying wax, cellulose acetate, cellulose acetate phthalate, ethyl cellulose, microcrystalline cellulose, powdered cellulose, silicified microcrystalline cellulose, sodium carboxymethyl cellulose, cetostearyl alcohol, cetrimide, cetyl alcohol, chlorhexidine, chlorobutanol, chlorocresol, cholesterol, chlorhexidine acetate, chlorhexidine gluconate, chlorhexidine hydrochloride, chlorodifluoroethane (HCFC), chlorodifluoromethane, chlorofluorocarbons (CFC)chlorophenoxyethanol, chloroxylenol, corn syrup solids, anhydrous citric acid, citric acid monohydrate, cocoa butter, coloring agents, corn oil, cottonseed oil, cresol, m-cresol, o-cresol, p-cresol, croscarmellose sodium, crospovidone, cyclamic acid, cyclodextrins, dextrates, dextrin, dextrose, dextrose anhydrous, diazolidinyl urea, dibutyl phthalate, dibutyl sebacate, diethanolamine, diethyl phthalate, difluoroethane (HFC), dimethyl-β-cyclodextrin, cyclodextrin-type compounds such as Captisol®, dimethyl ether, dimethyl phthalate, dipotassium edetate, disodium edentate, disodium hydrogen phosphate, docusate calcium, docusate potassium, docusate sodium, dodecyl gallate, dodecyltrimethylammonium bromide, edetate calcium disodium, edtic acid, eglumine, ethyl alcohol, ethylcellulose, ethyl gallate, ethyl laurate, ethyl maltol, ethyl oleate, ethylparaben, ethylparaben potassium, ethylparaben sodium, ethyl vanillin, fructose, fructose liquid, fructose milled, fructose pyrogen-free, powdered fructose, fumaric acid, gelatin, glucose, liquid glucose, glyceride mixtures of saturated vegetable fatty acids, glycerin, glyceryl behenate, glyceryl monooleate, glyceryl monostearate, self-emulsifying glyceryl monostearate, glyceryl palmitostearate, glycine, glycols, glycofurol, guar gum, heptafluoropropane (HFC), hexadecyltrimethylammonium bromide, high fructose syrup, human serum albumin, hydrocarbons (HC), dilute hydrochloric acid, hydrogenated vegetable oil type II, hydroxyethyl cellulose, 2-hydroxyethyl-β-cyclodextrin, hydroxypropyl cellulose, low-substituted hydroxypropyl cellulose, 2-hydroxypropyl-β-cyclodextrin, hydroxypropyl methylcellulose, hydroxypropyl methylcellulose phthalate, imidurea, indigo carmine, ion exchangers, iron oxides, isopropyl alcohol, isopropyl myristate, isopropyl palmitate, isotonic saline, kaolin, lactic acid, lactitol, lactose, lanolin, lanolin alcohols, anhydrous lanolin, lecithin, magnesium aluminum silicate, magnesium carbonate, normal magnesium carbonate, magnesium carbonate anhydrous, magnesium carbonate hydroxide, magnesium hydroxide, magnesium lauryl sulfate, magnesium oxide, magnesium silicate, magnesium stearate, magnesium trisilicate, magnesium trisilicate anhydrous, malic acid, malt, maltitol, maltitol solution, maltodextrin, maltol, maltose, mannitol, medium chain triglycerides, meglumine, menthol, methylcellulose, methyl methacrylate, methyl oleate, methylparaben, methylparaben potassium, methylparaben sodium, microcrystalline cellulose and carboxymethylcellulose sodium, mineral oil, light mineral oil, mineral oil and lanolin alcohols, oil, olive oil, monoethanolamine, montmorillonite, octyl gallate, oleic acid, palmitic acid, paraffin, peanut oil, petrolatum, petrolatum and lanolin alcohols, pharmaceutical glaze, phenol, liquified phenol, phenoxyethanol, phenoxypropanol, phenylethyl alcohol, phenylmercuric acetate, phenylmercuric borate, phenylmercuric nitrate, polacrilin, polacrilin potassium, poloxamer, polydextrose, polyethylene glycol, polyethylene oxide, polyacrylates, polyethylene-polyoxypropylene-block polymers, polymethacrylates, polyoxyethylene alkyl ethers, polyoxyethylene castor oil derivatives, polyoxyethylene sorbitol fatty acid esters, polyoxyethylene stearates, polyvinyl alcohol, polyvinyl pyrrolidone, potassium alginate, potassium benzoate, potassium bicarbonate, potassium bisulfite, potassium chloride, potassium citrate, potassium citrate anhydrous, potassium hydrogen phosphate, potassium metabisulfite, monobasic potassium phosphate, potassium propionate, potassium sorbate, povidone, propanol, propionic acid, propylene carbonate, propylene glycol, propylene glycol alginate, propyl gallate, propylparaben, propylparaben potassium, propylparaben sodium, protamine sulfate, rapeseed oil, Ringer's solution, saccharin, saccharin ammonium, saccharin calcium, saccharin sodium, safflower oil, saponite, serum proteins, sesame oil, colloidal silica, colloidal silicon dioxide, sodium alginate, sodium ascorbate, sodium benzoate, sodium bicarbonate, sodium bisulfite, sodium chloride, anhydrous sodium citrate, sodium citrate dehydrate, sodium chloride, sodium cyclamate, sodium edentate, sodium dodecyl sulfate, sodium lauryl sulfate, sodium metabisulfite, sodium phosphate, dibasic, sodium phosphate, monobasic, sodium phosphate, tribasic, anhydrous sodium propionate, sodium propionate, sodium sorbate, sodium starch glycolate, sodium stearyl fumarate, sodium sulfite, sorbic acid, sorbitan esters (sorbitan fatty esters), sorbitol, sorbitol solution 70%, soybean oil, spermaceti wax, starch, corn starch, potato starch, pregelatinized starch, sterilizable maize starch, stearic acid, purified stearic acid, stearyl alcohol, sucrose, sugars, compressible sugar, confectioner's sugar, sugar spheres, invert sugar, Sugartab, Sunset Yellow FCF, synthetic paraffin, talc, tartaric acid, tartrazine, tetrafluoroethane (HFC), theobroma oil, thimerosal, titanium dioxide, alpha tocopherol, tocopheryl acetate, alpha tocopheryl acid succinate, beta-tocopherol, delta-tocopherol, gamma-tocopherol, tragacanth, triacetin, tributyl citrate, triethanolamine, triethyl citrate, trimethyl-β-cyclodextrin, trim ethyltetradecylammonium bromide, tris buffer, trisodium edentate, vanillin, type I hydrogenated vegetable oil, water, soft water, hard water, carbon dioxide-free water, pyrogen-free water, water for injection, sterile water for inhalation, sterile water for injection, sterile water for irrigation, waxes, anionic emulsifying wax, carnauba wax, cationic emulsifying wax, cetyl ester wax, microcrystalline wax, nonionic emulsifying wax, suppository wax, white wax, yellow wax, white petrolatum, wool fat, xanthan gum, xylitol, zein, zinc propionate, zinc salts, zinc stearate, or any excipient in the *Handbook of Pharmaceutical Excipients*, Third Edition, A. H. Kibbe (Pharmaceutical Press, London, UK, 2000), which is incorporated by reference in its entirety. *Remington's Pharmaceutical Sciences*, Sixteenth Edition, E. W. Martin (Mack Publishing Co., Easton, Pa., 1980), which is incorporated by reference in its entirety for all intended purposes, discloses various components used in formulating pharmaceutically acceptable compositions and known techniques for the preparation thereof. Except insofar as any conventional agent is incompatible with the pharmaceutical compositions, its use in pharmaceutical compositions is contemplated. In exemplary embodiments, the compositions of the present disclosure do not comprise one or a combination of the above ingredients. In exemplary embodiments, the compositions of the present disclosure comprise none of these ingredients. In exemplary aspects, the pharmaceutical composition of the present disclosure does not comprise dextran. In exemplary aspects, the pharmaceutical composition of the present disclosure does not comprise calcium chloride.

pH

In exemplary embodiments, the composition of the present disclosure has a physiologically compatible pH. Accordingly, in certain embodiments, the viral (e.g., AAV) compositions are provided that contain an excipient suitable to maintain the composition at a neutral pH.

In exemplary aspects, the pH of the composition can be about 6.5 to about 9.0, about 6.5 to about 8.0, about 6.9 to about 7.7, or about 7.0 to about 7.5. In certain embodiments, the pH of the composition can be about 6.5 or about 6.6, about 6.7, about 6.8, about 6.9, about 7.0, about 7.1, about 7.2, about 7.3, about 7.4, about 7.5, about 7.6, about 7.7, about 7.8, about 7.9, about 8.0, about 8.1, about 8.2, about 8.3, about 8.4, about 8.5, about 8.6, about 8.7, about 8.8, about 8.9, or about 9.0. In exemplary aspects, the pH of the composition can be about 7.0 or about 7.4. In certain embodiments, the pH of the composition can be about 7.0. In certain embodiments, the pH of the composition can be about 7.4.

Osmolality

In exemplary embodiments, the composition of the present disclosure has an osmolality of about 200 to about 400 mOsmol/kg, about 250 to about 400 mOsmol/kg, or about 290 to about 390 mOsmol/kg. In certain embodiments, an viral (e.g., AAV) composition provided herein will have an osmolality, for example, of about 200 mOsmol/L, about 210 mOsmol/L, about 220 mOsmol/L, about 230 mOsmol/L, about 240 mOsmol/L, about 250 mOsmol/L, about 260 mOsmol/L, about 270 mOsmol/L, about 280 mOsmol/L, about 290 mOsmol/L, about 300 mOsmol/L, about 310 mOsmol/L, about 320 mOsmol/L, about 330 mOsmol/L, about 340 mOsmol/L, about 350 mOsmol/L, about 360 mOsmol/L, about 370 mOsmol/L, about 380 mOsmol/L, about 390 mOsmol/L, or about 400 mOsmol/L. In exemplary aspects, the composition of the present disclosure has an osmolality of about 250 mOsmol/kg to about 350 mOsmol/kg. In exemplary aspects, the composition of the present disclosure has an osmolality of about 259 mOsmol/kg, about 305 mOsmol/kg, about 320 mOsmol/kg, or about 347 mOsmol/kg.

Examples of tonicity agents that may be used in the compositions provided herein include, without limitation, sodium chloride, dextrose, sucrose, xylitol, fructose, glycerol, sorbitol, mannitol, trehalose, potassium chloride, mannose, calcium chloride, magnesium chloride, other inorganic salts, other sugars, other sugar alcohols, and combinations thereof. In certain embodiments, a viral (e.g., AAV) composition may comprise at least one tonicity agent, or at least two, three, four, five, or more tonicity agents.

AAV

In exemplary embodiments, the composition of the present disclosure comprises AAV. The AAV may be of any AAV serotype. In exemplary aspects, the AAV can be of AAV1 serotype, AAV2 serotype, AAV3 serotype, AAV4 serotype, AAV5 serotype, AAV6 serotype, AAV7 serotype, AAV8 serotype, AAV9 serotype, or AAV10 serotype or a combination thereof. In exemplary aspects, the AAV can be of AAV8 serotype. In exemplary aspects, the AAV can be of AAV9 serotype. In exemplary aspects, the AAV can be of AAV6 serotype.

In certain embodiments, the AAV can be genetically and/or chemically modified. In certain embodiments, the AAV can be genetically modified. In certain embodiments, the AAV can be chemically modified.

In certain embodiments, the AAV has been genetically modified to create AAV vectors with altered receptor usage, antigenicity, transduction efficiency and/or tissue tropism for gene therapy application. In certain embodiments, the AAV may be genetically modified to insert peptide ligands, antibodies, antibody fragments, MHCs, and/or receptors into the viral capsid. In certain embodiments, the AAV may be genetically modified to insert peptides for labeling of the viral capsid. Non-limiting examples of possible modifications can be found in Büning H., Bolyard C. M., Hallek M., Bartlett J. S. (2012) Modification and Labeling of AAV Vector Particles. In: Snyder R., Moullier P. (eds) Adeno-Associated Virus. Methods in Molecular Biology (Methods and Protocols), vol 807. Humana Press, which is incorporated herein in its entirety for all intended purposes.

In certain embodiments, the AAV have been chemically modified to alter the AAV vector's tissue tropism. For example, chemoselective reactions that can target specific amino acid side chains can be exploited to alter the charge, polarity, hydrophobicity and hydrogen bonding potential within receptor binding domains on AAV capsids. Such ability to alter specific receptor make-up on the AAV capsid surface allows for the generation of synthetic vectors with altered tissue tropism. In certain embodiments, chemically modified AAV vectors can exhibit altered receptor usage, antigenicity, transduction efficiency and/or tissue tropism of the chemically modified AAV vectors. Non-limiting examples of possible modifications can be found in Büning H., Bolyard C. M., Hallek M., Bartlett J. S. (2012) Modification and Labeling of AAV Vector Particles. In: Snyder R., Moullier P. (eds) Adeno-Associated Virus. Methods in Molecular Biology (Methods and Protocols), vol 807. Humana Press, which is incorporated herein in its entirety for all intended purposes.

In certain embodiments of the compositions provided herein, the AAV can be an rAAV as described in U.S. Patent Application Publication No. 2017/0233455 and provisional application No. 62/509,616, which are both incorporated herein by reference in their entirety and for all purposes.

In exemplary aspects, the composition comprises a high titer AAV product. In exemplary aspects, the composition comprises at least about $10^{10}$ capsid particles (cp) or at least about $10^{11}$ capsid particles (cp) or at least about $10^{12}$ capsid particles (cp) or at least about $10^{13}$ capsid particles (cp). In exemplary aspects, the composition comprises at least about $10^{14}$ capsid particles (cp) or at least about $10^{15}$ capsid particles (cp), e.g., at least about $2 \times 10^{15}$ capsid particles (cp), at least about $5 \times 10^{15}$ capsid particles (cp). In certain embodiments, the term capsid particles (cp) can be used interchangeably with the term vector particles. In certain embodiments, cp is used in conjunction with ELISA analysis. In certain embodiments, vg is used in conjunction with qPCR analysis. The composition comprises also about $10^{10}$ vector genomes (vg) or at least about $10^{11}$ vector genomes (vg) or at least about $10^{12}$ vector genomes (vg) or at least about $10^{13}$ vector genomes (vg). In exemplary aspects, the composition comprises at least about $10^{14}$ vector genomes (vg) or at least about $10^{15}$ vector genomes (vg), e.g., at least about $2 \times 10^{15}$ vector genomes (vg), at least about $5 \times 10^{15}$ vector genomes (vg).

While this application specifically exemplifies AAV vectors, these same compositions can be used with other viral vectors. Non-limiting examples, of viruses from which the viral particles described herein can be derived include, e.g., retroviruses (e.g., rous sarcoma virus, human and bovine T-cell leukemia virus (HTLV and BLV)), lentiviruses (e.g., human and simian immunodeficiency viruses (HIV and SIV), Mason-Pfizer monkey virus), foamy viruses (e.g., Human Foamy Virus (HFV)), herpes viruses (herpes simplex virus (HSV), varicella-zoster virus, VZVEBV, HCMV, HHV), hantaviruses, pox viruses (e.g., vertebrate and avian poxviruses, vaccinia viruses), orthomyxoviruses (e.g., influenza A, influenza B, influenza C viruses), paramyxoviruses (e.g., parainfluenza virus, respiratory syncytial virus, Sendai virus, mumps virus, measles and measles-like viruses), rhabdoviruses (e.g., vesicular stomatitis virus, rubella virus, rabies virus), coronaviruses (e.g., SARS, MERS, flaviviruses (e.g., Marburg virus, Reston virus, Ebola virus), alphaviruses (e.g., Sindbis virus), bunyaviruses, arenaviruses (e.g., LCMV, GTOV, JUNV, LASV, LUJV, MACV, SABV, WWAV), iridoviruses, and hepadnaviruses.

Manufacture Methods and Uses

Methods of preparing a composition comprising viral (e.g., AAV) are further provided herein. In certain embodiments, the compositions are aqueous. In certain embodiments, the compositions are lyophilized. The examples below are for AAV, but other viral vectors can be used as well.

In exemplary aspects, the method comprises: a) combining a stabilizing agent, a non-ionic surfactant, a sugar, sugar alcohol, or combination thereof, solvent, and optionally a pharmaceutically acceptable salt such that the final concentration is about 0.5 mM to about 30 mM stabilizing agent, about 0 mM to about 250 mM pharmaceutically acceptable salt, about 0.0001% (w/w) to about 0.01% (w/w) non-ionic surfactant, about 0.1 mM to about 20 mM sugar, sugar alcohol, or combination thereof (additional ranges are disclosed in further detail above) and b) adding AAV particles, thereby obtaining a composition comprising AAV. In certain embodiments, the AAV particles are purified. In certain embodiments, AAV containing solutions are dialyzed into the final composition. In certain embodiments, the composition has a pH of about 6.9 to about 7.7, optionally, about 7.0 or about 7.4.

In exemplary aspects, the method comprises: a) combining L-histidine, polysorbate 80 (PS80), sucrose and/or glucose, water, and optionally sodium chloride such that the final concentration is about 0.5 mM to about 30 mM L-histidine, about 0 mM to about 250 mM sodium chloride, about 0.0001% (w/w) to about 0.01% (w/w) polysorbate 80 (PS80), and about 0.1 mM to about 20 mM sucrose and/or glucose (additional ranges are disclosed in further detail above) and b) adding AAV particles, thereby obtaining a composition comprising AAV. In certain embodiments, the AAV particles are purified. In certain embodiments, AAV containing solutions are dialyzed into the final composition. In certain embodiments, the composition has a pH of about 6.9 to about 7.7, optionally, about 7.0 or about 7.4.

In exemplary aspects, the method comprises: a) combining L-histidine, polysorbate 80 (PS80), sucrose and/or glucose, sodium chloride, and water such that the final concentration is about 1 mM to about 15 mM L-histidine, about 100 mM to about 250 mM sodium chloride, about 0.0001% (w/w) to about 0.005% (w/w) polysorbate 80 (PS80), about 0.1 mM to about 20 mM sucrose and/or glucose (additional ranges are disclosed in further detail above), and b) adding AAV particles, thereby obtaining a composition comprising AAV. In certain embodiments, the AAV particles are purified. In certain embodiments, AAV containing solutions are dialyzed into the final composition. In certain embodiments, the composition has a pH of about 6.9 to about 7.7, optionally, about 7.0 or about 7.4.

In exemplary aspects, the method comprises: a) combining a stabilizing agent, a non-ionic surfactant, solvent, and optionally a pharmaceutically acceptable salt such that the final concentration is about 1 mM to about 100 mM stabilizing agent, about 0 mM to about 250 mM pharmaceutically acceptable salt, and about 0.0001% (w/w) to about 0.01% (w/w) non-ionic surfactant (additional ranges are disclosed in further detail above) and b) adding AAV particles, thereby obtaining a composition comprising AAV. In certain embodiments, the AAV particles are purified. In certain embodiments, AAV containing solutions are dialyzed into the final composition. In certain embodiments, the composition has a pH of about 6.9 to about 7.7, optionally, about 7.0 or about 7.4.

In exemplary aspects, the method comprises: a) combining L-histidine, polysorbate 80 (PS80), water, and optionally sodium chloride such that the final concentration is about 1 mM to about 100 mM L-histidine, about 0 mM to about 250 mM sodium chloride, and about 0.0001% (w/w) to about 0.01% (w/w) polysorbate 80 (PS80) (additional ranges are disclosed in further detail above) and b) adding AAV particles, thereby obtaining a composition comprising AAV. In certain embodiments, the AAV particles are purified. In certain embodiments, AAV particles containing solutions are dialyzed into the final composition. In certain embodiments, the composition has a pH of about 6.9 to about 7.7, optionally, about 7.0 or about 7.4.

In exemplary aspects, the method comprises: a) combining L-histidine, polysorbate 80 (PS80), water, and optionally sodium chloride such that the final concentration is about 30 mM to about 75 mM L-histidine, about 100 mM to about 250 mM sodium chloride, about 0.0001% (w/w) to about 0.005% (w/w) polysorbate 80 (PS80) (additional ranges are disclosed in further detail above), and b) adding AAV, thereby obtaining a composition comprising AAV. In certain embodiments, the AAV particles are purified. In certain embodiments, AAV containing solutions are dialyzed into the final composition. In certain embodiments, the composition has a pH of about 6.9 to about 7.7, optionally, about 7.0 or about 7.4.

In exemplary aspects, the method comprises: a) combining a stabilizing agent, a non-ionic surfactant, solvent, and optionally a pharmaceutically acceptable salt such that the final concentration is about 0.5 mM to about 30 mM stabilizing agent, about 0 mM to about 250 mM pharmaceutically acceptable salt, and about 0.0001% (w/w) to about 0.01% (w/w) non-ionic surfactant (additional ranges are disclosed in further detail above) and b) adding AAV particles, thereby obtaining a composition comprising AAV. In certain embodiments, the AAV particles are purified. In certain embodiments, AAV containing solutions are dialyzed into the final composition. In certain embodiments, the composition has a pH of about 6.9 to about 7.7, optionally, about 7.0 or about 7.4.

In exemplary aspects, the method comprises: a) combining sodium citrate, polysorbate 80 (PS80), water, and optionally sodium chloride such that the final concentration is about 0.5 mM to about 30 mM sodium citrate, about 0 mM to about 250 mM sodium chloride, and about 0.0001% (w/w) to about 0.01% (w/w) polysorbate 80 (PS80) (additional ranges are disclosed in further detail above) and b) adding AAV particles, thereby obtaining a composition comprising AAV. In certain embodiments, the AAV particles are purified. In certain embodiments, AAV particles containing solutions are dialyzed into the final composition. In certain embodiments, the composition has a pH of about 6.9 to about 7.7, optionally, about 7.0 or about 7.4.

In exemplary aspects, the method comprises: a) combining sodium citrate, polysorbate 80 (PS80), water, and sodium chloride such that the final concentration is about 1 mM to about 30 mM sodium citrate, about 100 mM to about 250 mM sodium chloride, about 0.0001% (w/w) to about 0.01% (w/w) polysorbate 80 (PS80) (additional ranges are disclosed in further detail above) and b) adding AAV, thereby obtaining a composition comprising AAV. In certain embodiments, the AAV particles are purified. In certain embodiments, AAV containing solutions are dialyzed into the final composition. In certain embodiments, the composition has a pH of about 6.9 to about 7.7, optionally, about 7.0 or about 7.4.

In exemplary aspects, the method comprises: a) combining a stabilizing agent, a non-ionic surfactant, solvent, and optionally a pharmaceutically acceptable salt such that the final concentration is about 1 mM to about 40 mM stabilizing agent, about 0 mM to about 250 mM pharmaceutically acceptable salt, and about 0.0001% (w/w) to about 0.01% (w/w) non-ionic surfactant (additional ranges are disclosed in further detail above) and b) adding AAV particles, thereby obtaining a composition comprising AAV. In certain embodiments, the AAV particles are purified. In certain embodiments, AAV containing solutions are dialyzed into the final composition. In certain embodiments, the composition has a pH of about 6.9 to about 7.7, optionally, about 7.0 or about 7.4.

In exemplary aspects, the method comprises: a) combining sodium bicarbonate, polysorbate 80 (PS80), water and optionally sodium chloride such that the final concentration is about 1 mM to about 40 mM sodium bicarbonate, about 0 mM to about 250 mM sodium chloride, and about 0.0001% (w/w) to about 0.01% (w/w) polysorbate 80 (PS80) (additional ranges are disclosed in further detail above) and b) adding AAV particles, thereby obtaining a composition comprising AAV. In certain embodiments, the AAV particles are purified. In certain embodiments, AAV containing solutions are dialyzed into the final composition. In certain embodiments, the composition has a pH of about 6.9 to about 7.7, optionally, about 7.0 or about 7.4.

In exemplary aspects, the method comprises: a) combining sodium bicarbonate, polysorbate 80 (PS80), water and sodium chloride such that the final concentration is about 1 mM to about 40 mM sodium bicarbonate, about 100 mM to about 250 mM sodium chloride, about 0.0001% (w/w) to about 0.01% (w/w) polysorbate 80 (PS80) (additional ranges are disclosed in further detail above) and b) adding AAV, thereby obtaining a composition comprising AAV. In certain embodiments, the AAV particles are purified. In certain embodiments, AAV containing solutions are dialyzed into the final composition. In certain embodiments, the composition has a pH of about 6.9 to about 7.7, optionally, about 7.0 or about 7.4.

Non-limiting examples of purifying AAV can be found in, for example, WO2018128688 and the publication of PCT/US2018/067627.

Embodiments of the method of making the lyophilized AAV composition may also include producing the aqueous concentrate composition, which can be subsequently lyophilized.

In some embodiments, lyophilizing may also include increasing the temperature of the composition while the pressure surrounding the composition is reduced. For example, the temperature of the composition may be increased from a minimum temperature as described above to a temperature greater than the minimum temperature. In some cases, the temperature is increased to facilitate sublimation of the water in the composition at the reduced surrounding pressure.

Providing the composition in a container may facilitate maintaining the composition as a sterile composition. For instance, the container may be configured to maintain the composition enclosed in the container in a sterile environment. As such, the container may be a sealed container, for example the container may include a seal, such as a water-tight and/or an air-tight seal. The seal may be removable from the container to allow a user access to the contents of the container. In some instances, the seal may be a frangible seal, or in other instances, the seal may be configured to allow insertion of a needle, cannula or syringe into the interior of the container without removing the seal from the container. In some cases, a seal configured to allow access to the interior of the container without removing the seal from the container may facilitate maintaining the contents of the container (e.g., the composition in the container) in a sterile environment prior to administration of the composition to a subject. Suitable materials for the seal include, for example, rubber or polymer seals, such as, but not limited to, silicone rubber, natural rubber, styrene butadiene rubber, ethylene-propylene copolymers, polychloroprene, polyacrylate, polybutadiene, polyurethane, styrene butadiene, and the like, and combinations thereof. For example, in certain embodiments, the seal can be a septum pierceable by a needle, syringe, or cannula. The seal may also provide convenient access to a sample in the container, as well as a protective barrier that overlies the opening of the container. In some instances, the seal can be a removable seal, such as a threaded or snap-on cap or other suitable sealing element that can be applied to the opening of the container. For instance, a threaded cap can be screwed over the opening before or after a sample has been added to the container.

In some cases, the container can be a unit dosage container. A unit dosage container refers to a container that contains one or more unitary dosages for administration to a subject. In some embodiments, a unit dosage container includes a predetermined quantity of a subject composition calculated in an amount sufficient to produce a desired effect in a subject. Certain embodiments of the compositions may be provided in a unit dosage container suitable for individual administration of precise dosages. The amount of active composition administered to a subject may depend on the subject being treated, the severity of the affliction, and the manner of administration. For example, the unit dosage container may contain a quantity of the composition to be administered as disclosed herein in an amount effective to achieve the desired effect in the subject being treated. In certain instances, a unit dosage container includes a composition having AAV particles in a therapeutically effective amount. In certain embodiments, the unit dosage container can be a vial. In some cases, the vial can be a sealed vial (e.g., as described above regarding a sealed container).

The container may be composed of any convenient material that can be compatible with the AAV and other components of the composition. For example, the container can be a solid-compatible container configured to contain a solid (e.g., a lyophilized composition). In some instances, the container can be a liquid-compatible container configured to contain a liquid. Containers may also be solid and liquid compatible, where the container can be configured to contain solids and liquids. In some cases, a liquid in the container may be an aqueous liquid, and in these cases, the container may be compatible with aqueous compositions. By "compatible" is meant that the container is substantially inert (e.g., does not significantly react with) the liquid and/or compositions or other components in contact with the container. Examples of suitable container materials include, but are not limited to, glass and plastic. For example, the container may be composed of glass, such as, but not limited to, silicate glass, borosilicate glass, sodium borosilicate glass (e.g., PYREX™), fused quartz glass, fused silica glass, and the like. Other examples of suitable container materials for the container include plastics, such as, but not limited to, polypropylene, polymethylpentene, polytetrafluoroethylene (PTFE), perfluoroethers (PFE), fluorinated ethylene propylene (FEP), perfluoroalkoxy alkanes (PFA), polyethylene terephthalate (PET), polyethylene (PE), polyetheretherketone (PEEK), polystyrene, and the like. In certain instances, as described above, the container can be a vial, and as such may be a glass vial. As described above, the container may be a sealed container, and as such may be a sealed glass vial.

In exemplary aspects, the volume of the composition comprising AAV placed into the glass or plastic container can be about 0.1 ml to about 10 ml, about 0.1 ml to about 5 ml, about 0.2 ml to about 6 ml, about 0.2 ml to about 5 ml, about 0.25 ml to about 5 ml, about 2 ml to about 5 ml, about 2.5 ml to about 5 ml, about 3 ml to about 5 ml, about 4 ml to about 5 ml, about 5 ml to about 10 ml, about 6 ml about 9 ml or about 7 ml to about 8 ml. In exemplary aspects, the volume about 0.1 ml about 0.2 ml, about 0.25 ml, about 0.3 ml, about 0.4 about 0.5 ml, about 0.6 ml, about 0.7 ml. about 0.75 ml, about 0.8 ml, about 0.9 ml, about 1 ml, about 2 ml, about 2.5 ml, about 3 ml, about 4 ml, about 5 ml, about 5.5 ml, about 5.6 ml, about 6 ml, about 7 ml, about 7.5 ml, about 8 ml, about 9 ml, or about 10 ml.

In exemplary aspects, the composition comprising AAV can be stored at a temperature of about −80° C. to about −10° C. for at least 1 month (e.g., at least 2 months, at least 3 months, at least 4 months, at least 5 months, at least 6 months). In exemplary aspects, the composition comprising AAV can be stored at a temperature of about −60° C. to about −20° C. for at least 1 month (e.g., at least 2 months, at least 3 months, at least 4 months, at least 5 months, at least 6 months). In exemplary aspects, the composition comprising AAV can be stored for 3, 4, 5, or 6 months or longer. Methods of storing the composition are described herein (see, e.g., Examples 1 to 3). In exemplary aspects, greater than 80% of the initial amount of AAV (e.g., the amount of AAV in the composition prior to storage) can be potent after the storage period (e.g., a storage period of about 3 months, about 4 months, about 5 months, or about 6 months or longer). In exemplary aspects, greater than 90% of the initial amount of AAV can be potent after the storage period (e.g., a storage period of about 3 months, about 4 months, about 5 months, or about 6 months or longer). In exemplary aspects, greater than 95% of the initial amount of AAV can be potent after the storage period (e.g., a storage period of about 3 months, about 4 months, about 5 months, or about 6 months or longer). In exemplary aspects, the biopotency of the AAV at the end of the storage period can be substantially the same as the biopotency of the AAV at the beginning of the storage period. In exemplary aspects, the biopotency of the AAV at the end of the storage period can be increased relative to the biopotency of the AAV at the beginning of the storage period. In exemplary aspects, the appearance of the composition at the end of the storage period can be substantially the same as the composition at the beginning of the storage period. In exemplary aspects, the appearance of the composition at the end of the storage period can be characterized by having no visible particles. In exemplary aspects, the particle concentration of the composition at the end of the storage period can be substantially the same as the particle concentration of the composition at the beginning of the storage period. In exemplary aspects, the particle concentration of the composition at the end of the storage period can be determined by microflow imaging (MFI).

Methods of treating a subject for a disorder treatable by gene therapy are provided by the present disclosure. In exemplary aspects, the method comprises administering to the subject a pharmaceutical composition as described herein in an amount effective to treat a disease or disorder, and the method comprises administering to the subject a pharmaceutical composition of the present disclosure in an amount effective to treat the disease or disorder.

In exemplary aspects, the disease or disorder can be a neurological or neurodegenerative disorder (e.g., multiple sclerosis ("MS"), AIDS-related neurodegeneration and Alzheimer's disease, infectious meningitis, encephalomyelitis, Parkinson's disease, Huntington's disease, Hunter disease, Friedrich's ataxia, spinocerebellar ataxia, amyotrophic lateral sclerosis, encephalitis, prion disease, motor neuron disease, or spinal muscular atrophy) and the method comprises administering to the subject a pharmaceutical composition of the present disclosure in an amount effective to treat the neurodegenerative disorder. In certain embodiments, neurological or neurodegenerative disorder is a disease or disorder that affects neurons. In certain embodiments, neurological or neurodegenerative disorders result in progressive degeneration and/or death of neurons. In certain embodiments, the neurological or neurodegenerative disorder can be caused by, for example, pesticides, fungicides, insecticides, metals (e.g., arsenic, lead, manganese), chemicals used in industry or consumer products (e.g., polychlorinated biphenyls (PCBs) and polybrominated diphenyl ethers (PBDEs)), air and/or water pollution, biological factors (e.g., endotoxins produced by bacteria), and/or dietary and lifestyle factors (e.g., caffeine, tobacco smoke, dietary antioxidants).

In exemplary aspects, the disease or disorder can be an eye disease (e.g. retinal vascular disease, retina degeneration or cornea degeneration), and the method comprises administering to the subject a pharmaceutical composition of the present disclosure in an amount effective to treat the neurodegenerative disorder.

In exemplary aspects, the disease or disorder can be C1-inhibitor deficit, pulmonary hypertension, Pompe disease, Fabry disease, Gaucher disease, or Alpha-1 Antitrypsin deficiency), and the method comprises administering to the subject a pharmaceutical composition of the present disclosure in an amount effective to treat the neurodegenerative disorder.

In exemplary aspects, the disease or disorder can be a bleeding disorder (e.g., hemophilia A, B, or C, Von Willebrand disease (VWD), factor deficiencies such as I, II, V, VII, VIII, IX, X, XI, XII and XIII) and the method comprises administering to the subject a pharmaceutical composition of the present disclosure in an amount effective to treat the bleeding disorder. In certain embodiments, the bleeding disorder can be inherited. In certain embodiments, the bleeding disorder can be acquired. In certain embodiments, the bleeding disorder can be caused by anemia, cirrhosis of the liver, HIV, leukemia and vitamin K deficiency.

In exemplary aspects, the methods comprise administering the pharmaceutical composition by parenteral administration. The term, "parenteral" means not through the alimentary canal but by some other route. For example, the compositions disclosed herein may be formulated for administration via known methods, such as intravenous administration (e.g., as a bolus or by continuous infusion over a period of time), by intramuscular, intraperitoneal, intracerebroventricular, intracerobrospinal, subcutaneous, intra-articular, intrasynovial, intrathecal, intravitreal, intraparenchymal, oral, topical, or inhalation routes. In certain embodiments, the AAV compositions provided herein can be administered either systemically or locally. Systemic administration includes, without limitation: oral, subdermal, intraperitoneal, subcutaneous, transnasal, sublingual, or rectal routes of administration. Local administration includes, without limitation: topical, subcutaneous, intramuscular, and intraperitoneal routes of administration. In certain embodiments, the route of administration can be via intracerebroventricular injection. In certain embodiments, the route of administration can be via intraparenchymal injection.

Methods of administering AAV for gene therapy of a subject are known in the art. See, e.g., Monahan, Gene therapy in an era of emerging treatment options for hemophilia B, J Thromb Haemost. 2015 June; 13(0 1): S151-S160.

Reconstituted compositions of the present disclosure may be administered to a subject, for example by injection or intravenously. In these embodiments, prior to administration of the reconstituted composition to a subject, a solid composition, e.g., as described above, may be combined with a liquid to provide a liquid composition suitable for administration, for example by injection or intravenously. In some cases, prior to administration of the composition to a subject, a solid composition may be combined with water (e.g., water for injection, WFI) or buffer/buffering agent to provide an aqueous composition suitable for administration, for example by injection or intravenously. For instance, a lyophilized composition may be reconstituted with water (e.g., water for injection, WFI) or buffer/buffering agent to produce a reconstituted dosage unit suitable for administration to a subject, for example by injection or intravenously.

In certain embodiments, the reconstituted dosage unit has a pH compatible with physiological conditions. In some cases, the pH of the reconstituted dosage unit ranges from 6 to 8. In some cases, the pH of the reconstituted dosage unit ranges from 7 to 8. For example, the pH of the reconstituted dosage unit may range from 7 to 7.5. In some cases, the pH of the reconstituted dosage unit can be 7.0. In some cases, the pH of the reconstituted dosage unit can be 7.1. In some cases, the pH of the reconstituted dosage unit can be 7.2. In some cases, the pH of the reconstituted dosage unit can be 7.3. In some cases, the pH of the reconstituted dosage unit can be 7.4.

The reconstituted dosage unit may include a predetermined quantity of the composition of the present disclosure calculated in an amount sufficient to produce a desired therapeutic effect in a subject. The amount of the composition in a reconstituted dosage unit that is administered to a subject may depend on the subject being treated, the severity of the affliction, and the manner of administration. For example, the reconstituted dosage unit may include a quantity of the composition to be administered as disclosed herein in a therapeutically effective amount.

When administered to a subject, the liquid or reconstituted dosage unit may include a therapeutically effective amount of the AAV such that the reconstituted dosage unit delivers from 1E+10 cp/ml to 5E+15 cp/ml or 1E+10 cp/ml to 5E+15 cp/ml.

In certain embodiments, the method includes administering the liquid or reconstituted dosage unit to the subject according to a treatment regimen. For example, in some cases, a subject to be treated may have been prescribed a treatment regimen from a health care provider. In some cases, a treatment regimen includes, but is not necessarily limited to, administration five times per day, four times per day, three times per day, twice per day, once per day, three times per week, twice per week, once per week, once every two weeks, once every three weeks, once per month, once every 5 weeks, once every 6 weeks, once every 7 weeks, once every other month, and any combination thereof.

In some embodiments, the treatment regimen includes administering one or more doses over an extended period of time. In certain cases, a single dose (e.g., a single dosage unit) can be administered to the subject, and the initial dose may be followed by one or more doses administered to the subject at a subsequent time. In some instances, more than one dose (e.g., more than one dosage unit) can be administered to the subject, and the initial doses may be followed by one or more doses administered to the subject at a subsequent time. For example, a single dose (e.g., a single dosage unit) may be administered to the subject, and the single dose may be followed by a single dose administered to the subject at a subsequent time. Additional single doses may be administered at subsequent points in time. In other cases, a single dose (e.g., a single dosage unit) may be administered to the subject, and the single dose may be followed by two doses administered to the subject at a subsequent time. Additional single or multiple doses may be administered at subsequent points in time.

In certain embodiments, reconstituted dosage units of the present disclosure can be administered prior to, concurrent with, or subsequent to other active agents for treating related or unrelated conditions, e.g., in combination therapy. Examples of such additional therapies include radiation therapies, surgical therapies and chemotherapeutic therapies. If provided at the same time as other active agents, reconstituted dosage units of the present disclosure can be provided in the same or in a different composition. For example, concurrent therapy may be achieved by administering a reconstituted dosage unit and a pharmaceutical composition having at least one other active agent, such as a chemotherapeutic agent, which in combination provide a therapeutically effective dose, according to a particular treatment regimen. Administration of separate pharmaceutical compositions can be performed simultaneously or at different times (e.g., sequentially, in either order, on the same day, or on different days), as long as a therapeutically effective effect of the combination of these substances is caused in the subject undergoing therapy.

Accordingly, aspects of the present disclosure further include combination therapies. In certain embodiments, the subject method includes administering a therapeutically effective amount of one or more additional active agents. By combination therapy is meant that an AAV composition (e.g., as described herein) can be used in a combination with another therapeutic agent to treat a single disease or condition. In certain embodiments, a compound of the present disclosure is administered concurrently with the administration of another therapeutic agent, which can be administered as a component of a composition including the compound of the present disclosure or as a component of a different composition. In certain embodiments, a composition including a compound of the present disclosure is administered prior or subsequent to administration of another therapeutic agent.

The following examples are given merely to illustrate the present invention and not in any way to limit its scope.

EXAMPLES

Example 1

This example was conducted to develop compositions for intracerebroventricular (ICV), intravitreal (IV) as well as intrathecal (IT) admission of AAV vectors directly into the brain investigations. Seven different buffer formulations were manufactured to determine which of the buffer formulations work best with the different AAV serotypes. A Reference composition (PBS+0.001% Pluronic F-68; Formulation 5) was used as a control for comparison.

TABLE 1

Buffer Formulation 1

| Excipient | MW [g/mol] | Concentration | g/kg buffer |
|---|---|---|---|
| L-histidine | 155.2 | 10 mM | 1.55 |
| NaCl | 58.44 | 154 mM | 9 |
| Sucrose | 342.3 | 5 mM | 1.71 |
| Croda super refined Tween 80 | n.a. | 0.003% (w/w) | 0.03 |
| Purified water | | add to 1 kg | |
| pH value | | target: 7.0 ± 0.1 | |

TABLE 2

Buffer Formulation 2

| Excipient | MW [g/mol] | Concentration | g/kg buffer |
|---|---|---|---|
| L-histidine | 155.2 | 50 mM | 7.76 |
| NaCl | 58.44 | 154 mM | 9 |

TABLE 2-continued

Buffer Formulation 2

| Excipient | MW [g/mol] | Concentration | g/kg buffer |
|---|---|---|---|
| Croda super refined Tween 80 | n.a. | 0.003% (w/w) | 0.03 |
| Purified water | | add to 1 kg | |
| pH value | | target: 7.0 ± 0.1 | |

TABLE 3

Buffer Formulation 3

| Excipient | MW [g/mol] | Concentration | g/kg buffer |
|---|---|---|---|
| Na Citrate | 258.07 | 10 mM | 2.58 |
| NaCl | 58.44 | 150 mM | 8.77 |
| Croda super refined Tween 80 | n.a. | 0.003% (w/w) | 0.03 |
| Purified water | | add to 1 kg | |
| pH value | | target: 7.0 ± 0.1 | |

TABLE 4

Buffer Formulation 4

| Excipient | MW [g/mol] | Concentration | g/kg buffer |
|---|---|---|---|
| $NaHCO_3$ | 84.007 | 20 mM | 1.68 |
| NaCl | 58.44 | 120 mM | 7.01 |
| Croda super refined Tween 80 | n.a. | 0.003% (w/w) | 0.03 |
| Purified water | | add to 1 kg | |
| pH value | | target 7.0 ± 0.1 | |

TABLE 5

Formulation 5 (Reference)

| Excipient | MW [g/mol] | Concentration | g/kg buffer |
|---|---|---|---|
| Sodium chloride | 58.44 | 136.9 mM | 8 |
| Potassium. chloride | 74.55 | 2.68 mM | 0.2 |
| Disodium hydrogen phosphate -Dihydrate | 177.99 | 8.09 mM | 1.44 |
| Monopotassium dihydrogen phosphate | 136.09 | 1.47 mM | 0.2 |
| Pluronic F + 68[5] | n.a. | 0.001% (w/w) | 0.01 |
| Purified water | | add to 1 kg | |
| pH value | | target: 7.4 ± 0.1 | |

TABLE 6

Buffer Formulation 6

| Excipient | MW [g/mol] | Concentration | g/kg buffer |
|---|---|---|---|
| L-histidine | 155.2 | 10 mM | 1.55 |
| NaCl | 58.44 | 154 mM | 9 |
| Glucose | 180.16 | 5 mM | 0.9 |
| Croda super refined Tween 80 | n.a. | 0.003% (w/w) | 0.03 |
| Purified water | | add to 1 kg | |
| pH value | | target: 7.0 ± 0.1 | |

Example 2

The stability of the AAV8 Gene Therapy material in five different buffer formulations from Example 1 stored in 10 ml SiO$_2$ glass vials at +5±3° C. for up to 4 months (0, 1, 2 and 4 months) and at ≤−60° C. (set point −80° C.) for up to 6 months (1, 2, 3 and 6 months) was investigated. For each time point, 2.8 ml was placed into separate 10 ml SiO$_2$ glass vials for the 0-month, 1-month (≤−60° C.), 4-months (+5±3° C.) and 6-months (≤−60° C.), and for all other time points 2.2 ml was used. This study was performed with end formulated and sterile filtrated AAV8 gene therapy material.

Materials and Methods

In this study the following equipment, devices and reagents were used:
AAV8 viral vectors
storage at +5±3° C.
storage at ≤−60° C.
10 ml Schott Type I vials and SiO2 layer
20R Serum NovaPure stopper
2 ml Schott Type I vials and SiO2 layer
13R Serum NovaPure stopper
Temperature measurement, Testo 112
Slide-A-Lyzer® 10K Dialysis Cassettes (Thermo Scientific)

The purified AAV8 viral vectors were aliquoted in parts of 20.5 ml for each buffer formulation investigated and dialyzed to formulations 1-6 (see Example 1 above). Dialysis was performed 3 times in the 100-fold volume in 12-30 ml Slide-A-Lyzer® 10K Dialysis Cassettes.

After the buffer change, the material was filled into 10 ml glass vials and were stored at either +5±3° C. or ≤−60° C. 2.8 ml were filled for 0 months, 1 month (≤−60° C.), 4 months (+5±3° C.) and 6 months (≤−60° C.). For all other testing time points 2.2 ml were used. 1 ml of each solution was filled into 2 ml glass vials, similar to the 10 ml vial, and their appearance was evaluated.

The AAV8 material was dialyzed to the buffer formulations shown below in Table 1 to Table 5. In addition, the AAV8 was also stored in glucose buffer formulation (Table 6) to investigate activity losses due to oxidation.

TABLE 7

| Storage Characterization | |
|---|---|
| Storage conditions during contamination: | +5 ± 3° C. and ≤−60° C. (set point −80° C.) |
| Number of lots: | 1 lot |
| Lot number: | AAV8: PP654_1706_FDP |
| Filling volume in 2 ml Schott vials: | 1 ml |

TABLE 7-continued

| Storage Characterization | |
|---|---|
| Storage conditions during contamination: | +5 ± 3° C. and ≤−60° C. (set point −80° C.) |
| Filling volume in 10 ml Schott vials: | 2.8 ml and 2.2 ml |
| Total number of samples (target): | 86 samples (78 samples + 8 reserve samples) |
| Transport Conditions for samples: | 0.5 ml and 1.5 ml Eppendorf protein LoBind tubes, samples were packed without any direct contact to dry ice |

TABLE 8

| Analytical Tests | |
|---|---|
| Quality Attribute | Detection by analytical method/principle |
| Activity | In vitro Biopotency<br>In vivo Biopotency<br>ITR-qPCR |
| Total particles titer (empty + full) | Total rAAV8 particles titer [ELISA] |
| AAV purity<br>Degradation | SDS-PAGE (fluorescence staining, 4-12% BisTris gel with Flamingo Stain)<br>nsTEM |
| Aggregation | SEC [Size exclusion HPLC] |
| General quality | WAX (ratio full/empty capsids)<br>Polysorbate 80 HPLC method<br>Appearance<br>pH value |

Results

Total Particles Titer (ELISA)

This method was used to determine intact adeno associated virus—serotype 8 (AAV8) particles with a sandwich-ELISA-system. A coating antibody was applied to a microplate. Afterwards, a solution with AAV8 particles was added. The AAV8 particles were captured by the antibody. In the next step, another antibody that detects AAV8 particles was added, this antibody was labeled. In the last step, the substrate was added in order to quantitate the titer amount. The total particle titer (ELISA) is described in WO/2018/160975, which is incorporated herein in its entirety for all intended purposes.

In general, all results generated for the AAV8 total particles titer (ELISA) demonstrated normal variation and the AAV8 particles remained stable for each buffer formulation and time point. Only Buffer Formulation 4 showed a decrease with storage at +5±3° C. (Table 9 and FIG. 1).

TABLE 9

| AAV8 Total Particles Titer (ELISA) | | | | | | |
|---|---|---|---|---|---|---|
| Formulation | 0 months | 1 month | 2 months | 3 months | 4 months | 6 months |
| Storage at +5 ± 3° C. | | | | | | |
| Formulation 6 | 9.75E+11 | 9.90E+11 | 9.69E+11 | | 9.00E+11 | |
| Formulation 1 | 1.02E+12 | 1.05E+12 | 9.65E+11 | | 9.10E+11 | |
| Formulation 2 | 1.05E+12 | 9.75E+11 | 9.74E+11 | | 9.70E+11 | |
| Formulation 3 | 1.05E+12 | 1.07E+12 | 9.94E+11 | | 1.01E+12 | |
| Formulation 4 | 9.65E+11 | 9.35E+11 | 6.47E+11 | | 6.10E+11 | |
| Reference | 1.01E+12 | 1.02E+12 | 9.36E+11 | | 9.46E+11 | |
| Storage at ≤−60° C. | | | | | | |
| Formulation 6 | 9.75E+11 | 1.05E+12 | 9.18E+11 | 1.03E+12 | | 9.6E+11 |
| Formulation 1 | 1.02E+12 | 1.08E+12 | 8.95E+11 | 1.10E+12 | | 1.0E+12 |
| Formulation 2 | 1.05E+12 | 1.08E+12 | 8.96E+11 | 1.08E+12 | | 1.0E+12 |

TABLE 9-continued

| | AAV8 Total Particles Titer (ELISA) | | | | | |
|---|---|---|---|---|---|---|
| Formulation | 0 months | 1 month | 2 months | 3 months | 4 months | 6 months |
| Formulation 3 | 1.05E+12 | 1.07E+12 | 1.96E+12 | 1.07E+12 | | 9.9E+11 |
| Formulation 4 | 9.65E+11 | 1.03E+12 | 9.19E+11 | 1.02E+12 | | 9.0E+11 |
| Reference | 1.01E+12 | 1.06E+12 | 9.56E+11 | 1.07E+12 | | 9.1E+11 |

In Vivo Biopotency

The in vivo potency assay was performed in hemophilic mice. To measure the in vivo biopotency caused by transgene expression, 6 to 8 male and 6 to 8 week-old FVIII knock out male mice per dose group received the AAV8 Factor VIII (AAV8-FVIII) final drug product ($4 \times 10^{12}$ cp/kg in 100 µL buffer formulation) via lateral tail vein injection of the AAV8 vector.

Two weeks after administration, the mice were anesthetized, and blood was drawn from the retro-orbital plexus. Citrated plasma was prepared and assayed for Factor VIII cofactor activity by chromogenic assay. The results were given in International Units per milliliter (IU/mL). The in vivo Biopotency assay is also described in WO/2018/160975, which is incorporated herein in its entirety for all intended purposes.

Figure 2:
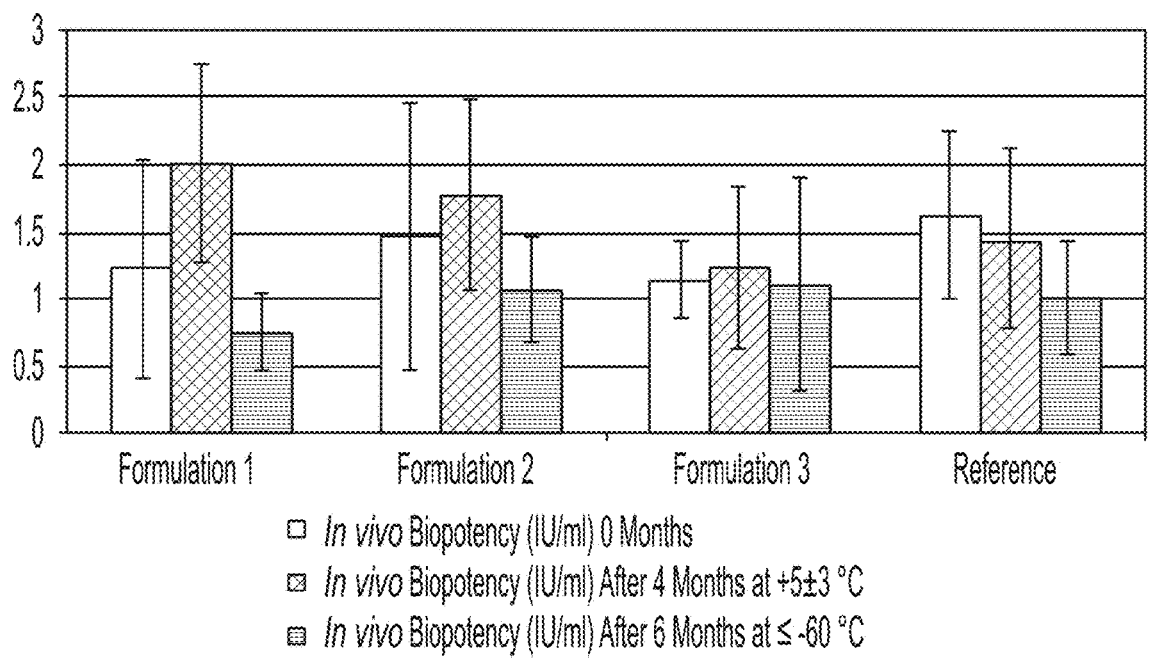
FIG. 2 is a graph depicting the in vivo biopotency (IU/ml) of AAV8 particles during storage at +5±3° C. for up to 4 months and at ≤−60° C. for up to 6 months.

Buffer Formulations 1-3 demonstrated results with normal variation, while the Reference buffer showed a tendency to decrease potency (Table 10 and FIG. 2).

TABLE 10

| | In Vivo Biopotency (IU/ml) ± SD | | |
|---|---|---|---|
| Formulation | 0 months | 4 months | 6 months |
| Storage at +5 ± 3° C. (Day 14) | | | |
| Formulation 6 | | | |
| Formulation 1 | 1.23 ± 0.8 | 2.01 ± 0.74 | |
| Formulation 2 | 1.47 ± 1 | 1.78 ± 0.7 | |
| Formulation 3 | 1.15 ± 0.3 | 1.24 ± 0.6 | |
| Formulation 4 Reference | 1.62 ± 0.62 | 1.45 ± 0.67 | |
| Storage at ≤−60° C. (Day 14) | | | |
| Formulation 6 | | | |
| Formulation 1 | 1.23 ± 0.8 | | 0.76 ± 0.29 |
| Formulation 2 | 1.47 ± 1 | | 1.07 ± 0.40 |
| Formulation 3 | 1.15 ± 0.3 | | 1.11 ± 0.80 |
| Formulation 4 Reference | 1.62 ± 0.62 | | 1.01 ± 0.42 |

In Vitro Biopotency

In vitro biopotency assays of AAV8-FVIII gene therapy vectors were performed in the human hepatic cell line HepG2. After treatment with hydroxyurea, cells were infected with AAV8-FVIII vectors in the presence of von Willebrand factor (VWF) and 5-N-ethyl-N-isopropyl-amiloride (EIPA) and incubated for 96±3 hours. During the incubation, FVIII was expressed and released into the cell supernatant and FVIII-activity was determined by chromogenic endpoint measurement. Each assay run includes a reference curve of purified AAV8-FVIII vector material. The in vitro biopotency assay is described in greater detail in WO/2018/160975, which is incorporated herein by reference for all intended purposes.

Figure 3:
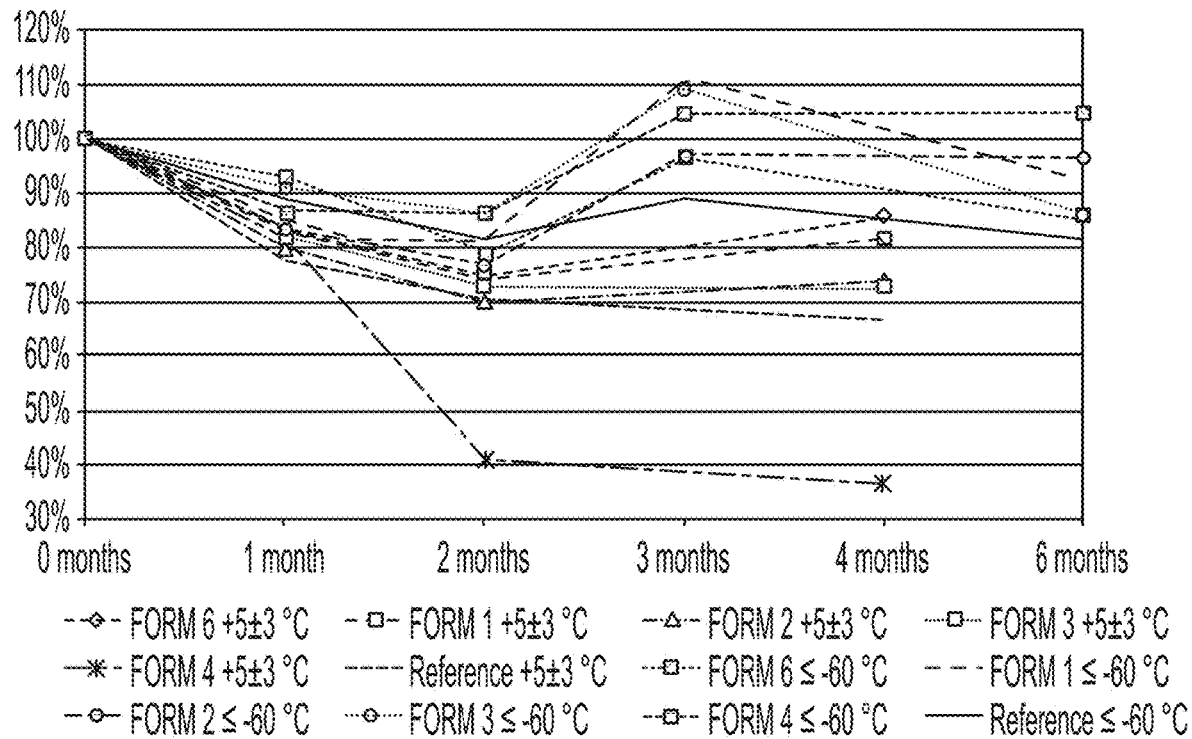
FIG. 3 is a graph of the percent recovery of total AAV8 particles as measured by in vitro biopotency after storage at +5±3° C. for up to 4 months and at ≤−60° C. for up to 6 months.

All results generated for the in vitro biopotency assay showed normal variation (±0.5 log), and the AAV8 vectors remained stable for each buffer formulation and time point. Only Buffer Formulation 4 showed a decrease upon storage at +5±3° C. (Table 11 and FIG. 3).

TABLE 11

| | In Vitro Biopotency (BRU/ml) | | | | | |
|---|---|---|---|---|---|---|
| Formulation | 0 months | 1 month | 2 months | 3 months | 4 months | 6 months |
| Storage at +5 ± 3° C. | | | | | | |
| Formulation 6 | 0.28 | 0.23 | 0.21 | | 0.24 | |
| Formulation 1 | 0.27 | 0.23 | 0.20 | | 0.22 | |
| Formulation 2 | 0.30 | 0.24 | 0.21 | | 0.22 | |
| Formulation 3 | 0.22 | 0.18 | 0.16 | | 0.16 | |
| Formulation 4 | 0.22 | 0.18 | 0.09 | | 0.08 | |
| Reference | 0.27 | 0.21 | 0.19 | | 0.18 | |
| Storage at ≤−60° C. | | | | | | |
| Formulation 6 | 0.28 | 0.26 | 0.22 | 0.27 | | 0.24 |
| Formulation 1 | 0.27 | 0.22 | 0.22 | 0.30 | | 0.25 |
| Formulation 2 | 0.30 | 0.25 | 0.23 | 0.29 | | 0.29 |
| Formulation 3 | 0.22 | 0.20 | 0.24 | 0.24 | | 0.19 |
| Formulation 4 | 0.22 | 0.19 | 0.19 | 0.23 | | 0.23 |
| Reference | 0.27 | 0.24 | 0.22 | 0.24 | | 0.22 |

ITR-qPCR

For ITR-qPCR for FVIII, the vector genome titer (vg) per milliliter (ml) was determined using a TaqMan based qPCR with primers and a fluorescently labeled probe detecting a sequence within the ITR sequences of the vector genome. For detecting the ITR-specific sequence in the AAV particle the samples were treated with DNAse I and, after a subsequent Proteinase K step, the scAAV genome was released from the capsid. Finally, restriction enzyme digest with SmaI was performed to resolve AAV ITR T-shape structures. The ITR-qPCR assay is described in WO/2018/160975, which is incorporated herein in its entirety for all intended purposes.

Figure 4:
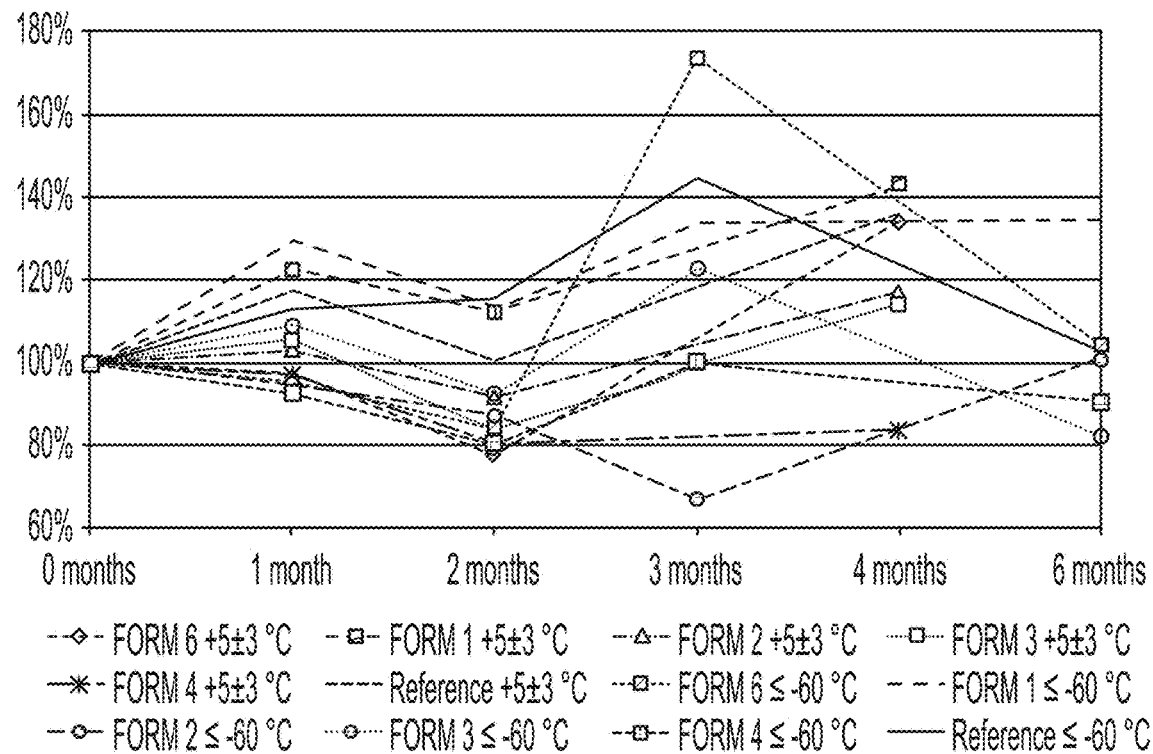
FIG. 4 is a graph of the percent recovery of total AAV8 particles as measured with ITR-qPCR after storage at +5±3° C. for up to 4 months and at ≤−60° C. for up to 6 months.

Test results showed a ±0.5 log variation for the ITR-qPCR assay for each buffer formulation and each time point during storage at +5±3° C. and ≤−60° C. (set point −80° C.) (Table 12 and FIG. 4).

TABLE 12

| | ITR-qPCR (vg/ml) | | | | |
|---|---|---|---|---|---|
| Formulation | 0 months | 1 month | 2 months | 3 months | 4 months | 6 months |
| Storage at +5 ± 3° C. | | | | | |
| Formulation 6 | 2.96E+12 | 2.87E+12 | 2.31E+12 | | 3.97E+12 | |
| Formulation 1 | 2.38E+12 | 2.92E+12 | 2.68E+12 | | 3.42E+12 | |
| Formulation 2 | 3.00E+12 | 3.10E+12 | 2.75E+12 | | 3.51E+12 | |
| Formulation 3 | 3.13E+12 | 3.31E+12 | 2.61E+12 | | 3.57E+12 | |
| Formulation 4 | 2.78E+12 | 2.69E+12 | 2.23E+12 | | 2.33E+12 | |
| Reference | 2.43E+12 | 2.86E+12 | 2.44E+12 | | 3.31E+12 | |
| Storage at ≤−60° C. | | | | | |
| Formulation 6 | 2.96E+12 | 2.82E+12 | 2.50E+12 | 5.14E+12 | | 3.09E+12 |
| Formulation 1 | 2.38E+12 | 3.08E+12 | 2.70E+12 | 3.18E+12 | | 3.20E+12 |
| Formulation 2 | 3.00E+12 | 2.84E+12 | 2.62E+12 | 2.02E+12 | | 3.02E+12 |
| Formulation 3 | 3.13E+12 | 3.41E+12 | 2.89E+12 | 3.85E+12 | | 2.58E+12 |
| Formulation 4 | 2.78E+12 | 2.58E+12 | 2.24E+12 | 2.79E+12 | | 2.52E+12 |
| Reference | 2.43E+12 | 2.74E+12 | 2.81E+12 | 3.51E+12 | | 2.51E+12 |

Aggregates

Aggregates were analyzed by size-exclusion high-performance liquid chromatography (SE-HPLC). Size exclusion chromatography (SE-HPLC) was used to separate analytes based on their hydrodynamic diameter. Larger molecules cannot or can only partially penetrate the pores of the column packing material, whereas smaller molecules can access most or all pores. Thus, large particles elute first and smaller particles elute later.

Adeno-associated viruses can assemble to aggregates. With the described method, aggregates can be separated from the monomers and quantified. The amount of Aggregates and Monomers, which together totals 100%, was detected by means of intrinsic fluorescence and calculated as percentages of total peak area.

Figure 5:
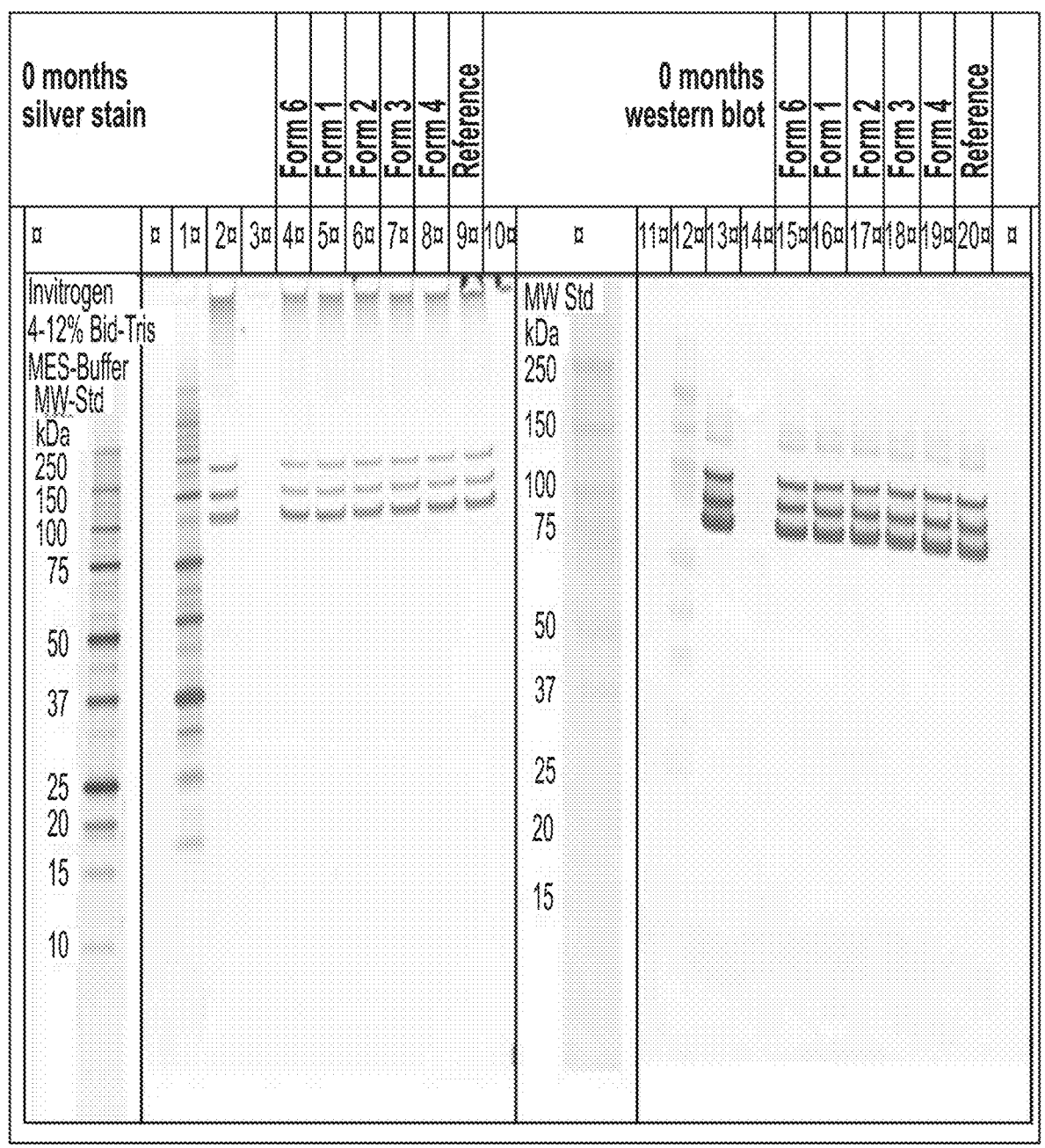
FIG. 5 is an SDS-PAGE silver staining and western blot of AAV8 particles at the 0-month time point.
Figure 6:
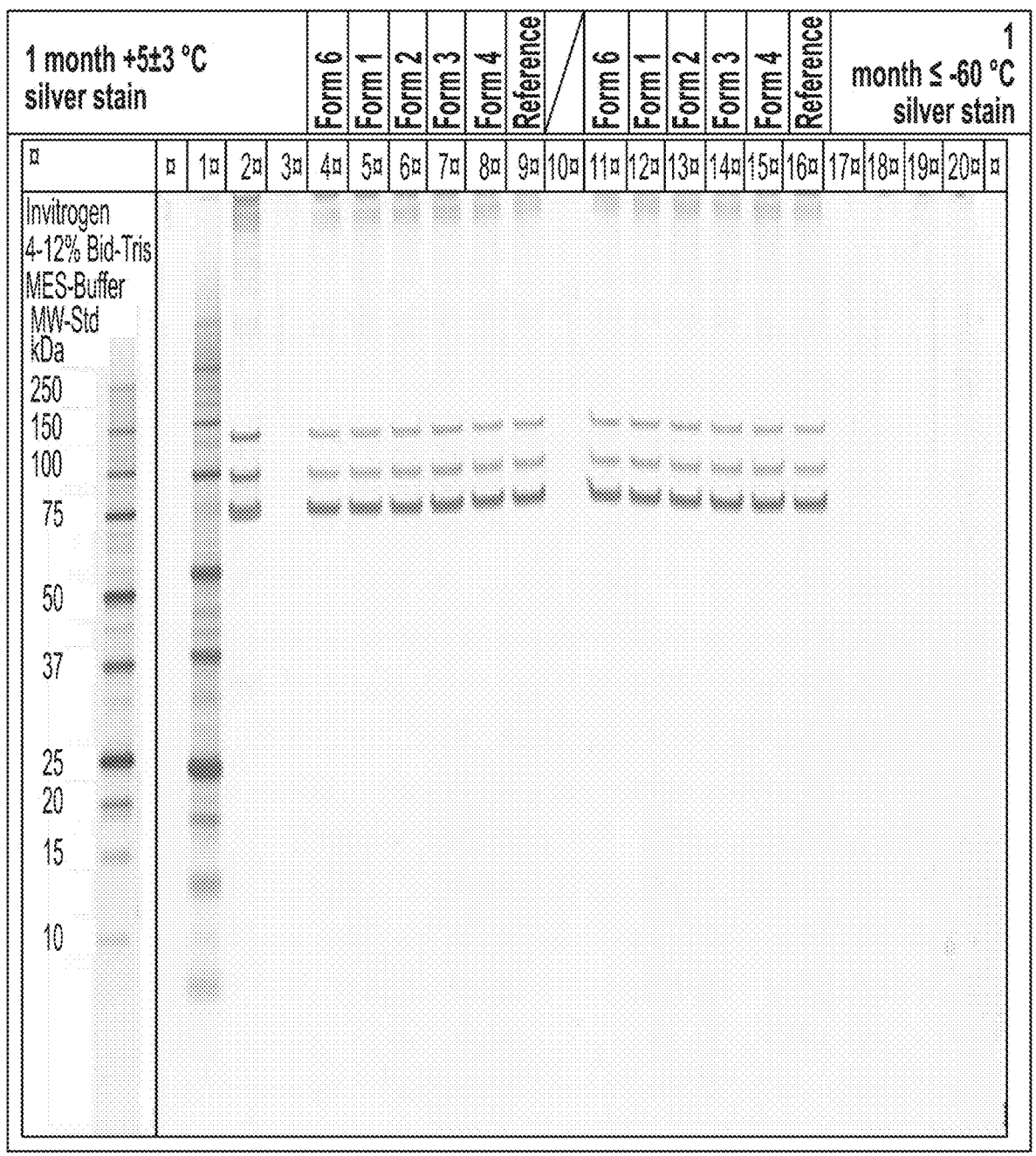
FIG. 6 is an SDS-PAGE silver staining of AAV8 particles at the 1-month time point after storage at +5±3° C. or ≤−60° C.
Figure 7:
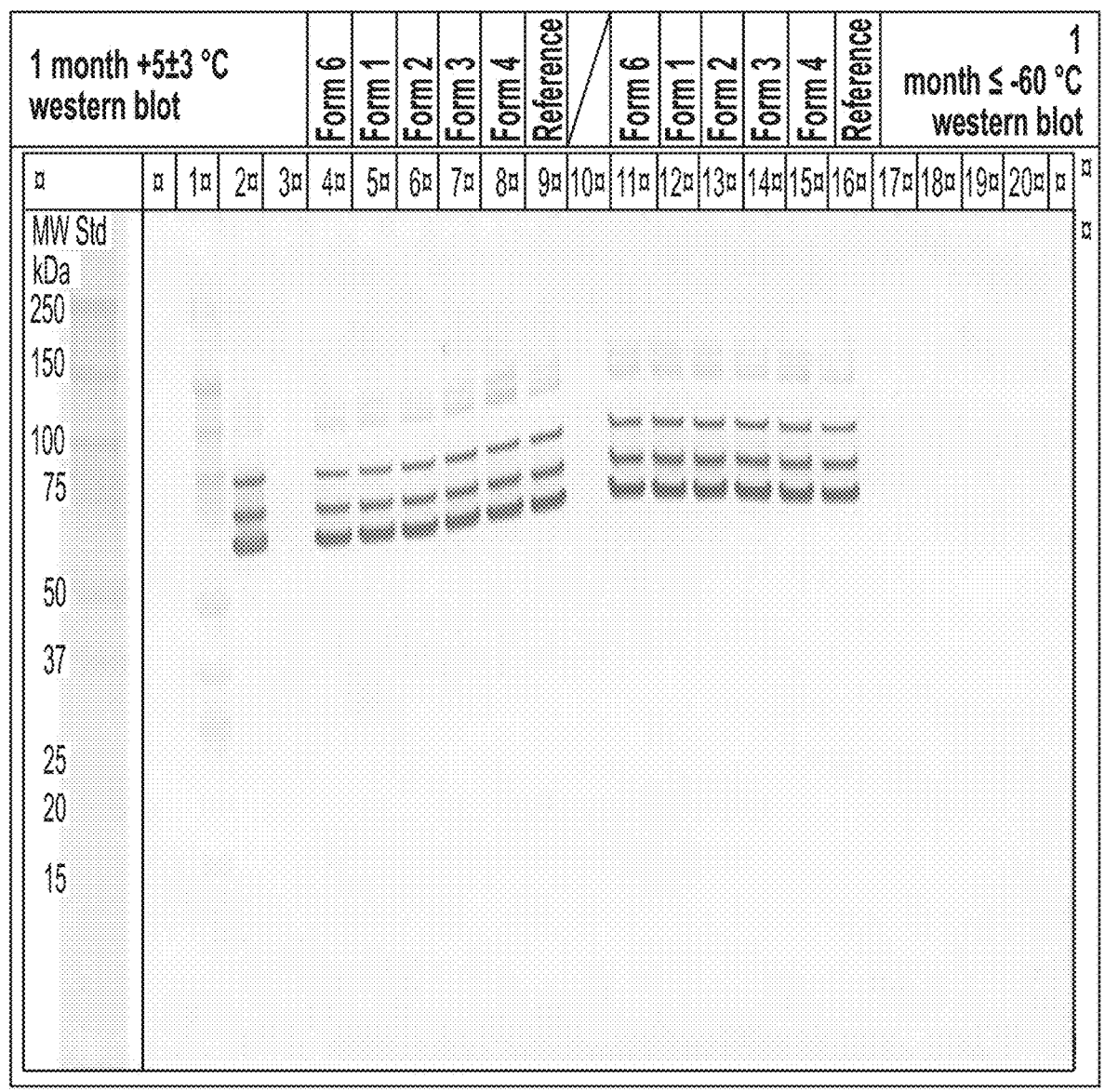
FIG. 7 is an SDS-PAGE western blot of AAV8 particles at the 1-month time point after storage at +5±3° C. or ≤−60° C.
Figure 8:
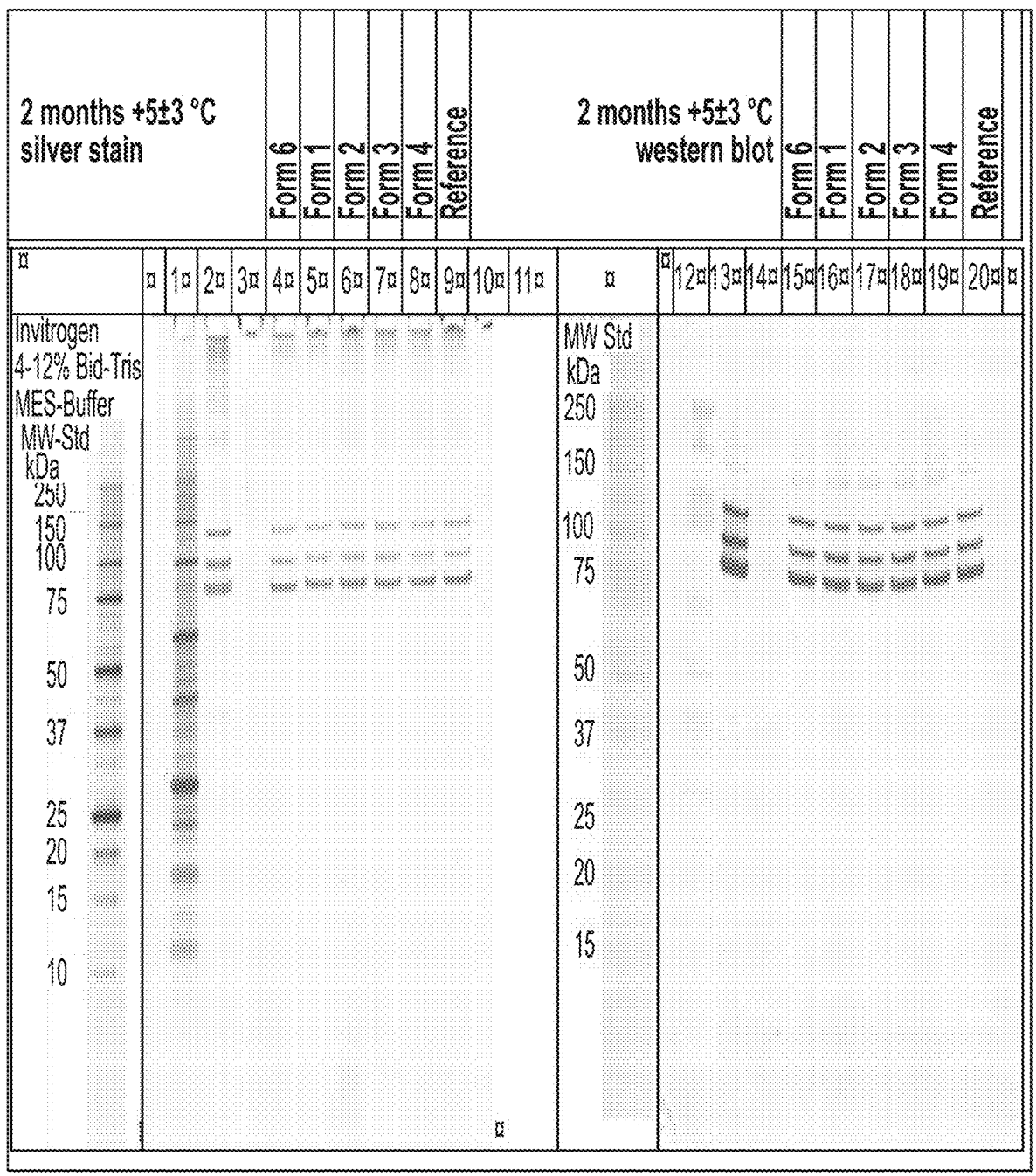
FIG. 8 is an SDS-PAGE silver staining and western blot of AAV8 particles at the 2-month time point after storage at +5±3° C.
Figure 9:
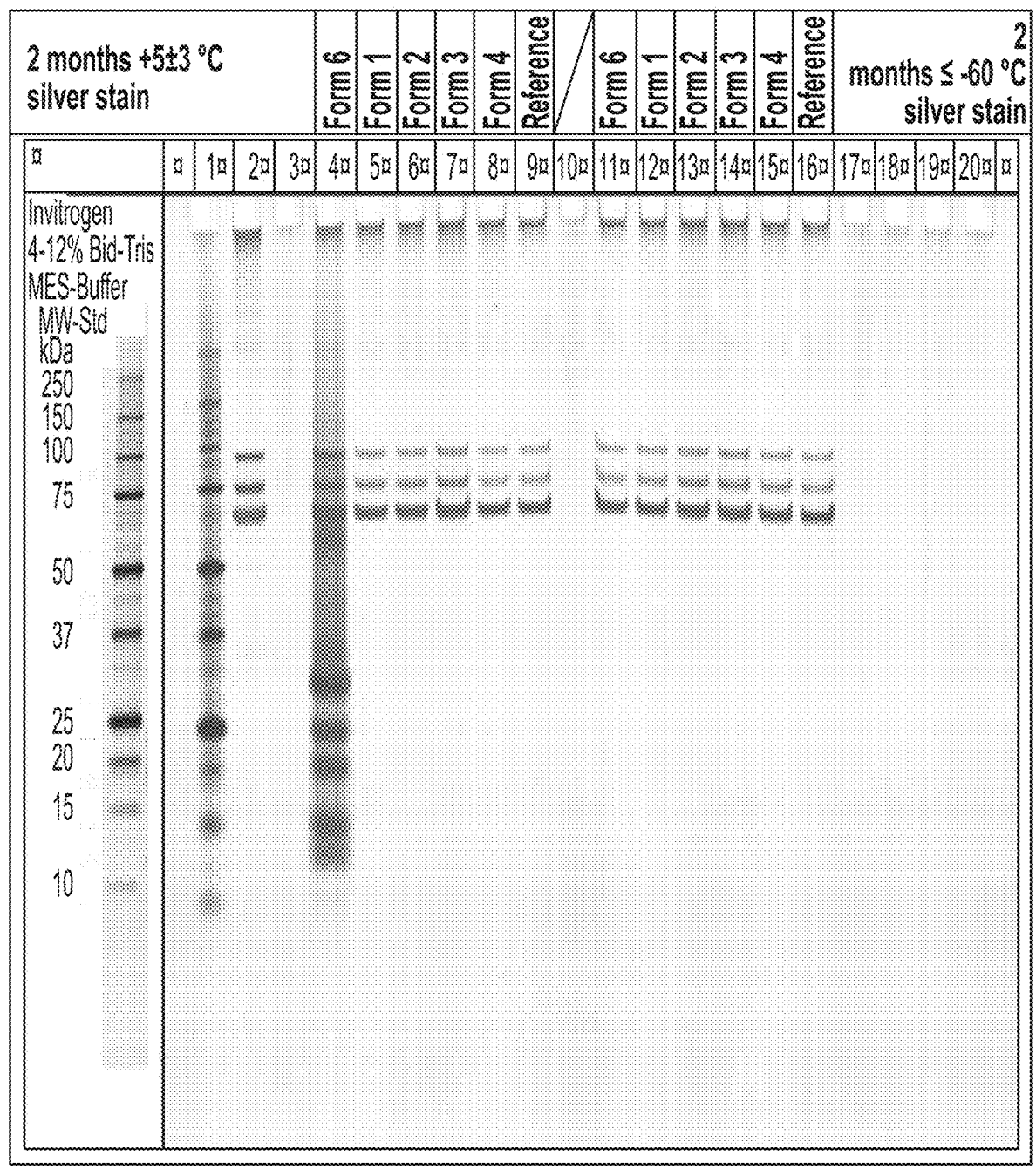
FIG. 9 is an SDS-PAGE silver staining of AAV8 particles at the 2-month time point after storage at +5±3° C. or ≤−60° C.

Neither a decrease nor increase can be seen for aggregates with the different buffer formulations and time points. Only Buffer Formulation 4 stored at +5±3° C. decreased from 4.2% to 2.9% (Table 13 and FIG. 5), which can be explained by the fact that the ELISA assay demonstrated a decrease in the AAV8 total particles titer values for the same samples.

TABLE 13

| | Aggregates (%) | | | | |
|---|---|---|---|---|---|
| Formulation | 0 months | 1 month | 2 months | 3 months | 4 months | 6 months |
| Storage at +5 ± 3° C. | | | | | |
| Formulation 6 | 3.3 | 3.4 | 3.4 | | 3.5 | |
| Formulation 1 | 3.1 | 2.8 | 3.2 | | 3.3 | |
| Formulation 2 | 3.5 | 3.0 | 3.1 | | 3.2 | |
| Formulation 3 | 3.5 | 3.2 | 3.8 | | 4.1 | |
| Formulation 4 | 4.2 | 3.3 | 4.1 | | 2.9 | |
| Reference | 3.4 | 2.8 | 3.3 | | 3.4 | |
| Storage at ≤−60° C. | | | | | |
| Formulation 6 | 3.3 | 3.7 | 3.9 | 3.1 | | 3.2 |
| Formulation 1 | 3.1 | 2.9 | 3.3 | 2.4 | | 3.1 |
| Formulation 2 | 3.5 | 3.2 | 3.5 | 3.0 | | 3.3 |
| Formulation 3 | 3.5 | 3.4 | 3.6 | 3.0 | | 3.6 |
| Formulation 4 | 4.2 | 3.4 | 4.1 | 3.4 | | 3.6 |
| Reference | 3.4 | 2.9 | 3.4 | 2.8 | | 3.2 |

Density

Density is necessary for exact dilution to a defined value of the potency of the product and for filling the correct value into the final container.

TABLE 14

| Density (g/ml) | |
| --- | --- |
| AAV8 in Different Formulations | [g/ml] |
| Formulation 6 | 1.0056 |
| Formulation 1 | 1.0059 |
| Formulation 2 | 1.0077 |
| Formulation 3 | 1.0066 |
| Formulation 4 | 1.0043 |
| Reference | 1.0054 |

Osmolality

The Osmolality of the cerebrospinal fluid is about 295 [mOsmol/kg]. Administration of a substance with a higher or lower osmolality that cerebrospinal fluid can negatively influence the pressure in cells that are in contact with the injected solution, which can result in the generation of necrotic cells. Based on the Osmolality values shown in Table 15, each of the formulations can be used for e.g., Intracerebroventricular (ICV), Intravitreal (IVT), Intrathecal (IT) as well as Intravenous (IV), Sub-cutaneous (SC) or Intramuscular (IM) admission.

TABLE 15

| Osmolality (mOsmol/kg) | |
| --- | --- |
| Formulation | [mOsmol/kg] |
| 1 | 305 |
| 2 | 347 |
| 3 | 320 |
| 4 | 259 |
| 6 | 305 |
| Reference | 288 | pH pH values did not show any significant changes during the storage periods of 4 months at +5±3° C. and at ≤−60° C. (set point −80° C.). The pH values of Formulation 4 were not stable. One explanation for the lack of stability can be that carbon dioxide evaporation changed the pH value from 7.02 to 8.67 or 8.69 during manipulations such as stirring during dialyses.

TABLE 16

| pH Values (mean of 2 measurements) | | | | | | |
| --- | --- | --- | --- | --- | --- | --- |
| Formulation | 0 months | 1 month | 2 months | 3 months | 4 months | 6 months |
| Storage at +5 ± 3° C. | | | | | | |
| Formulation 6 | 7.02 | 7.01 | 7.04 | | 7.04 | |
| Formulation 1 | 6.96 | 6.87 | 6.89 | | 6.92 | |
| Formulation 2 | 6.96 | 6.93 | 6.89 | | 6.90 | |
| Formulation 3 | 6.98 | 6.92 | 6.96 | | 6.94 | |
| Formulation 4 | 8.67 | 8.66 | 8.82 | | 8.71 | |
| Reference | 7.00 | 6.77 | 7.03 | | 7.00 | |
| Storage at ≤−60° C. | | | | | | |
| Formulation 6 | 7.02 | 7.02 | 7.04 | 7.00 | | 7.03 |
| Formulation 1 | 6.97 | 6.88 | 6.89 | 6.91 | | 6.90 |
| Formulation 2 | 6.96 | 6.94 | 6.96 | 6.92 | | 6.93 |
| Formulation 3 | 6.98 | 6.93 | 6.93 | 6.94 | | 6.93 |
| Formulation 4 | 8.69 | 8.71 | 8.83 | 8.63 | | 8.73 |
| Reference | 7.00 | 6.77 | 6.96 | 7.02 | | 6.98 |

Appearance

Only one particle was found during appearance testing of Formation 6 after one and two months of storage at +5±3° C. For each other formulation at each temperature and testing time point, appearance testing demonstrated a clear, colorless solution without particles. The Reference did not show any particles either, which may be due to the presence of 0.003% Polysorbate 80 and 0.001% Pluronic F—68. Because Polysorbate 80 could not be separated completely from the text formulations, a Reference buffer with about 0.002%-0.003% Polysorbate 80 and 0.001% Pluronic F—68 was created, which also did not show any particles.

TABLE 17

Appearance

| Formulation | 0 months | 1 month | 2 months | 3 months | 4 months | 6 months |
|---|---|---|---|---|---|---|
| Storage at +5 ± 3° C. | | | | | | |
| Formulation 6 | complies | clear, colorless, 1 particle | clear, colorless, 1 particle | | complies | |
| Formulation 1 | complies | complies | complies | | complies | |
| Formulation 2 | complies | clear, colorless, without particles | clear, colorless, without particles | | complies | |
| Formulation 3 | complies | complies | complies | | complies | |
| Formulation 4 | complies | complies | complies | | complies | |
| Reference | complies | complies | complies | | complies | |
| Storage at ≤−60° C. | | | | | | |
| Formulation 6 | complies | complies | complies | complies | | complies |
| Formulation 1 | complies | complies | complies | complies | | complies |
| Formulation 2 | complies | complies | complies | complies | | complies |
| Formulation 3 | complies | complies | complies | complies | | complies |
| Formulation 4 | complies | complies | complies | complies | | complies |
| Reference | complies | complies | complies | complies | | complies |

Polysorbate 80

Polysorbate 80 results show that for the Reference the PS80 could not be separated completely. Therefore 0.003% to 0.004% Polysorbate 80 can be found for each of the formulations

TABLE 18

| Polysorbate 80 (mg/ml) | |
|---|---|
| Formulation | 0 months |
| Formulation 6 | 0.004 |
| Formulation 1 | 0.003 |
| Formulation 2 | 0.003 |
| Formulation 3 | 0.003 |
| Formulation 4 | 0.003 |
| Reference[1] | 0.003 |

[1]During dialyses Polysorbate 80 could not be separated completely.

SDS-PAGE

AAV serotypes represent AAV virus particles containing a vector (transgene, helper plasmid etc.), respectively. AAV particles of different products consist of the viral structural proteins VP1, VP2 and VP3. The difference between the serotypes is the content of the capsid. The current method aims at the visualization of these structural proteins. The SDS PAGE assay is qualified for adeno associated virus capsids and therefore applicable to all AAV serotypes, including the AAV6, AAV8 and AAV9 serotypes.

Samples are diluted 1:2 in SDS sample buffer to perform electrophoresis. Sodium dodecyl sulfate (SDS) and lithium dodecyl sulfate (LDS), respectively, coats the protein with a uniform negative charge so their separation is based on the molecular weight (hydrodynamic diameter) only.

Figure 10:
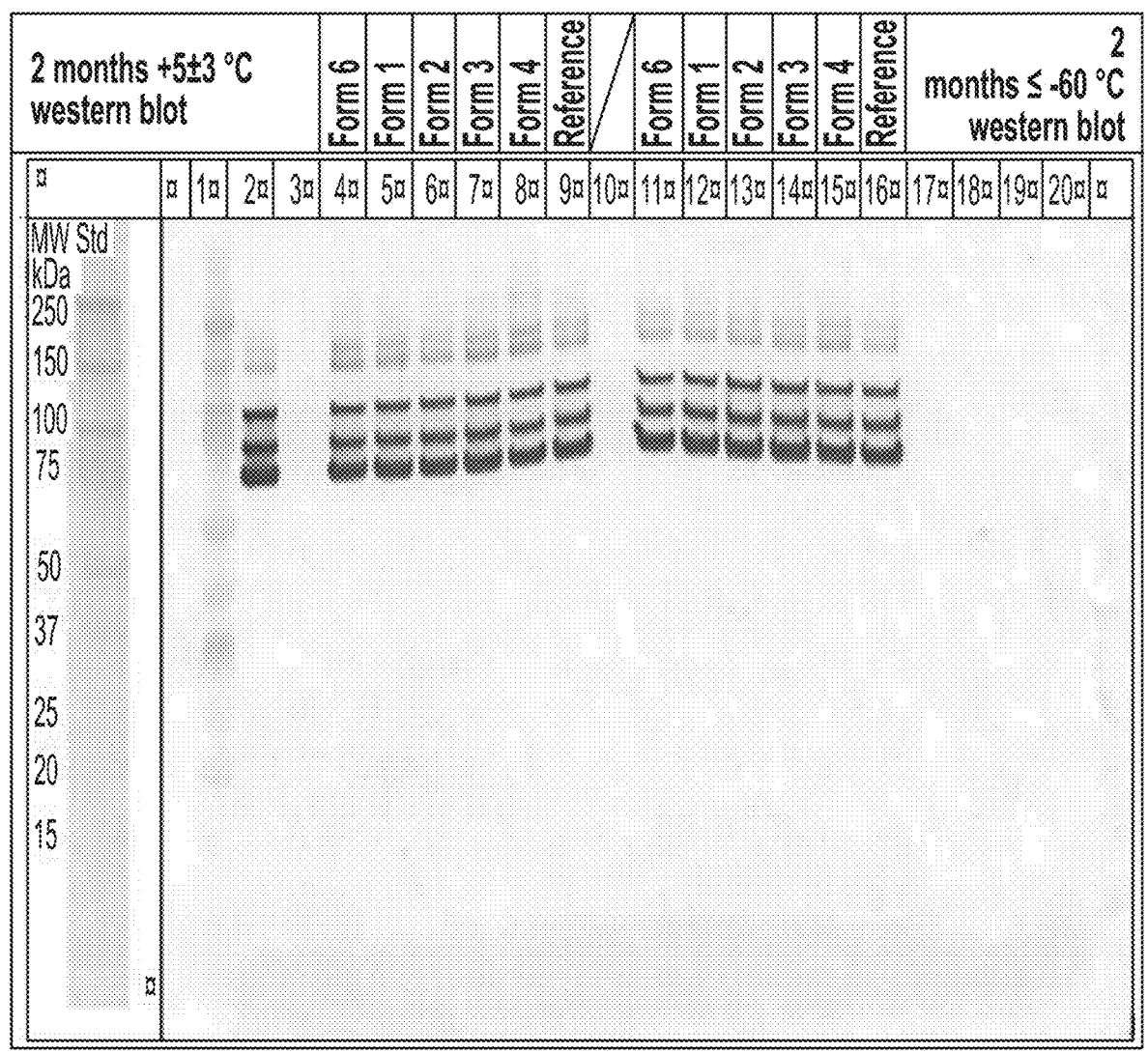
FIG. 10 is an SDS-PAGE western blot of AAV8 particles at the 2-month time point after storage at +5±3° C. or ≤−60° C.
Figure 11:
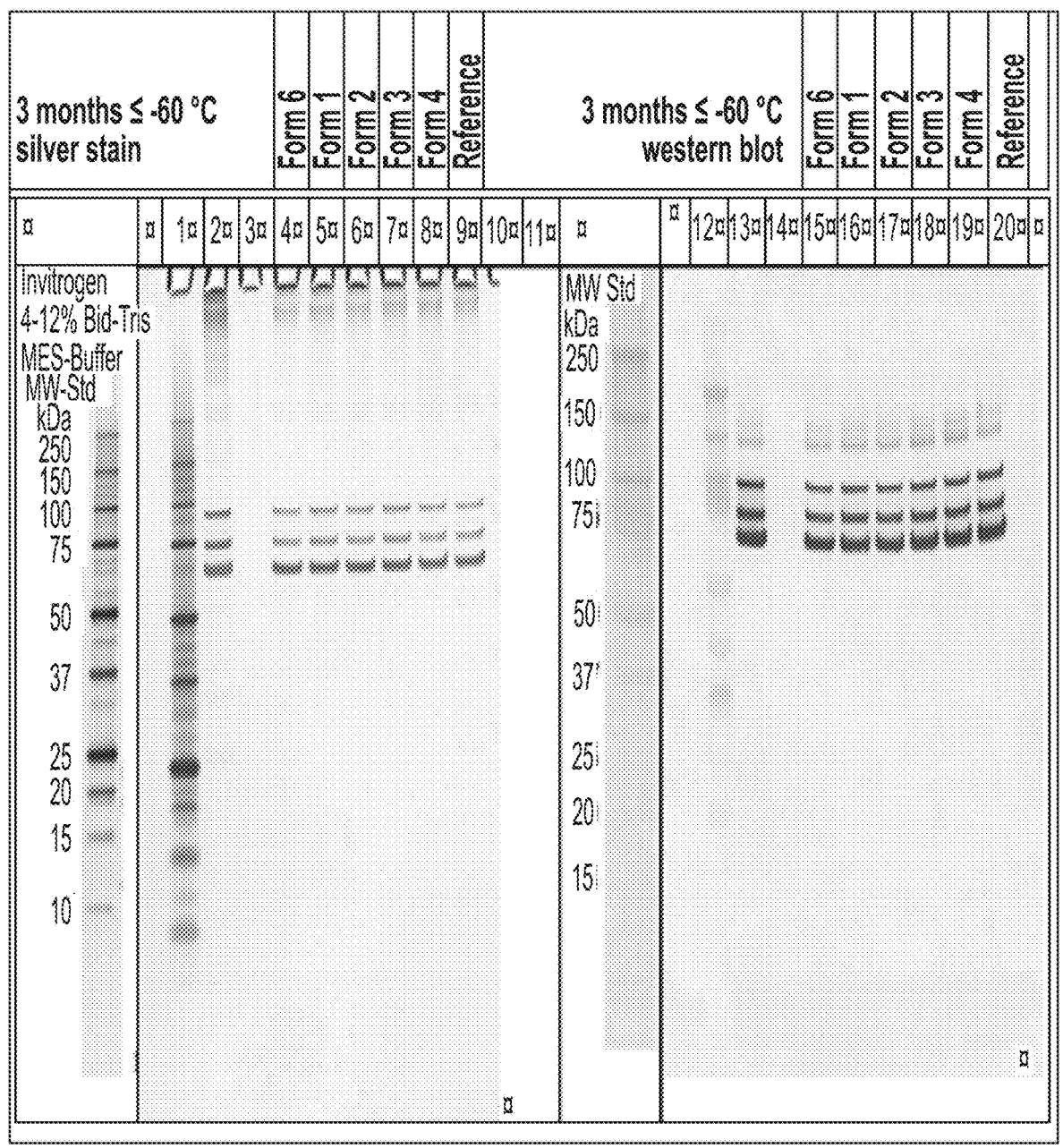
FIG. 11 is an SDS-PAGE silver staining and western blot of AAV8 particles at the 3-month time point after storage at ≤−60° C.
Figure 12:
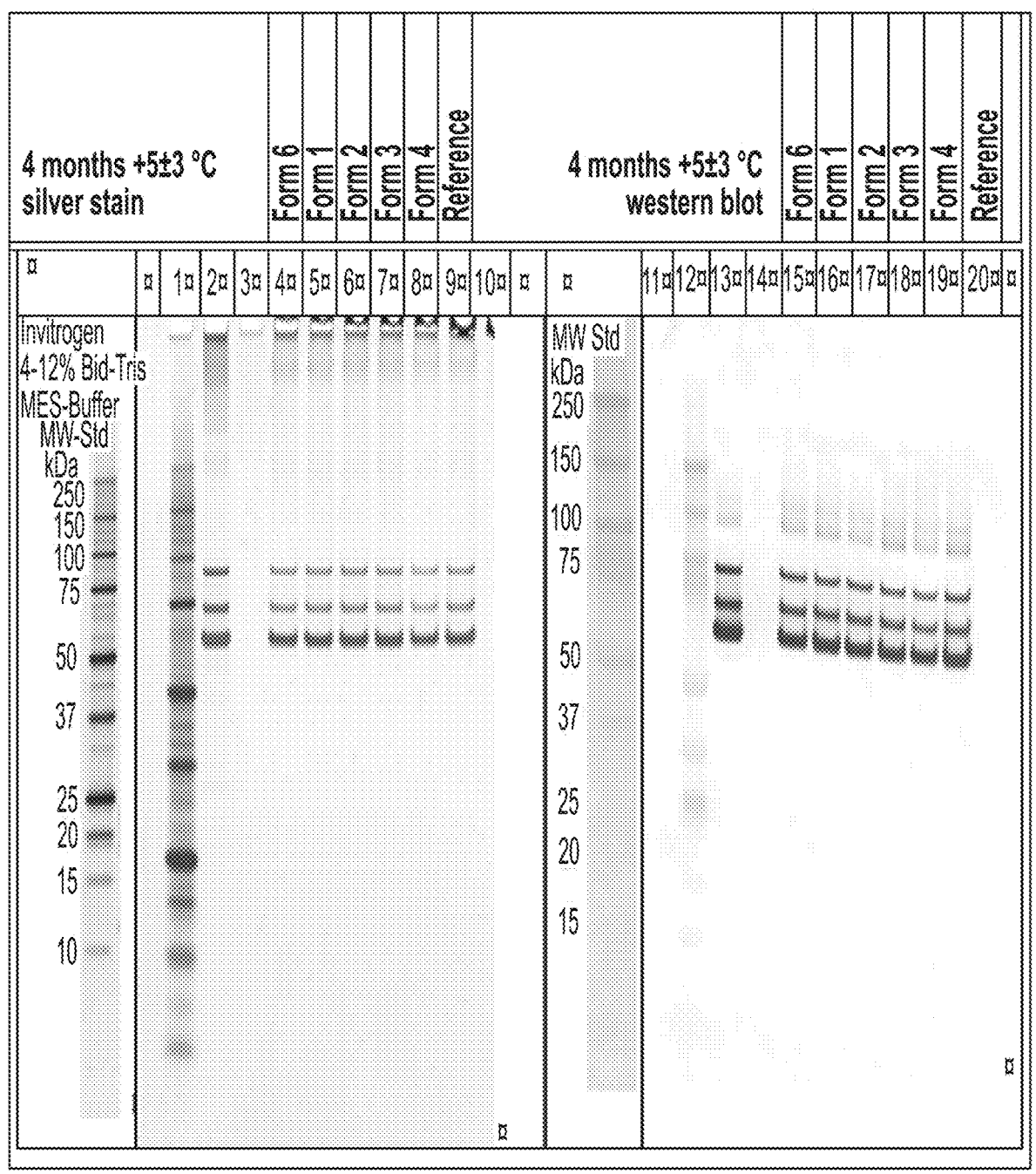
FIG. 12 is an SDS-PAGE silver staining at the 4-month time point after storage of AAV8 particles at +5±3° C.
Figure 13:
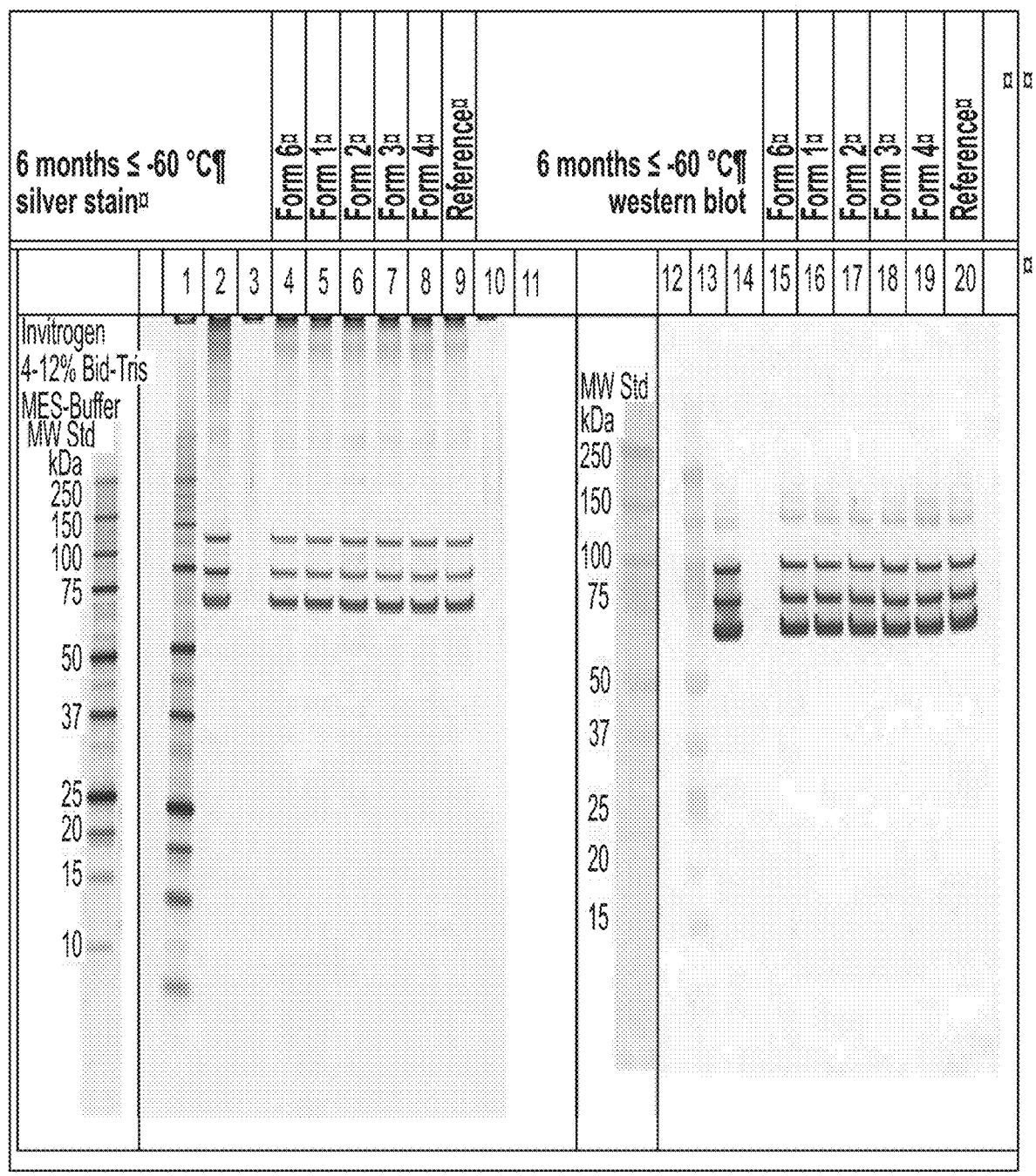
FIG. 13 is an SDS-PAGE western blot of AAV8 particles at the 6-month time point after storage at ≤−60° C.
Figure 14:
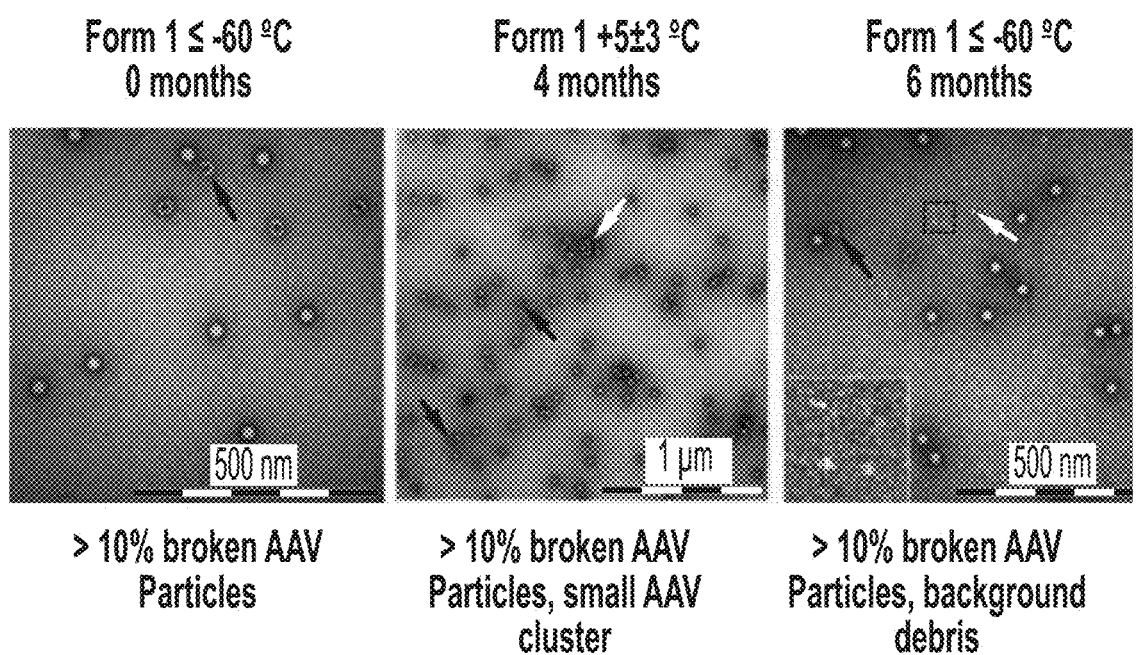
FIG. 14 is an nsTEM of AAV8 particles for Buffer Formulation 1 (0, 4, and 6 months).
Figure 15:
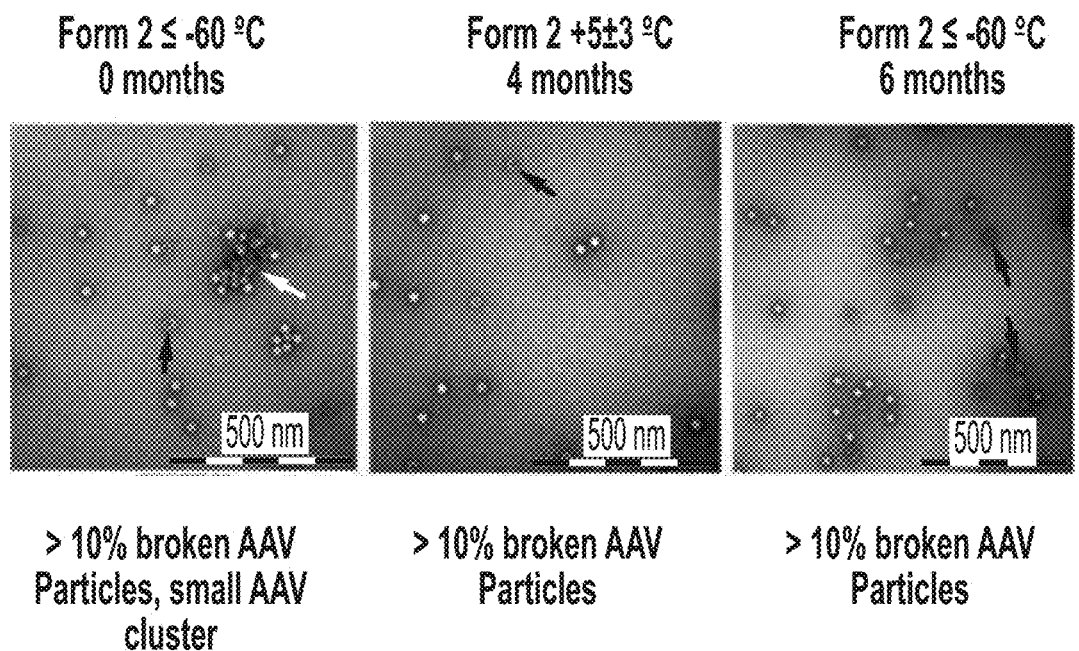
FIG. 15 is an nsTEM of AAV8 particles for Buffer Formulation 2 (0, 4, and 6 months).
Figure 16:
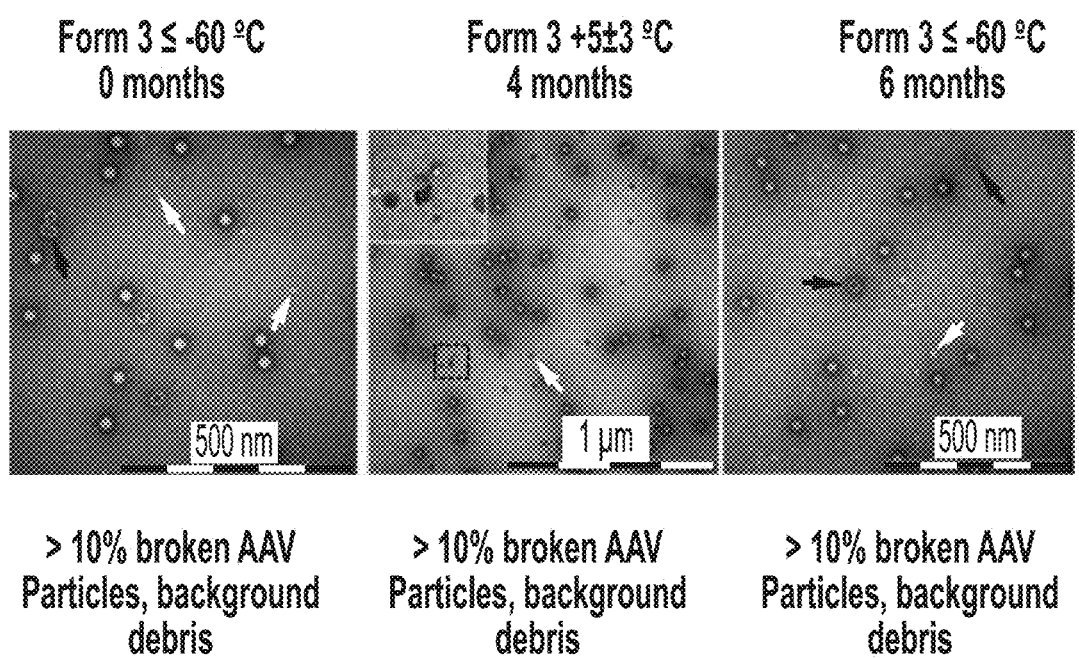
FIG. 16 is an nsTEM of AAV8 particles for Buffer Formulation 3 (0, 4, and 6 months).
Figure 17:
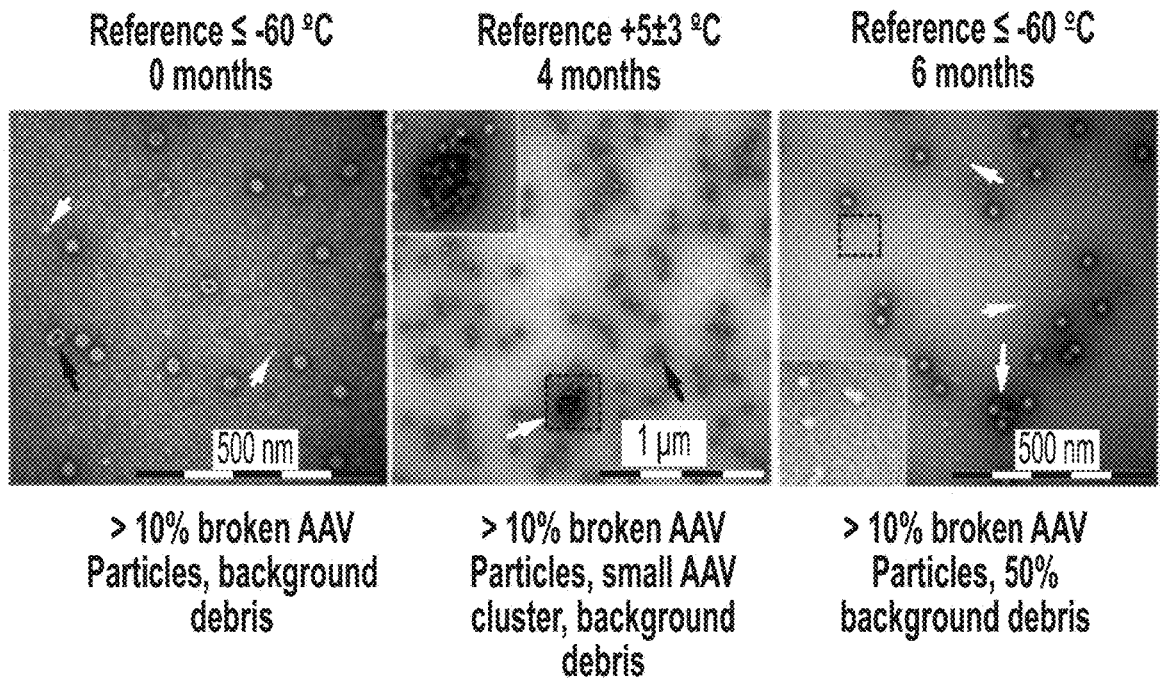
FIG. 17 is an nsTEM of AAV8 particles for the Reference Buffer (0, 4, and 6 months).

Silver staining as well as western blot did not show any degradation and/or additional band for each buffer formulation, temperature and testing time point (FIGS. 5-13). The smear that can be seen for Buffer Formulation 6 after 2 months at +5±3° C. (FIG. 9) can be seen as an artifact due to clean bands for this sample after retesting (FIG. 8) and no findings on the western blot (FIG. 10).

nsTEM nsTEM is a method where negative stained cells were investigated by the transmission electron microscopy (TEM). Classically TEM needs fixation, dehydration, sectioning and a selective "staining" of cell and tissue structures. "Staining" is a means of receiving colored images, cannot be always effectively be used in conjunction with an electron microscope. It is possible to enhance structures for TEM by impregnating the sample with heavy metal salts (e.g., plumb, tungstenium and uranium). A description of possible nsTEM techniques is discussed in further detail in Barreto-Vieira and Bath "Negative and Positive staining in Transmission Electron Microscopy for Virus Diagnosis" in *Microbiology in Agriculture and Human Health*, http://dx.doi.org/10.5772/60511, which is incorporated by reference herein for all intended purposes. In this instance, contrast is not applied to the object but to its environment, using the heavy metal salts. The electron beam can cross biological material easier than the surrounding space. The result resembles an inverted traditional TEM image. In some embodiments, the standard staining solution can be an aqueous 1% phosphotungstic acid with pH 7.2. A fixed or unfixed drop of viral suspension was applied onto a formvar- or collodium covered electron microscope grid for a few seconds; the liquid was absorbed by a filter paper, then a drop of the staining solution was applied and few seconds later also absorbed. After drying, the specimen was introduced into the electron beam.

The results for this investigation are quantitated as <10%, 50%, and >90% (FIGS. 14-17).

Buffer Formulation 2 performed the best, followed by Buffer Formulation 1.

Discussion

All results generated for the AAV8 Total particles titer (ELISA) showed test results in the range of the normal variation, and they remained stable for each buffer formulation and time point. Only Buffer Formulation 4 showed decrease upon storage at +5±3° C.

The in vivo biopotency results demonstrated normal variation for Buffer Formulations 1-3, while the Reference demonstrated a tendency to decrease.

All results generated for the in vitro biopotency assay showed normal variation, and each buffer formulation remained biopotently stable at each time point tested. Only Buffer Formulation 4 showed a decrease in in vitro biopotency within storage at +5±3° C.

The ITR-qPCR assay exhibited normal variation at each composition and time point tested during storage at +5±3° C. and ≤−60° C. (set point −80° C.).

Aggregates did not decrease or increase in the different buffer formulations over the time points tested. Only Buffer Formulation 4 stored at +5±3° C. decreased from 4.2% to 2.9%, which, as discussed above, can be explained by the fact that the ELISA assay demonstrated a decrease in the AAV8 Total particles titer values for the same samples.

The pH values did not show any significant changes during the storage periods of 4 months at +5±3° C. and at ≤−60° C. (set point −80° C.). The pH values of the Buffer Formulation 4 were not as stable, which can be due to the influence of carbon dioxide evaporation changing the pH value from 7.02 to 8.67 or 8.69 during cell culturing manipulation (e.g., stirring during dialyses).

Buffer Formulation 6 only developed one particle after one and two months of storage at +5±3° C. For each other buffer formulation, temperature and testing time point a clear, colorless solution without particles can be seen. The Reference does not show any visible particles as well, which may be due to the presence of 0.003% Polysorbate 80 and 0.001% Pluronic F—68. During dialyses Polysorbate 80 could not be separated completely, which could account for the observed results.

Silver staining as well as western blot did not show any degradation and/or additional bands for each buffer formulation, temperature, and time point.

Example 3

The stability of AAV serotype 9 (AAV9) in three different buffer formulations stored in 10 ml $SiO_2$ sealed glass vials at +5±3° C. for up to 6 months (0 months, 2 and 6 weeks, 3 and 6 months) and at ≤−60° C. (set point −80° C.) for up to 12 months (2 and 6 weeks, 3, 6 and 12 months) was investigated. For each time point, 2 mL was filled into 10 mL $SiO_2$ vials. This study was performed with end formulated and sterile filtrated AAV9 gene therapy material.

Materials and Methods

In this study the following equipment, devices and reagents were used:

AAV9 viral vectors (concentration of $58.3 \times 10^{12}$ vg/ml diluted to 3.5 $10^{12}$ vg/ml (both ITR qPCR).
20 ml Therumo Syringe
50 ml Braun Omnifix Syringe
Eppendorf 10 ml biopur combitip
Supor EKV Membrane in Mini Kleenpak Syringe Filters storage at +5±3° C. at
storage at ≤−60° C.
10 ml Schott Type I vials and $SiO_2$ layer
20 mm Chlorobutyl rubber stopper
Filp off seals
PRIMA Clearpeel see through pouch
Sterican 1.1×30 mm hypodermic needle
Temperature measurement, Testo 112
pH measurements, testo 230
Slide-A-Lyzer® 10K Dialysis Cassettes (Thermo Scientific)
2 ml Schott Type I vials and $SiO_2$ layer
13 mm Chlorobutyl rubber stopper AAV9 material was diluted to a target concentration of $3.5 \times 10^{12}$ vg/mL (ITR qPCR) and aliquoted in parts of 22 mL for each buffer formulation and dialyzed to Buffer Formulations 1-3 or the Reference (see Tables 1-3). Dialysis was performed three times in the 100-fold volume in 12-30 mL Slide-A-Lyzer® 10K Dialysis Cassettes. After the buffer change the material was filled (2 mL) into 10-mL glass vials. Samples for appearance and pH investigations were filled separately with the same volume. At each testing time point, the samples were aliquoted and stored on dry ice. Only the in vivo biopotency samples were stored at ≤−60° C. at testing time point 0 for generating the 4 weeks' results as well as the material was stored after 4 weeks to generate 8 weeks' results. +5±3° C. samples after 4 weeks were stored frozen for the same assay.

Results

Total Particles Titer (ELISA)

The sandwich-ELISA-system was used to determine the number of intact AAV9 particles. A coating antibody was applied to a microplate. Afterwards a solution with AAV9 particles was added, and the AAV9 particles were captured by the antibody. In the next step, another antibody that detects AAV9 particles was added, this antibody was labeled with a detection moiety. In the last step, the substrate was added and the reaction was stopped in order to quantitate the total AAV9 titer level.

Figure 18:
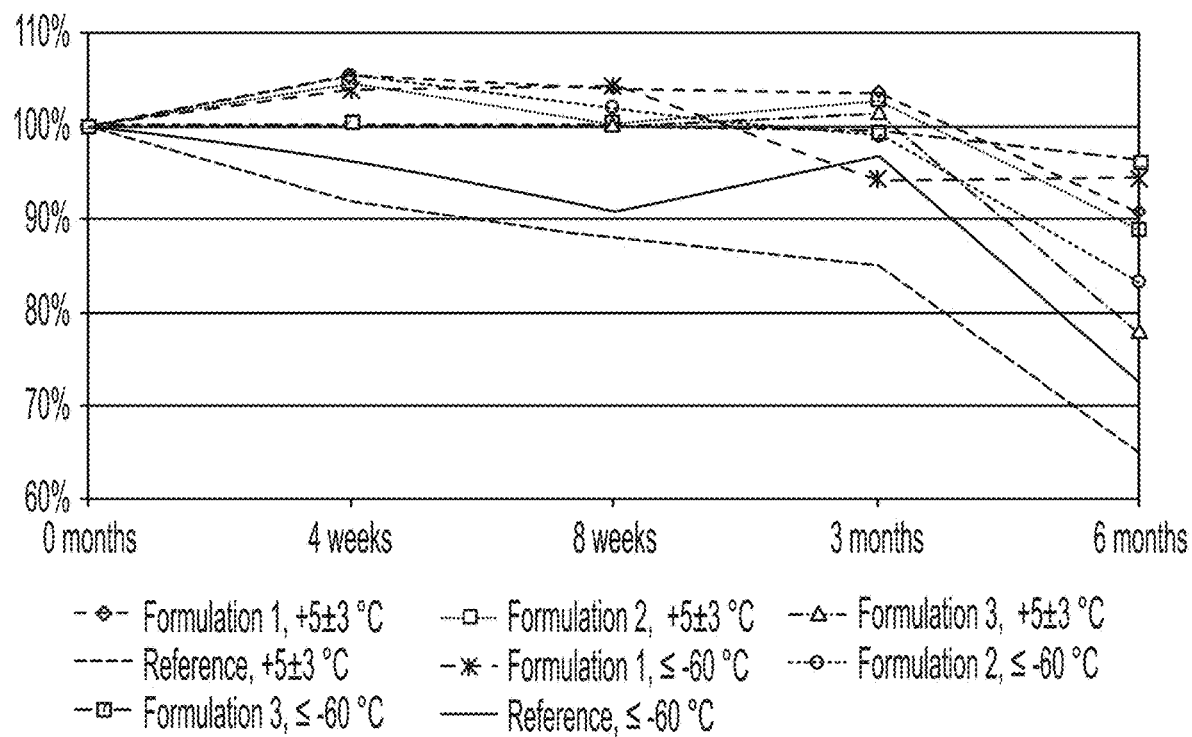
FIG. 18 is a graph of the percent recovery of the Total AAV9 particle titer as measured by ELISA after storage at +5±3° C. or ≤−60° C. for up to 6 months.

The AAV9 total particle titer (ELISA) remained stable for Buffer Formulations 1 and 2 for up to 6 months for both temperatures, while Buffer Formulation 3 remained stable at ≤−60° C. and showed a slight decrease at +5±3° C. after 3 months. The Reference buffer showed a decrease in titer of 65% for storage at +5±3° C. as well as 73% recovery for storage at ≤−60° C. (Table 19 and FIG. 18).

TABLE 19

| | AAV9 Total Particle Titer (ELISA) | | | | |
| --- | --- | --- | --- | --- | --- |
| storage at +5 ± 3° C. | 0 months [cp/ml] | 4 weeks [cp/ml] | 8 weeks [cp/ml] | 3 months [cp/ml] | 6 months [cp/ml] |
| Formulation 1 | $1.50 \times 10^{12}$ | $1.58 \times 10^{12}$ | $1.56 \times 10^{12}$ | $1.55 \times 10^{12}$ | $1.36 \times 10^{12}$ |
| Formulation 2 | $1.59 \times 10^{12}$ | $1.66 \times 10^{12}$ | $1.59 \times 10^{12}$ | $1.63 \times 10^{12}$ | $1.41 \times 10^{12}$ |
| Formulation 3 | $1.61 \times 10^{12}$ | $1.61 \times 10^{12}$ | $1.61 \times 10^{12}$ | $1.63 \times 10^{12}$ | $1.25 \times 10^{12}$ |

TABLE 19-continued

| AAV9 Total Particle Titer (ELISA) | | | | | |
|---|---|---|---|---|---|
| Reference | $1.46 \times 10^{12}$ | $1.34 \times 10^{12}$ | $1.28 \times 10^{12}$ | $1.24 \times 10^{12}$ | $9.44 \times 10^{11}$ |
| recovery | 0 months [%] | 4 weeks [%] | 8 weeks [%] | 3 months [%] | 6 months [%] |
| Formulation 1 | 100 | 105 | 104 | 103 | 91 |
| Formulation 2 | 100 | 104 | 100 | 103 | 89 |
| Formulation 3 | 100 | 100 | 100 | 101 | 78 |
| Reference | 100 | 92 | 88 | 85 | 65 |
| storage at ≤−60° C. | 0 months [cp/ml] | 4 weeks [cp/ml] | 8 weeks [cp/ml] | 3 months [cp/ml] | 6 months [cp/ml] |
| Formulation 1 | $1.50 \times 10^{12}$ | $1.56 \times 10^{12}$ | $1.57 \times 10^{12}$ | $1.41 \times 10^{12}$ | $1.41 \times 10^{12}$ |
| Formulation 2 | $1.59 \times 10^{12}$ | $1.67 \times 10^{12}$ | $1.61 \times 10^{12}$ | $1.57 \times 10^{12}$ | $1.32 \times 10^{12}$ |
| Formulation 3 | $1.61 \times 10^{12}$ | $1.62 \times 10^{12}$ | $1.61 \times 10^{12}$ | $1.60 \times 10^{12}$ | $1.55 \times 10^{12}$ |
| Reference | $1.46 \times 10^{12}$ | $1.40 \times 10^{12}$ | $1.33 \times 10^{12}2$ | $1.41 \times 10^{12}$ | $1.06 \times 10^{12}$ |
| recovery | 0 months [%] | 4 weeks [%] | 8 weeks [%] | 3 months [%] | 6 months [%] |
| Formulation 1 | 100 | 104 | 104 | 94 | 94 |
| Formulation 2 | 100 | 105 | 102 | 99 | 83 |
| Formulation 3 | 100 | 100 | 100 | 99 | 96 |
| Reference | 100 | 96 | 91 | 97 | 73 |

HT2-qPCR

Samples were treated with DNase I and analyzed by Real-Time qPCR System. A conventional pair of cytomegalo virus (CMV) primers (i.e., to detect the CMV promoter), specific for the single copy gene, in combination with a fluorescently labeled probe (Reporter: FAM, Quencher: Black Hole Quencher (BHQ) was used. The analysis and quantitation of the PCR products was done by detection and quantitation of the fluorescence derived from the cleavage of the probe during the amplification process.

Figure 19:
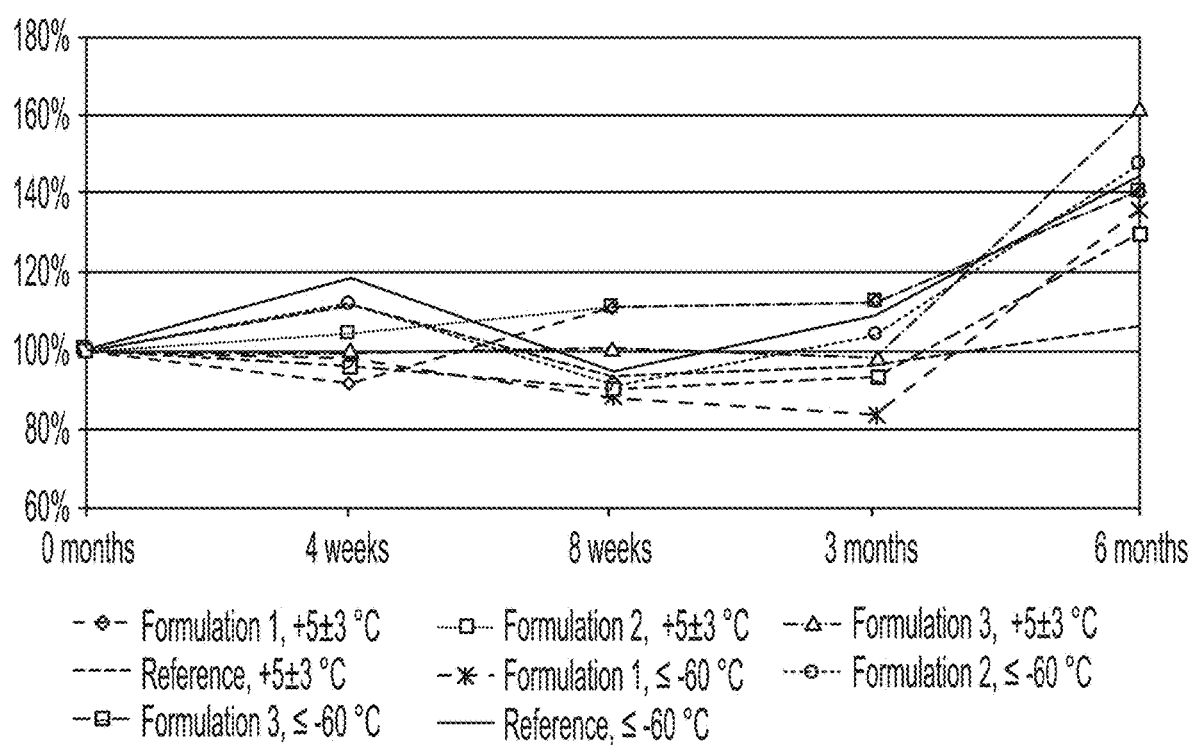
FIG. 19 is a graph of the percent recovery of total AAV9 particles as measured by HT2-qPCR after storage at +5±3° C. or ≤−60° C. for up to 6 months.

The HT2-qPCR assay shows no losses were seen for the Buffer Formulations 1-3 (Table 20 and FIG. 19).

TABLE 20

| HT2-qPCR | | | | | |
|---|---|---|---|---|---|
| storage at +5 ± 3° C. | 0 months [vg/ml] | 4 weeks [vg/ml] | 8 weeks [vg/ml] | 3 months [vg/ml] | 6 months [vg/ml] |
| Formulation 1 | $4.28 \times 10^{11}$ | $3.92 \times 10^{11}$ | $4.75 \times 10^{11}$ | $4.80 \times 10^{11}$ | $6.01 \times 10^{11}$ |
| Formulation 2 | $3.91 \times 10^{11}$ | $4.07 \times 10^{11}$ | $3.91 \times 10^{11}$ | $3.84 \times 10^{11}$ | $6.33 \times 10^{11}$ |
| Formulation 3 | $4.44 \times 10^{11}$ | $4.42 \times 10^{11}$ | $4.54 \times 10^{11}$ | $4.26 \times 10^{11}$ | $7.92 \times 10^{11}$ |
| Reference | $3.44 \times 10^{11}$ | $3.82 \times 10^{11}$ | $3.21 \times 10^{11}$ | $3.30 \times 10^{11}$ | $3.65 \times 10^{11}$ |
| recovery | 0 months [%] | 4 weeks [%] | 8 weeks [%] | 3 months [%] | 6 months [%] |
| Formulation 1 | 100 | 92 | 111 | 112 | 140 |
| Formulation 2 | 100 | 104 | 111 | 112 | 140 |
| Formulation 3 | 100 | 100 | 100 | 98 | 162 |
| Reference | 100 | 111 | 93 | 96 | 106 |
| storage at ≤−60° C. | 0 months [vg/ml] | 4 weeks [vg/ml] | 8 weeks [vg/ml] | 3 months [vg/ml] | 6 months [vg/ml] |
| Formulation 1 | $4.28 \times 10^{11}$ | $4.19 \times 10^{11}$ | $3.76 \times 10^{11}$ | $3.57 \times 10^{11}$ | $5.83 \times 10^{11}$ |
| Formulation 2 | $3.91 \times 10^{11}$ | $4.36 \times 10^{11}$ | $3.56 \times 10^{11}$ | $4.05 \times 10^{11}$ | $5.76 \times 10^{11}$ |
| Formulation 3 | $4.44 \times 10^{11}$ | $4.26 \times 10^{11}$ | $4.01 \times 10^{11}$ | $4.14 \times 10^{11}$ | $5.74 \times 10^{11}$ |
| Reference | $3.44 \times 10^{11}$ | $4.07 \times 10^{11}$ | $3.27 \times 10^{11}$ | $3.75 \times 10^{11}$ | $4.97 \times 10^{11}$ |
| recovery | 0 months [%] | 4 weeks [%] | 8 weeks [%] | 3 months [%] | 6 months [%] |
| Formulation 1 | 100 | 98 | 88 | 83 | 136 |
| Formulation 2 | 100 | 112 | 91 | 104 | 147 |
| Formulation 3 | 100 | 96 | 90 | 93 | 129 |
| Reference | 100 | 118 | 95 | 109 | 144 |

In Vivo Biopotency

Figure 20:
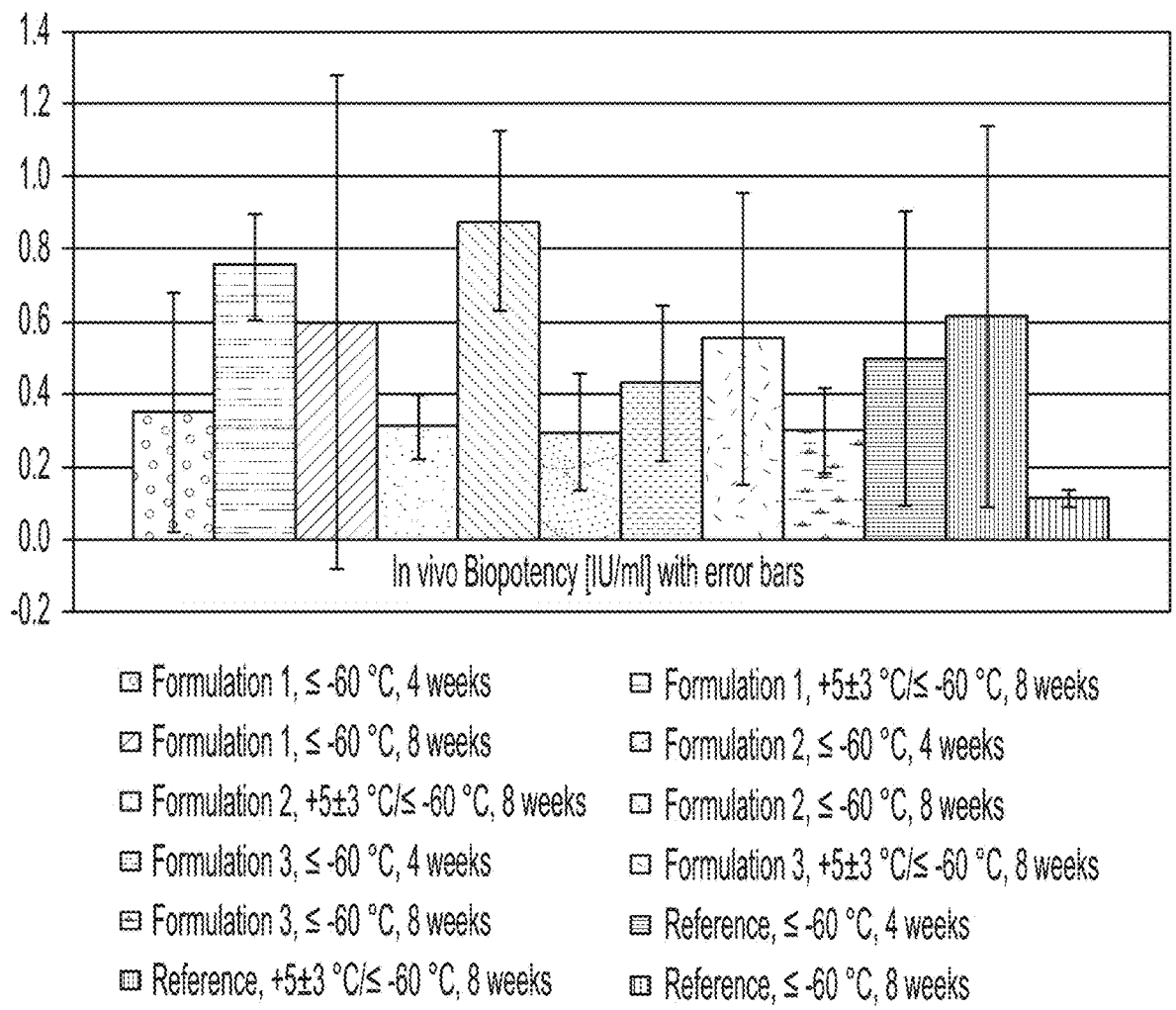
FIG. 20 is a graph depicting the in vivo biopotency (relative mHTT expression) of AAV9 particles during storage at +5±3° C. or ≤−60° C. for up to 6 months. Each formulation is grouped in threes: from left to right is Buffer Formulation 1, Buffer Formulation 2, Buffer Formulation 3, and the Reference Buffer.
Figure 21:
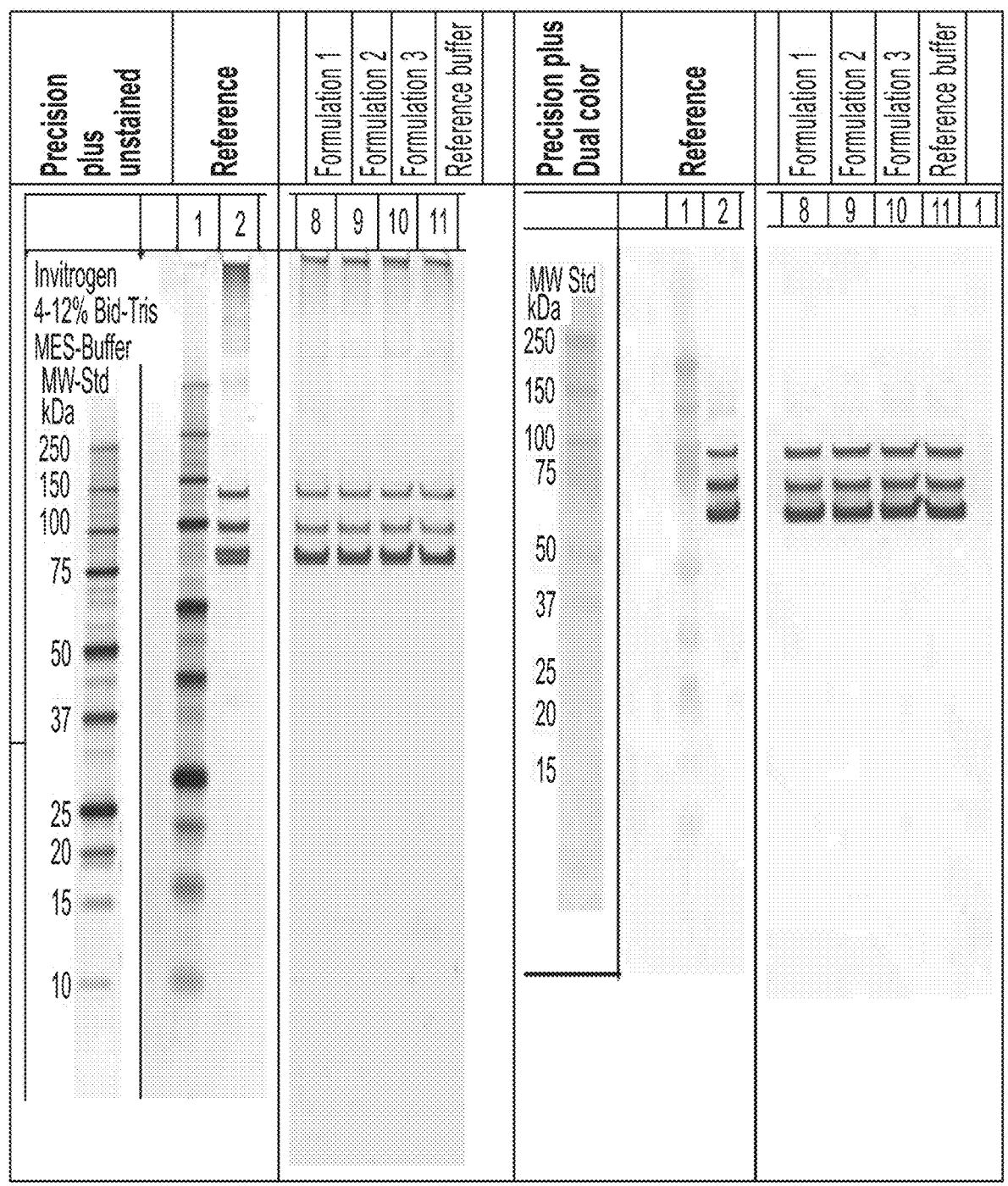
FIG. 21 is an SDS-PAGE silver staining and western blot of AAV9 particles at the 0 months' (starting material) time point.
Figure 22:
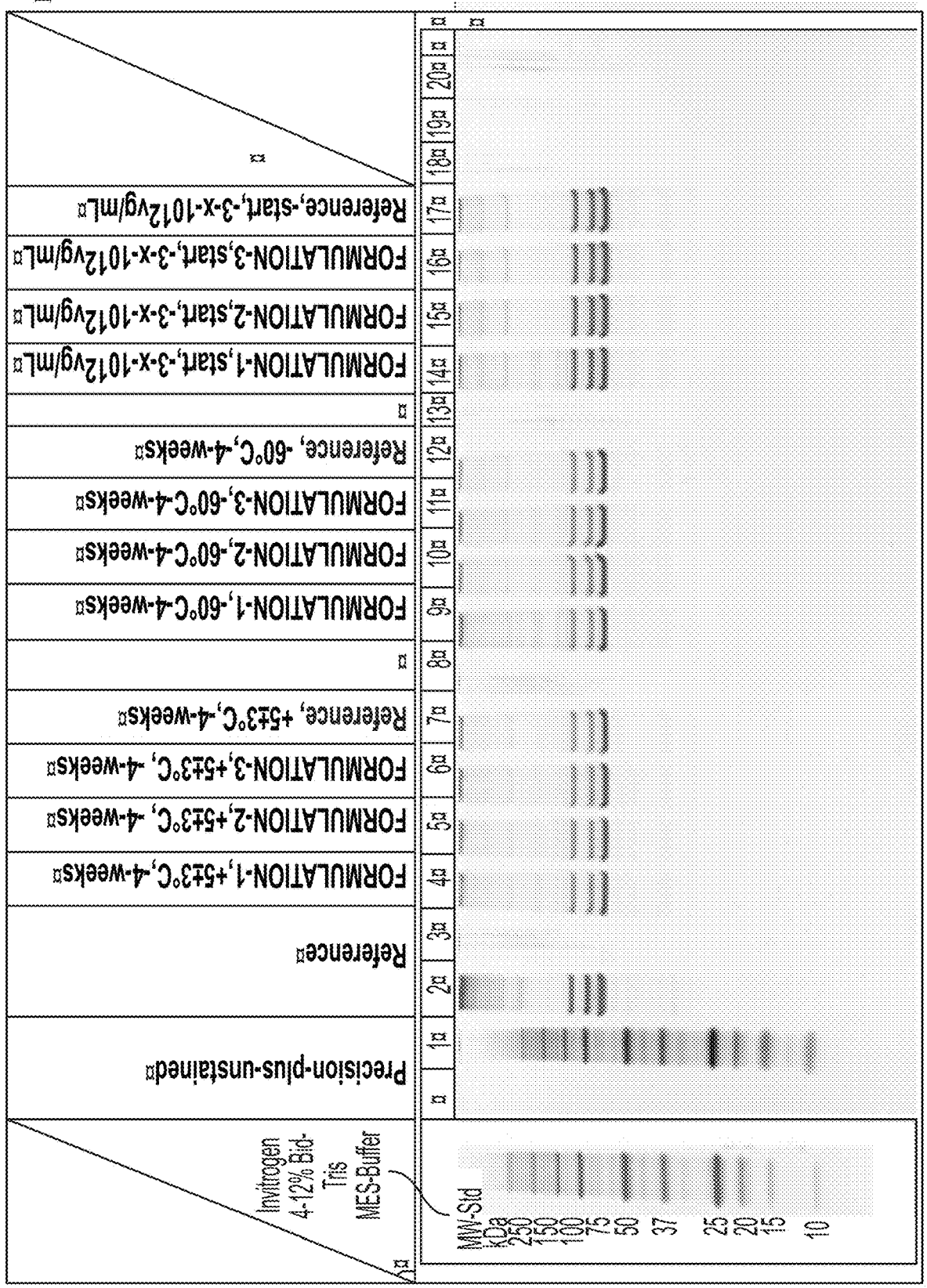
FIG. 22 is an SDS-PAGE silver staining blot of AAV9 particles at the 4 weeks' time point after storage at +5±3° C. (left) as well as at ≤−60° C. (middle).
Figure 23:
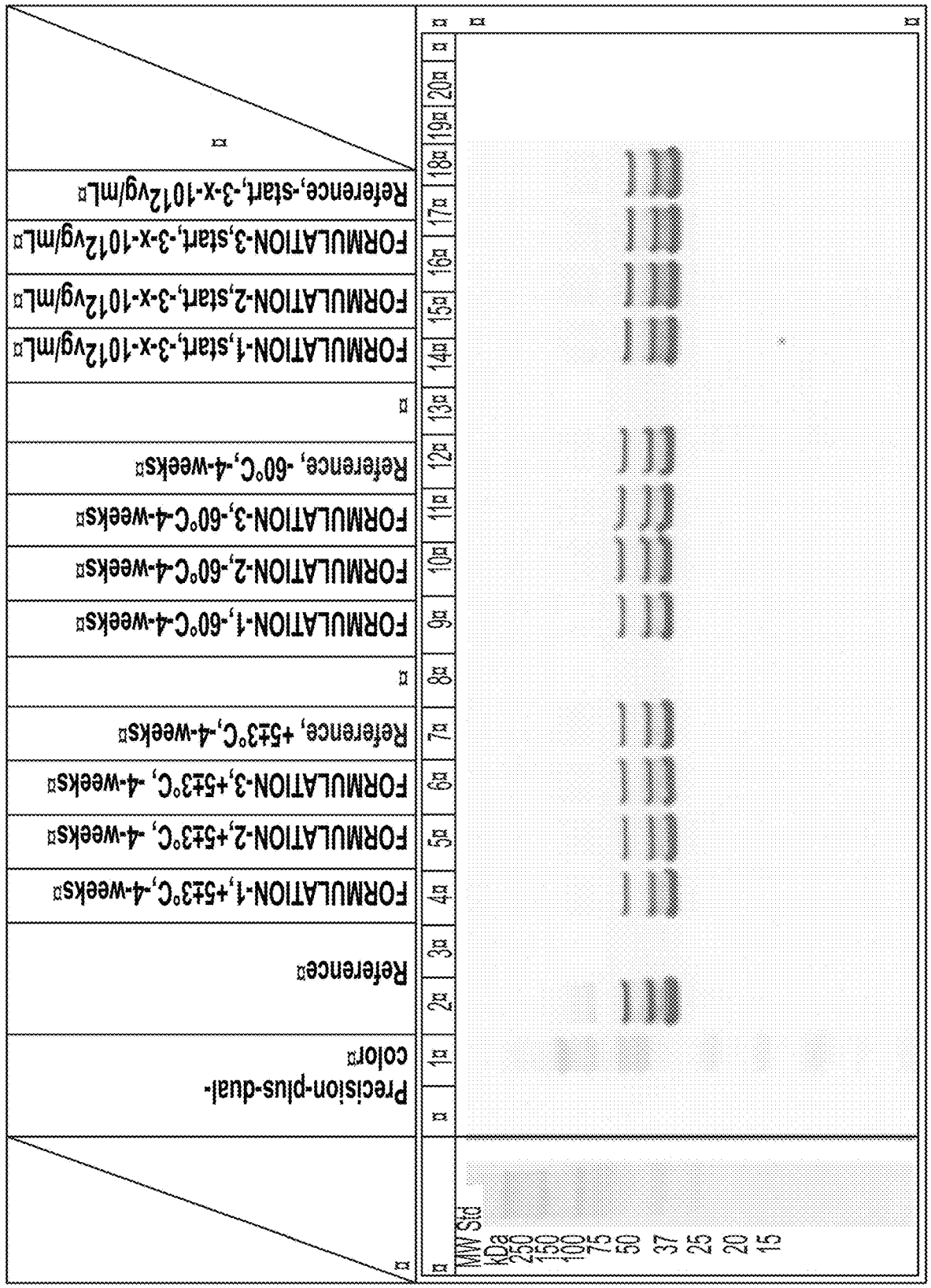
FIG. 23 is an SDS-PAGE western blot of AAV9 particles (anti-capsid) at the 4 weeks' time point after storage at +5±3° C. (left) as well as at ≤−60° C. (middle).
Figure 24:
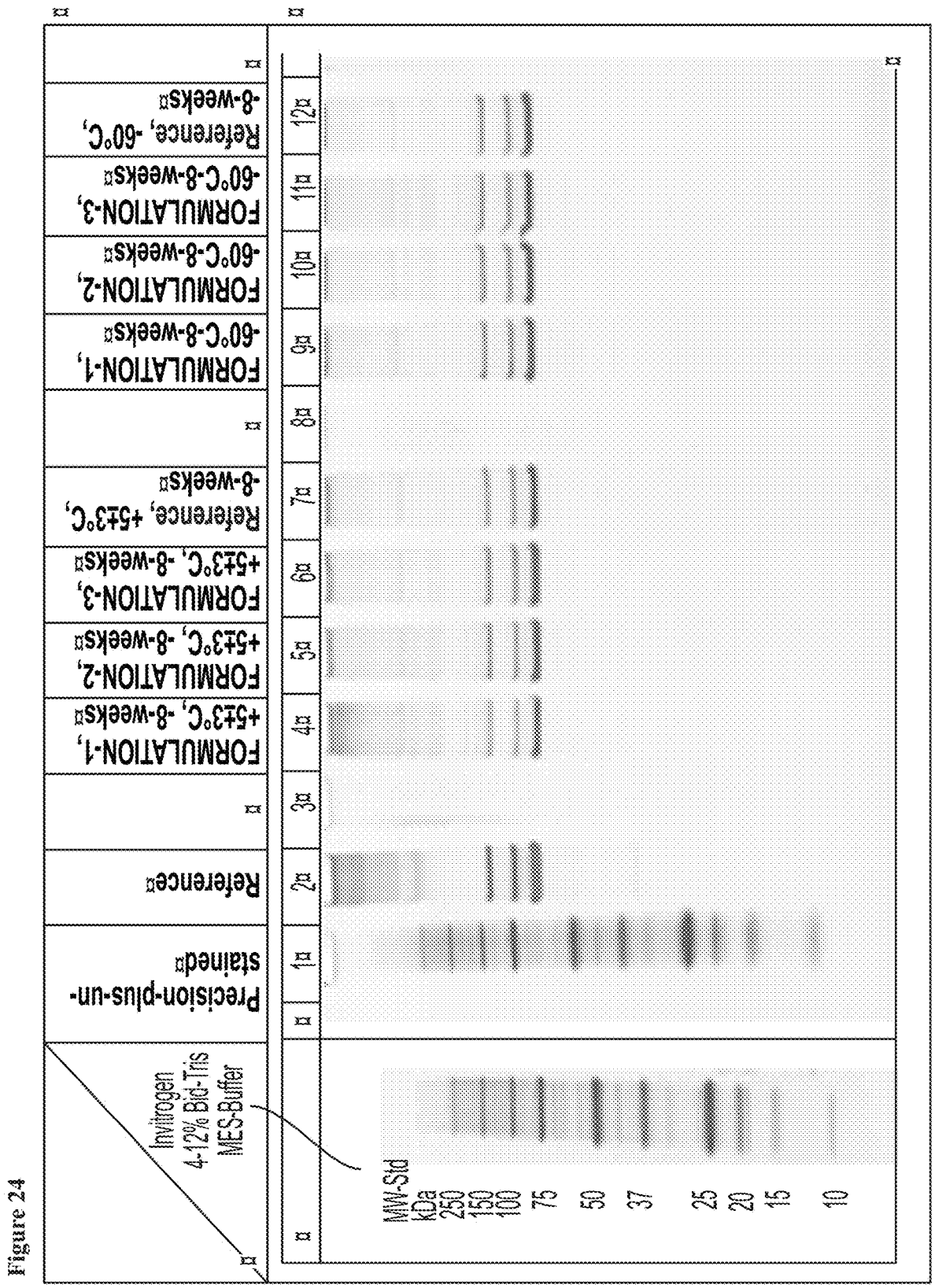
FIG. 24 is an SDS-PAGE silver staining of AAV9 particles at the 8 weeks' time point after storage at +5±3° C. (left) as well as at ≤−60° C. (right).
Figure 25:
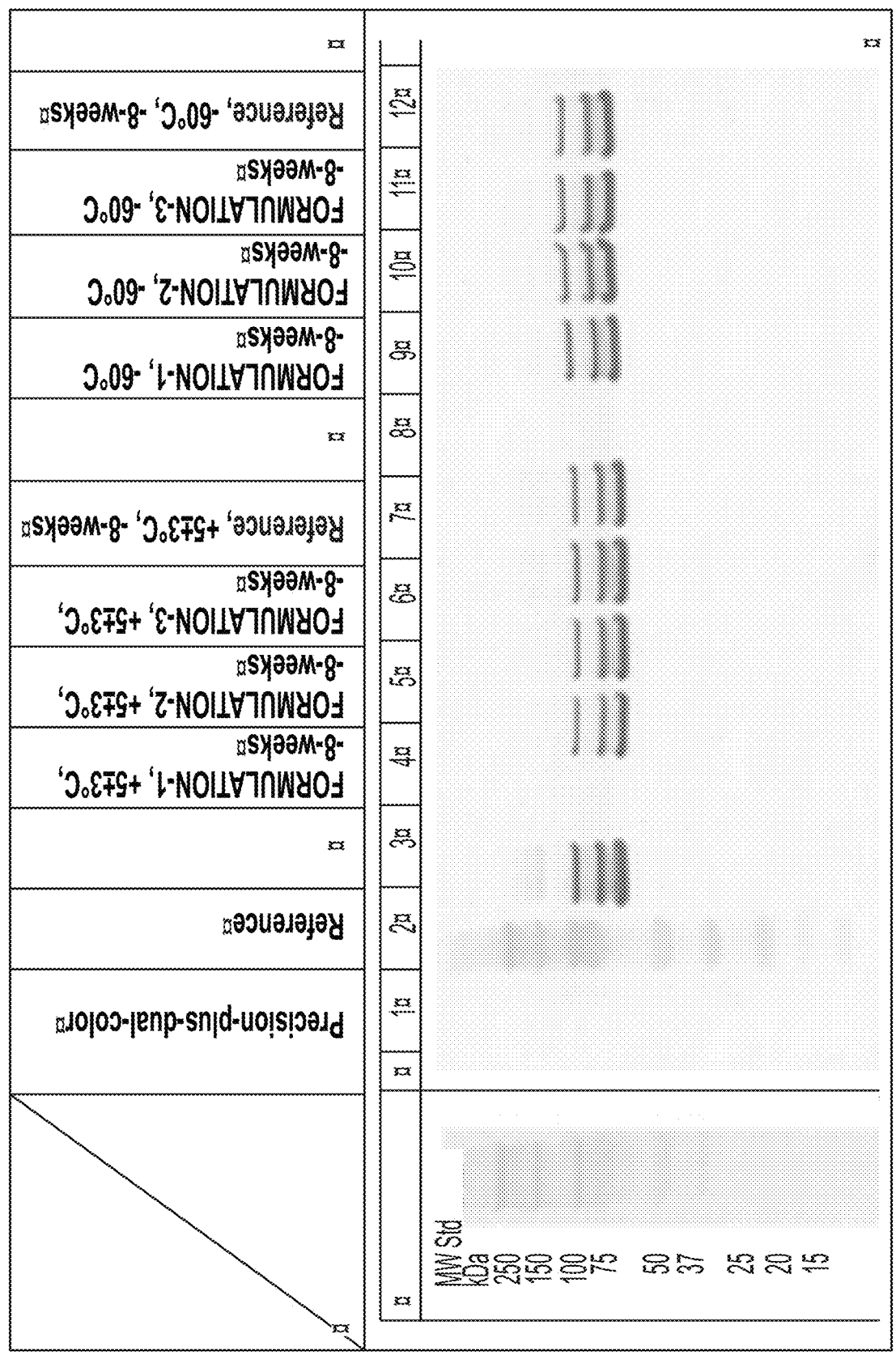
FIG. 25 is an SDS-PAGE western blot (anti-capsid) of AAV9 particles at the 8 weeks' time point after storage at +5±3° C. (left) as well as at ≤−60° C. (right).
Figure 26:
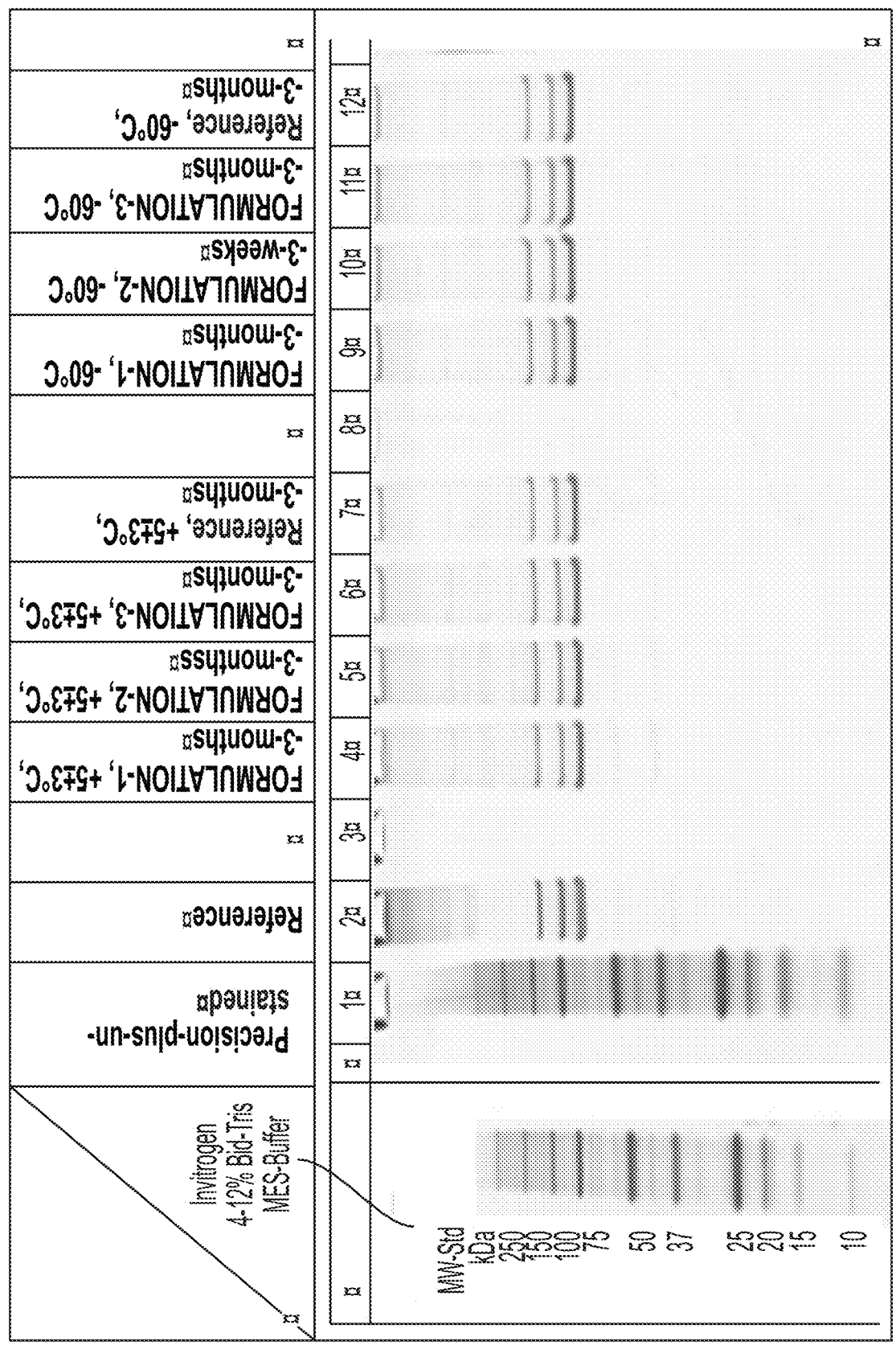
FIG. 26 is an SDS-PAGE silver staining of AAV9 particles at the 3 months' time point after storage at +5±3° C. (left) as well as at ≤−60° C. (right).
Figure 27:
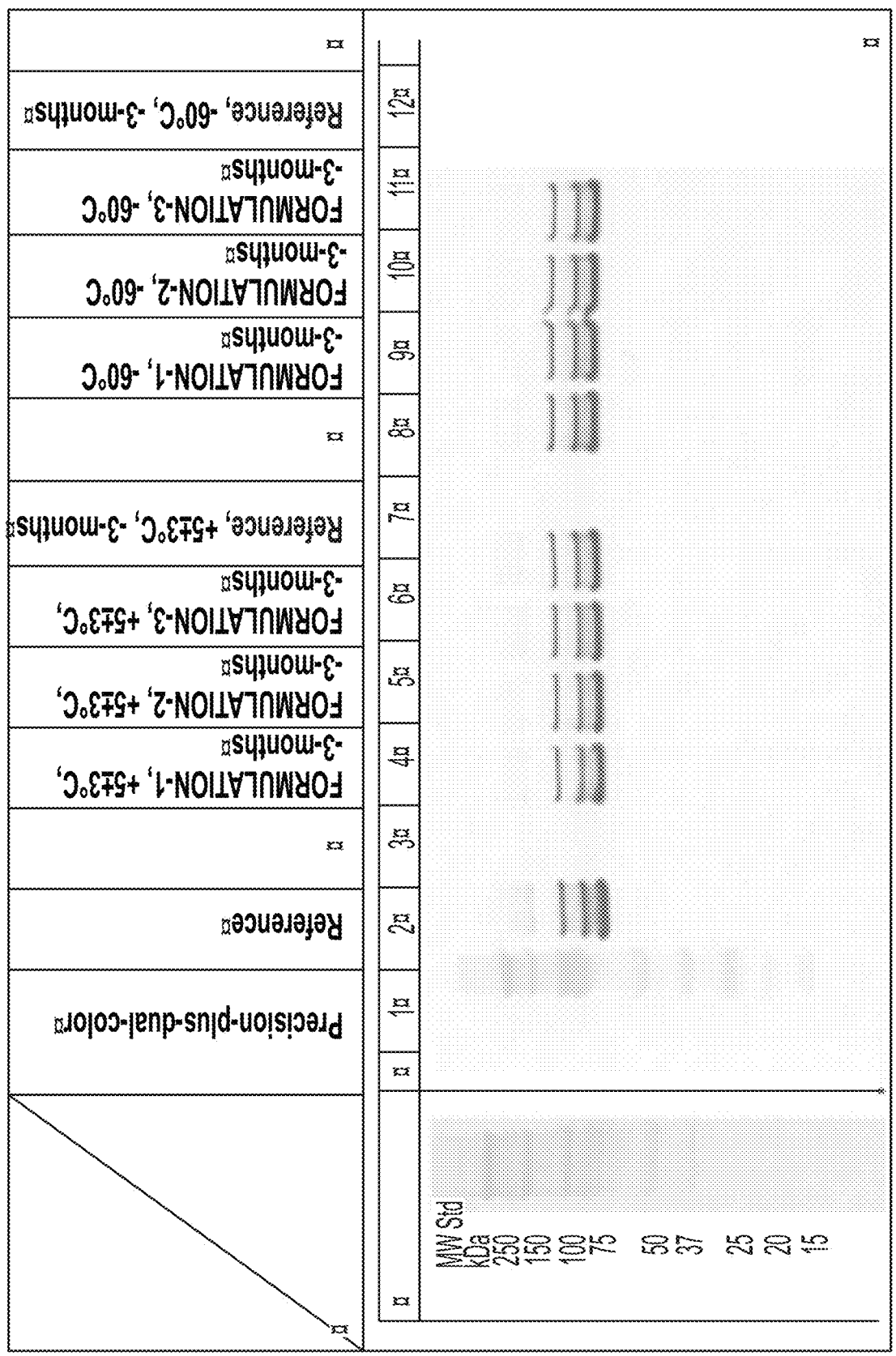
FIG. 27 is an SDS-PAGE western blot (anti-capsid) of AAV9 particles at the 3 months' time point after storage at +5±3° C. (left) as well as at ≤−60° C. (right).
Figure 28:
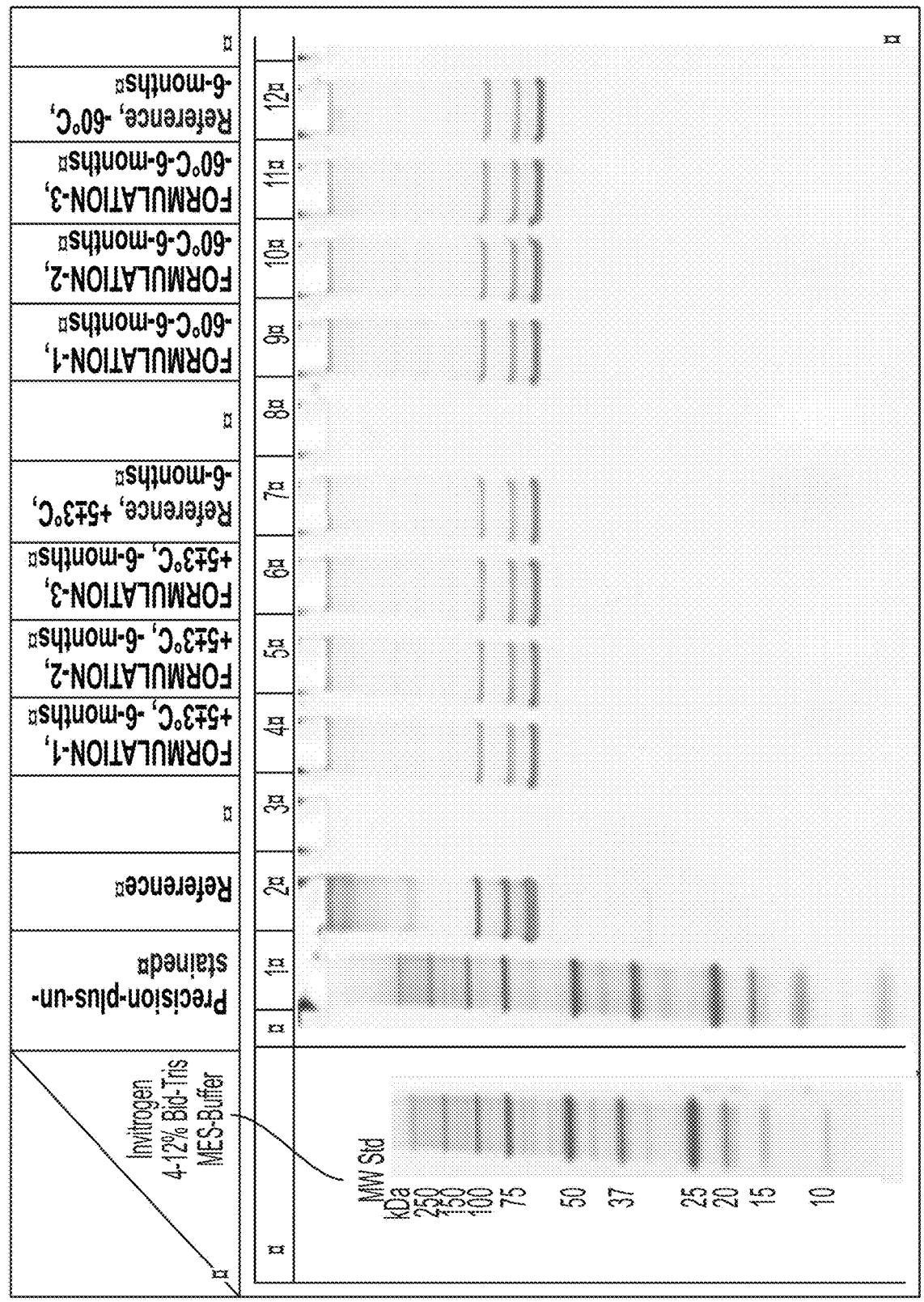
FIG. 28 is an SDS-PAGE silver staining of AAV9 particles at the 6 months' time point after storage at +5±3° C. (left) as well as at ≤−60° C. (right).
Figure 29:
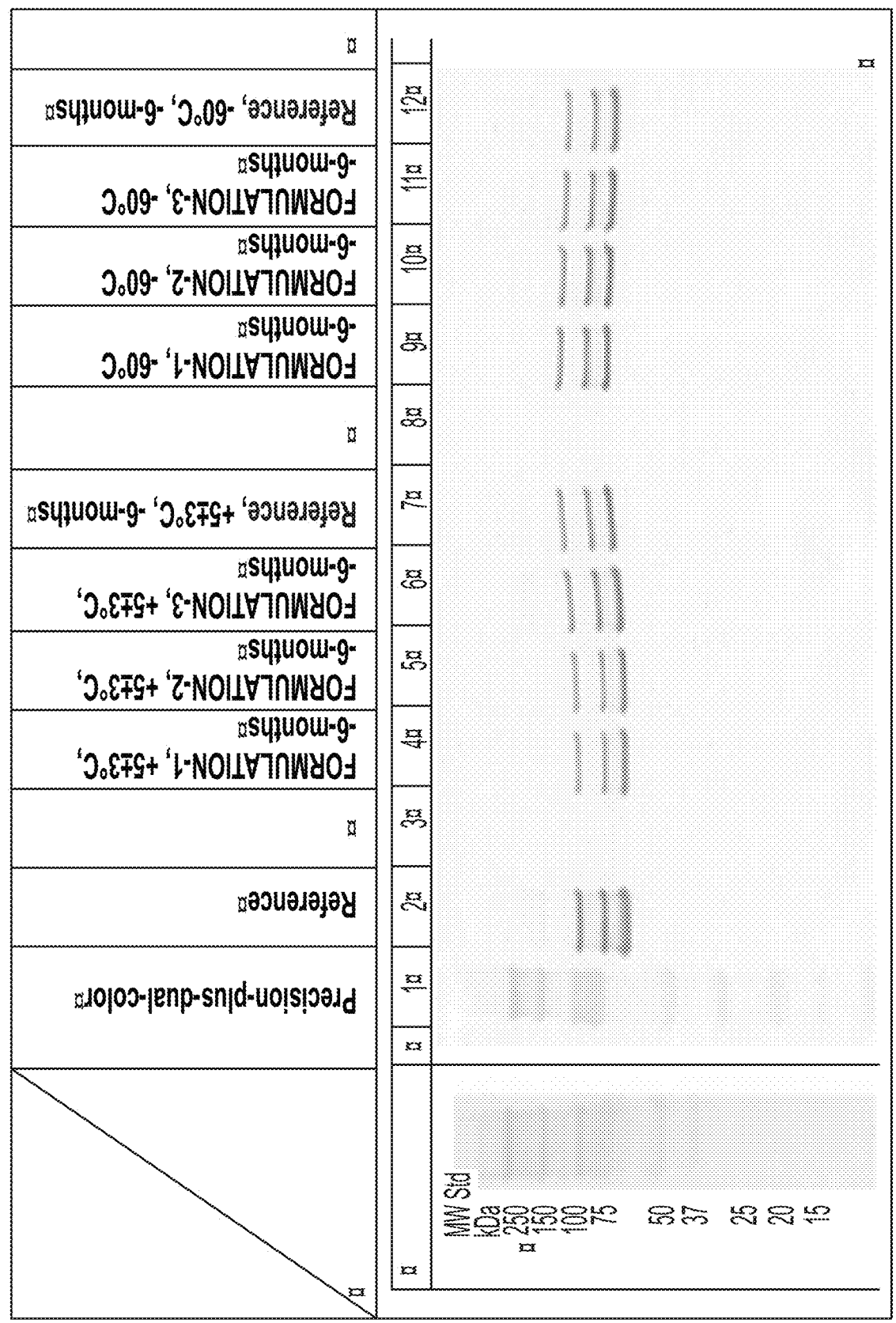
FIG. 29 is an SDS-PAGE western blot (anti-capsid) of AAV9 particles at the 6 months' time point after storage at +5±3° C. (left) as well as at ≤−60° C. (right).
Figure 30:
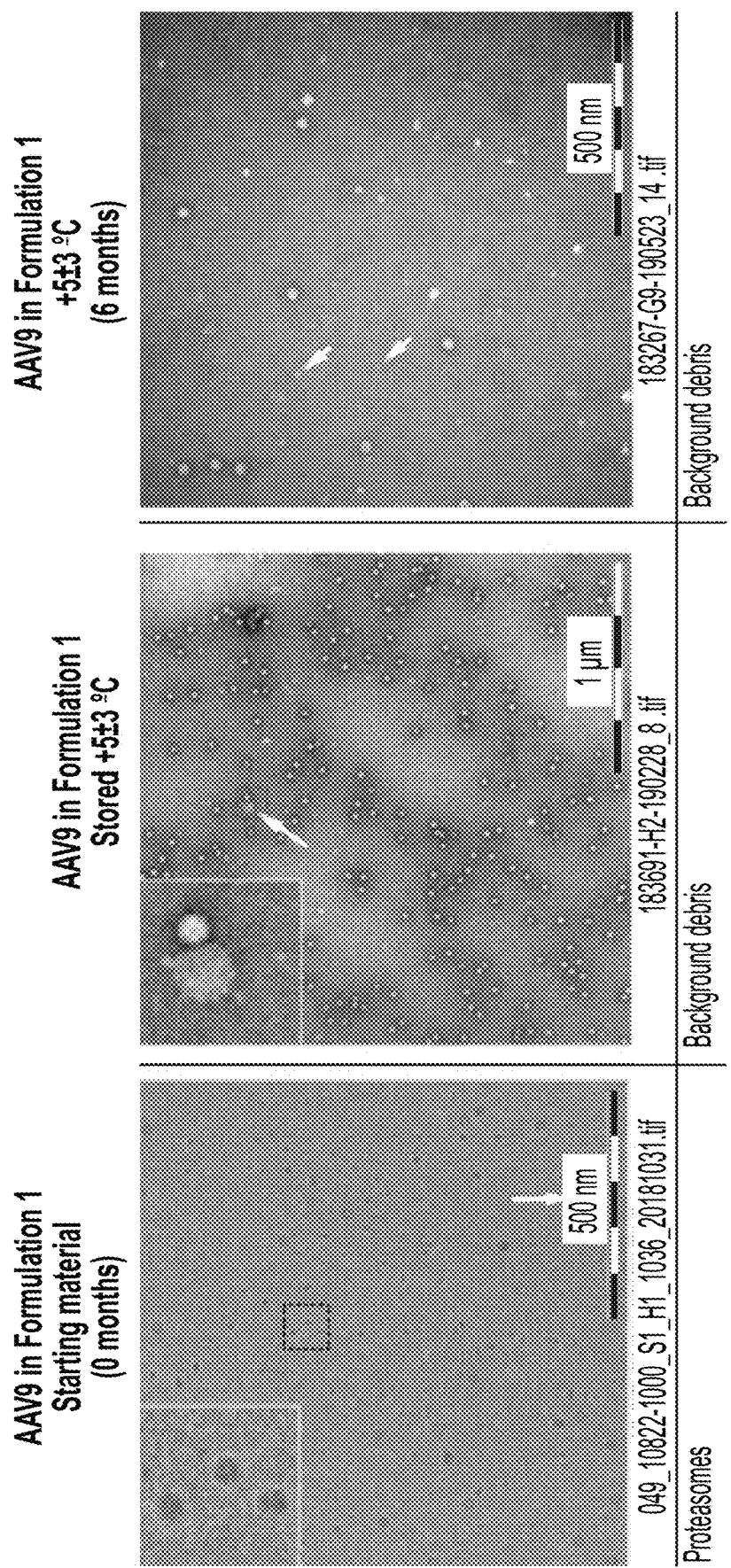
FIG. 30 is an nsTEM of AAV9 particles for Buffer Formulation 1 (0 months, 90 days and 6 months).
Figure 31:
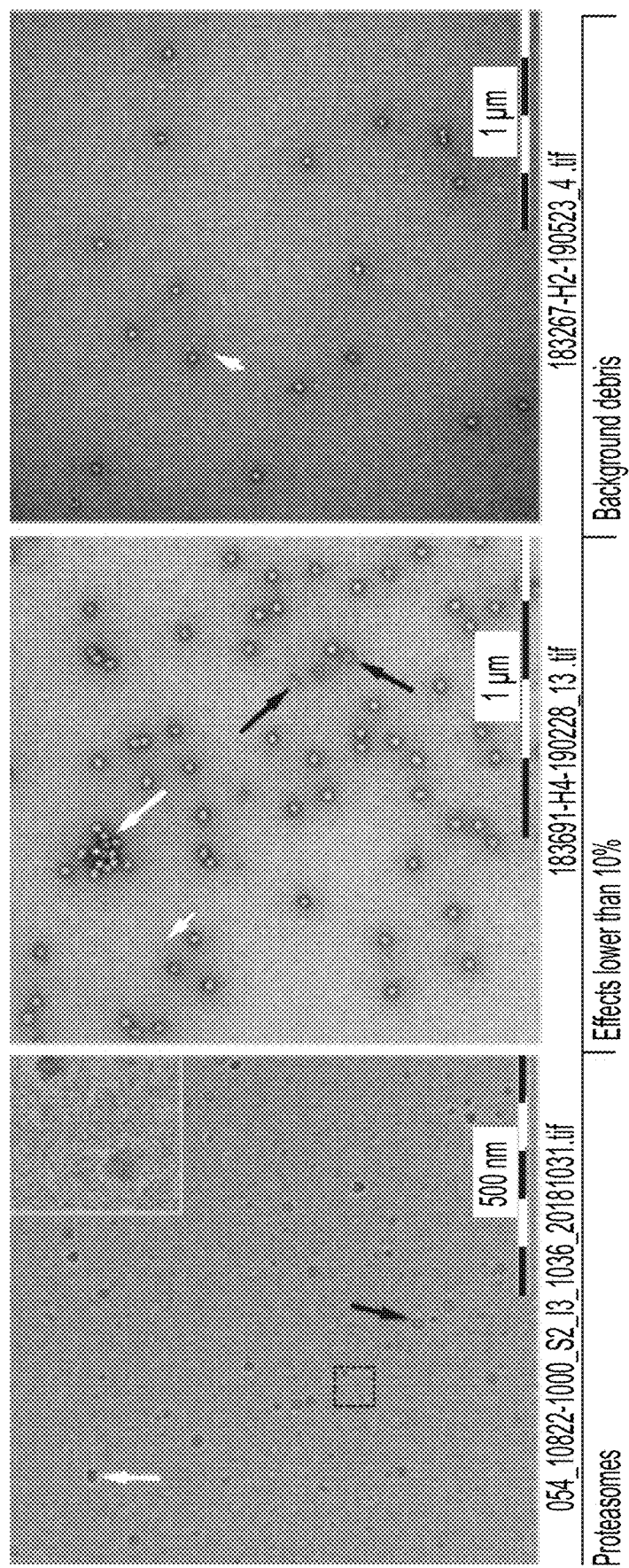
FIG. 31 is an nsTEM of AAV9 particles for Buffer Formulation 2 (0 months, 90 days and 6 months).
Figure 32:
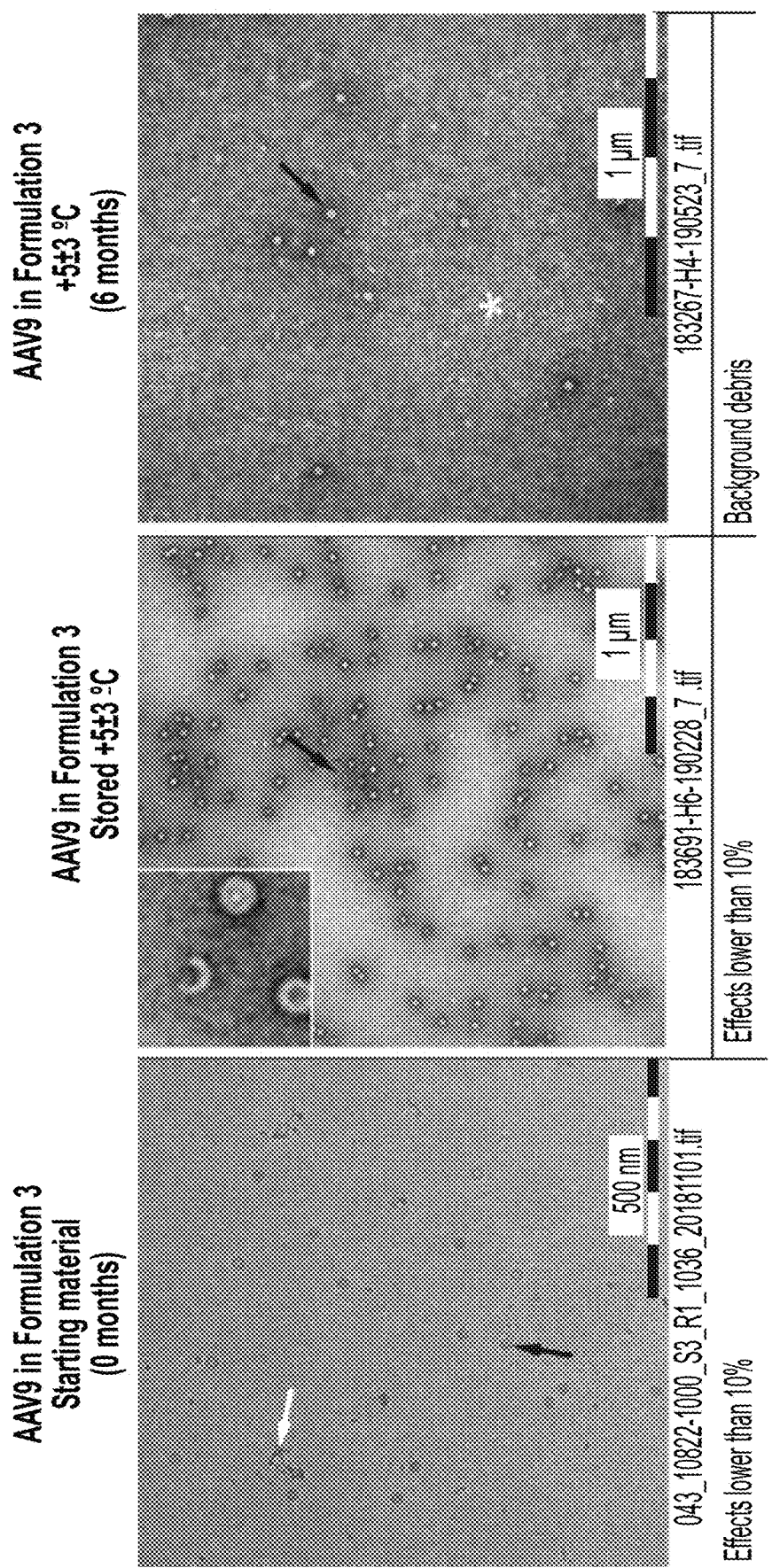
FIG. 32 is an nsTEM of AAV9 particles for Buffer Formulation 3 (0 months, 90 days and 6 months).
Figure 33:
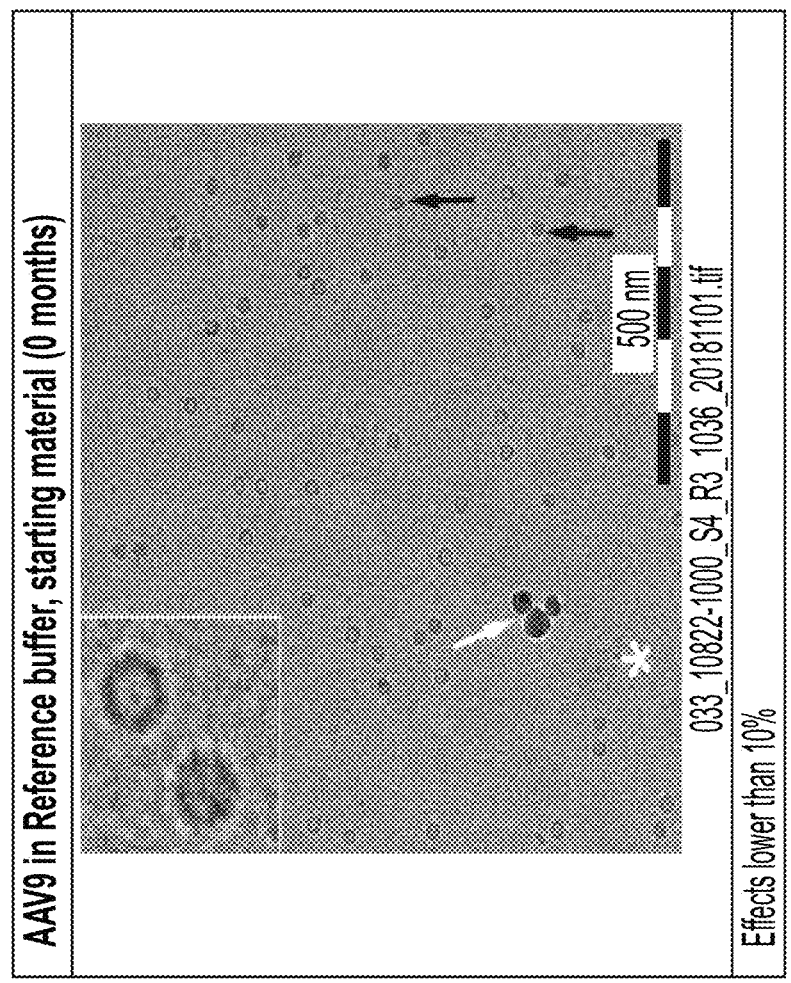
FIG. 33 is an nsTEM of AAV9 in Reference buffer at 0 months' time point.

Total RNA was isolated from snap-frozen striatum tissue (AllPrep kit, Qiagen). The RNA concentration was measured (Nanodrop, Thermo Fisher) and all samples were diluted to 100 ng/μl. First-strand cDNA was synthesized with 1 μg RNA input (High Capacity RNA-to-cDNA, Thermo Fisher). A custom-designed human HTT assay (0.5 μM forward primer GCCCGGCTGTGGCTGA, 0.5 μM reverse primer TTCACACGGTCTTTCTTGGTGG, 0.25 μM probe TGCACCGACCAAAGAAGGAACTCT) and a commercial murine Actb assay (Mm.PT.39a.22214843.g, IDT) were used for the RT-PCR. RT-PCR was performed on a QuantStudio 7 (Thermo Fisher) using a standard cycle, and data were analyzed with the delta Ct method according to PMID 11846609. Briefly, the average of three technical replicates was used and the HTT Ct values were normalized by the Actb Ct values to calculate the dCt. dCt values were subsequently normalized to the average dCt of the null vector group to calculate the ddCt, so that the average ddCt of the null vector group will be 0. Fold change was calculated as $2^{-ddCt}$. (Table 21 and FIG. 20).

TABLE 21

In Vivo Biopotency (relative mHTT expression)

| Dosage | Formulation 1 | Average | SD |
|---|---|---|---|
| $4.13 \times 10^{11}$ vg/mouse | HD4, ≤−60° C., 4 weeks | 0.351 | 0.329 |
| $4.13 \times 10^{9}$ vg/mouse | HD4, +5 ± 3° C./≤−60° C., 8 weeks | 0.753 | 0.149 |
| $3.00 \times 10^{10}$ vg/mouse | HD4, ≤−60° C., 8 weeks | 0.598 | 0.679 |

| Dosage | Formulation 2 | Average | SD |
|---|---|---|---|
| $4.13 \times 10^{11}$ vg/mouse | HD9, ≤−60° C., 4 weeks | 0.311 | 0.091 |
| $4.13 \times 10^{9}$ vg/mouse | HD9, +5 ± 3° C./≤−60° C., 8 weeks | 0.879 | 0.245 |
| $3.00 \times 10^{10}$ vg/mouse | HD9, ≤−60° C., 8 weeks | 0.297 | 0.160 |

| Dosage | Formulation 3 | Average | SD |
|---|---|---|---|
| $4.13 \times 10^{11}$ vg/mouse | HD16, ≤−60° C., 4 weeks | 0.428 | 0.214 |
| $4.13 \times 10^{9}$ vg/mouse | HD16, +5 ± 3° C./≤−60° C., 8 weeks | 0.556 | 0.402 |
| $3.00 \times 10^{10}$ vg/mouse | HD16, ≤−60° C., 8 weeks | 0.298 | 0.117 |

| Dosage | Reference | Average | SD |
|---|---|---|---|
| $4.13 \times 10^{11}$ vg/mouse | Reference, ≤−60° C., 4 weeks | 0.497 | 0.405 |
| $4.13 \times 10^{9}$ vg/mouse | Reference, +5 ± 3° C./≤−60° C., 8 weeks | 0.614 | 0.525 |
| $3.00 \times 10^{10}$ vg/mouse | Reference, ≤−60° C., 8 weeks | 0.113 | 0.025 |

Aggregates

Aggregates were analyzed as described in Example 2.

The Reference buffer showed the lowest amount of aggregates (0.5% to 0.8%) while Buffer Formulations 1-3 developed aggregates in the range of 0.9% to 1.4%. Nevertheless, no increase in aggregates were detected during storage at +5±3° C. and ≤−60° C. for up to 6 months.

TABLE 22

SEC, Aggregates (%)

| | 0 months [%] | 4 weeks [%] | 8 weeks [%] | 3 months [%] | 6 months [%] |
|---|---|---|---|---|---|
| storage at +5 ± 3° C. | | | | | |
| Formulation 1 | 1.1 | 0.9 | 1.0 | 1.0 | 1.0 |
| Formulation 2 | 1.1 | 1.0 | 1.0 | 1.0 | 1.0 |
| Formulation 3 | 1.1 | 1.0 | 1.1 | 1.1 | 1.1 |
| Reference | 0.7 | 0.5 | 0.7 | 0.6 | 0.7 |
| storage at ≤−60° C. | | | | | |
| Formulation 1 | 1.1 | 1.0 | 1.0 | 0.8 | 1.0 |
| Formulation 2 | 1.1 | 1.0 | 1.1 | 1.0 | 1.1 |
| Formulation 3 | 1.1 | 1.0 | 1.4 | 1.0 | 1.1 |
| Reference | 0.7 | 0.5 | 0.8 | 0.7 | 0.6 |

The percentage of full capsids, tested at the beginning of this study, showed ranges within 53% and 62%.

pH

There were no changes of pH values for each buffer formulation and for both storage temperatures.

TABLE 23 pH Values

| | 0 months | 4 weeks | 8 weeks | 3 months | 6 months |
|---|---|---|---|---|---|
| storage at +5 ± 3° C. | | | | | |
| Formulation 1 | 7.01 | 6.87 | 6.96 | 6.92 | 7.00 |
| Formulation 2 | 6.98 | 6.88 | 6.99 | 6.95 | 7.01 |
| Formulation 3 | 6.92 | 6.85 | 6.92 | 6.96 | 6.97 |
| Reference | 7.06 | 7.03 | 7.09 | 7.06 | 7.15 |
| storage at ≤−60° C. | | | | | |
| Formulation 1 | 7.01 | 6.88 | 6.96 | 6.99 | 6.99 |
| Formulation 2 | 6.98 | 6.86 | 7.00 | 7.00 | 7.01 |
| Formulation 3 | 6.92 | 6.83 | 6.93 | 6.95 | 6.97 |
| Reference | 7.06 | 7.04 | 7.10 | 7.13 | 7.15 |

Appearance

Complies means: clear, colorless solution without visible particles.

No particles or color changes were found in the different buffer formulations and at the different temperatures.

TABLE 24

Appearance (TSFF/FD lab)

| | 0 months | 4 weeks | 8 weeks | 3 months | 6 months |
|---|---|---|---|---|---|
| storage at +5 ± 3° C. | | | | | |
| Formulation 1 | complies | complies | complies | complies | complies |
| Formulation 2 | complies | complies | complies | complies | complies |
| Formulation 3 | complies | complies | complies | complies | complies |
| Reference | complies | complies | complies | complies | complies |

TABLE 24-continued

| Appearance (TSFF/FD lab) | | | | | |
|---|---|---|---|---|---|
| | 0 months | 4 weeks | 8 weeks | 3 months | 6 months |
| storage at ≤−60° C. | | | | | |
| Formulation 1 | complies | complies | complies | complies | complies |
| Formulation 2 | complies | complies | complies | complies | complies |
| Formulation 3 | complies | complies | complies | complies | complies |
| Reference | complies | complies | complies | complies | complies |

SDS-PAGE, Western-Blot, and Silver Staining

SDS-PAGE studies were performed as outline in Example 2.

The SDS PAGE, western blot anti-capsid as well as the silver stained gels did not show any degradation bands during the same time frame (FIG. 21-29). All AAV9 serotypes in the different buffer formulations stored at either +5±3° C. or ≤−60° C. can be seen as stable for at least 6 months.

Endotoxins

The control of the endotoxins after 6 months storage at +5±3° C. gives the guarantee, that all results generated during this time period of 6 months were performed resulting in the same quality of the samples.

TABLE 25

| Endotoxins (LAL) (EU/ml)) | | |
|---|---|---|
| storage at +5 ± 3° C. | 0 months [EU/ml] | 6 months [EU/ml] |
| Formulation 1 | <0.500 | <0.500 |
| Formulation 2 | <0.500 | <0.500 |
| Formulation 3 | <0.500 | <0.500 |
| Reference | <0.500 | <0.500 |

Polysorbate 80

Polysorbate 80 with a target concentration of 0.003% (target 30 µg/m L) did not show any losses during the storage time of 6 months at +5±3° C. For AAV9 in Buffer Formulation 1 inconclusive results were obtained (around 100 µg/mL Polysorbate 80 instead of expected 30 µg/mL), while the accordant buffer showed a Polysorbate 80 content of 36.7 µg/mL). The results for storage at ≤−60° C. will be generated after 12 months, at the end of this study. The data demonstrates that there is no loss of Polysorbate 80 during storage.

TABLE 26

| Polysorbate 80 (µg/ml) | | |
|---|---|---|
| storage at +5 ± 3° C. | 0 months [µg/mL] | 6 months [µg/mL] |
| Formulation 1 | 101.4 | 94.1 |
| Formulation 2 | 35.9 | 33.8 |
| Formulation 3 | 28.5 | 25.9 |
| Reference | <20.0 | <20.0 |
| storage at ≤−60° C. | 0 months [µg/mL] | 6 months [µg/mL] |
| Formulation 1 | 101.4 | |
| Formulation 2 | 35.9 | |
| Formulation 3 | 28.5 | |
| Reference | <20.0 | |

Viscosity, Density, and Osmolality

The osmolality of cerebrospinal fluid is about 295. Admission of a substance with a higher or lower Osmolality can negatively influence the pressure in cells which are in contact with the solution.

TABLE 27

| Viscosity, Density and Osmolality | | | |
|---|---|---|---|
| Buffer name | Viscosity [mPa · s] | Density [g/cm$^2$] | Osmolality [mOsmol/kg] |
| Formulation 1 | 1.028 | 1.006 | 305 |
| Formulation 2 | 1.047 | 1.007 | 347 |
| Formulation 3 | 1.049 | 1.005 | 320 |
| Reference | 1.028 | 1.001 | 288 | nsTEM (Morphology) and CryoTEM (Percent Full Capsids)

CryoTEM also known as transmission electron cryomicroscopy is a type of transmission electron microscopy (TEM) where the sample is investigated at cryogenic temperatures (e.g. liquid-nitrogen temperatures). The samples are not stained or fixed so that they are shown in their native environment without any foreign influence. With this method the determination of macromolecular structures at near-atomic resolution is possible.

TABLE 28

| CryoTEM (percent full capsids) | |
|---|---|
| Buffer name | 0 months [% full capsids] |
| Formulation 1 | 53 |
| Formulation 2 | 57 |
| Formulation 3 | 55 |
| Reference | 62 | nsTEM was conducted as described in Example 2. nsTEM is a method where negative stained cells are investigated by the transmission electron microscopy (TEM). Similar results were shown for each of the buffer formulations (FIG. 30-33).

Example 4

The stability of the AAV6 in Buffer Formulation 2 was studied. 2.6 g of AAV6 material was stored in 200 mM NaCl and 100 mM glycine. The pH value was adjusted with 1 M TRIS (pH 8.5) to 7.58. 0.003% of Polysorbate 80 were added before shipment. Finally, the sample was dialyzed against the Buffer Formulation 2 buffer. Buffer change was performed three times with the 100 fold volume of the sample and a minimum of 4 hours. After the buffer change, the material was diluted 1:1.915 and split into 3 parts. 2 of them were frozen at ≤−60° C. (set point −80° C.) for up to 2 months and one was aliquoted into sample size for analytics immediately, which was then repeated after 1 and 2 months.

TABLE 29

Parameters for AAV6 serotype stored at ≤−60° C. for up to 2 months

| storage at ≤−60° C. | starting material | 0 months (diluted) | 1 month (diluted) | 2 months (diluted) |
|---|---|---|---|---|
| ITR-qPCR | 8.21E+12 | 4.64E+12 | 4.40E+12 | 4.94E+12 |
| recovery [%] | 1:1.915 | 100 | 95 | 106 |
| AAV ELISA | 2.90E+12 | 2.34E+12 | 2.00E+12 | 1.95E+12 |
| recovery [%] | 1:1.915 | 100 | 85 | 84 |
| Aggregates [%] | 0.1 | 0.1 | 0.1 | 0.1 |
| SDS PAGE/Purity | complies | complies | complies | complies/100% |
| Appearance | | complies | complies | complies |
| pH value | 7.58 | n.a. | n.a. | 7.03 |

Figure 34:
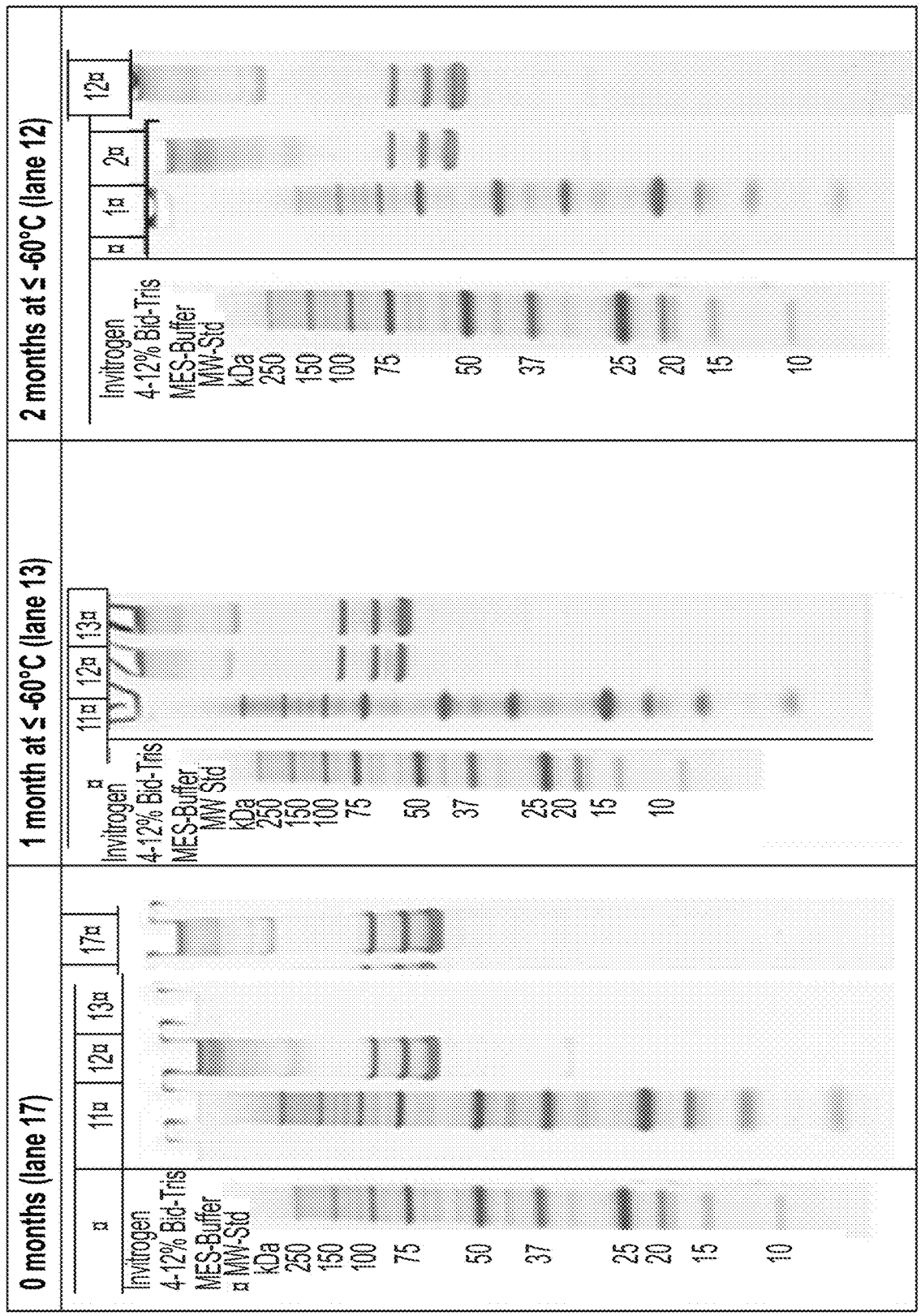
FIG. 34 is an SDS-PAGE silver staining of AAV6 particles (0, 1, and 2 months).
Figure 35:
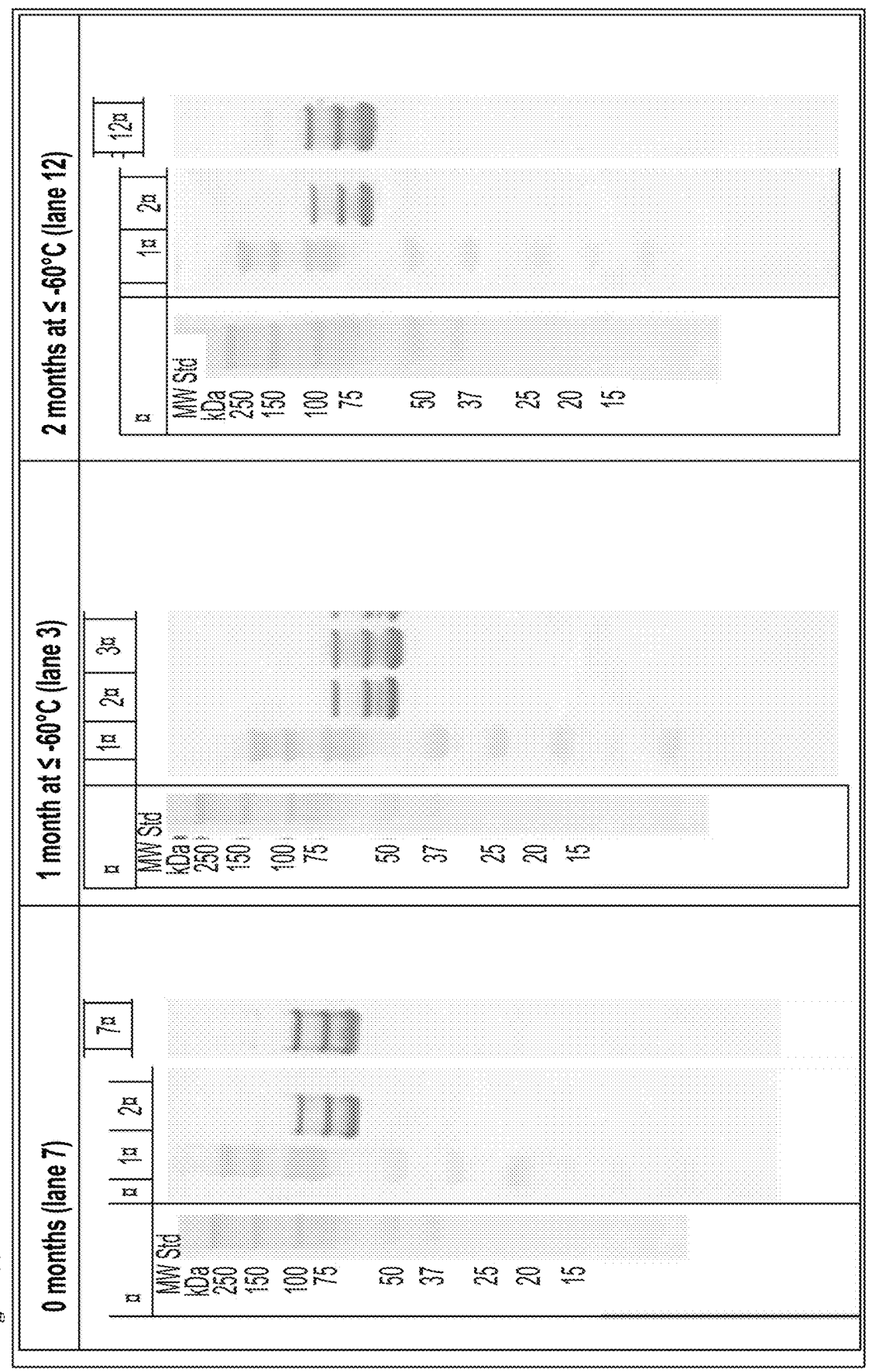
FIG. 35 is an SDS-PAGE western blot (anti-capsid) of AAV6 particles (0, 1, and 2 months).

FIGS. 34 and 35 present silver staining and wester blots of the AAV particles following storage.

Example 5

This example demonstrates additional buffer formulations for manufacture. These buffer formulations could be of use in lyophilized and/or liquid AAV compositions.

TABLE 30

Buffer Formulation 7

| Excipient | MW [g/mol] | Concentration | g/kg buffer |
|---|---|---|---|
| L-histidine | 155.2 | 10 mM | 1.55 |
| Sucrose | 342.3 | 5 mM | 1.71 |
| Croda super refined Tween 80 | n.a. | 0.003% (w/w) | 0.03 |
| Purified water | | add to 1 kg | |
| pH value | | target: 7.0 ± 0.1 | |

TABLE 31

Buffer Formulation 8

| Excipient | MW [g/mol] | Concentration | g/kg buffer |
|---|---|---|---|
| L-histidine | 155.2 | 10 mM | 1.55 |
| NaCl | 58.44 | 30 mM | 1.75 |
| Sucrose | 342.3 | 5 mM | 1.71 |
| Croda super refined Tween 80 | n.a. | 0.003% (w/w) | 0.03 |
| Purified water | | add to 1 kg | |
| pH value | | target: 7.0 ± 0.1 | |

TABLE 32

Buffer Formulation 9

| Excipient | MW [g/mol] | Concentration | g/kg buffer |
|---|---|---|---|
| L-histidine | 155.2 | 10 mM | 1.55 |
| NaCl | 58.44 | 60 mM | 3.51 |
| Sucrose | 342.3 | 5 mM | 1.71 |
| Croda super refined Tween 80 | n.a. | 0.003% (w/w) | 0.03 |
| Purified water | | add to 1 kg | |
| pH value | | target: 7.0 ± 0.1 | |

TABLE 33

Buffer Formulation 10

| Excipient | MW [g/mol] | Concentration | g/kg buffer |
|---|---|---|---|
| L-histidine | 155.2 | 10 mM | 1.55 |
| NaCl | 58.44 | 80 mM | 4.68 |
| Sucrose | 342.3 | 5 mM | 1.71 |
| Croda super refined Tween 80 | n.a. | 0.003% (w/w) | 0.03 |
| Purified water | | add to 1 kg | |
| pH value | | target: 7.0 ± 0.1 | |

TABLE 34

Buffer Formulation 11

| Excipient | MW [g/mol] | Concentration | g/kg buffer |
|---|---|---|---|
| L-histidine | 155.2 | 10 mM | 1.55 |
| NaCl | 58.44 | 100 mM | 5.84 |
| Sucrose | 342.3 | 5 mM | 1.71 |
| Croda super refined Tween 80 | n.a. | 0.003% (w/w) | 0.03 |
| Purified water | | add to 1 kg | |
| pH value | | target: 7.0 ± 0.1 | |

TABLE 35

Buffer Formulation 12

| Excipient | MW [g/mol] | Concentration | g/kg buffer |
|---|---|---|---|
| L-histidine | 155.2 | 10 mM | 1.55 |
| NaCl | 58.44 | 120 mM | 7.01 |
| Sucrose | 342.3 | 5 mM | 1.71 |
| Croda super refined Tween 80 | n.a. | 0.003% (w/w) | 0.03 |
| Purified water | | add to 1 kg | |
| pH value | | target: 7.0 ± 0.1 | |

TABLE 36

Buffer Formulation 13

| Excipient | MW [g/mol] | Concentration | g/kg buffer |
|---|---|---|---|
| L-histidine | 155.2 | 10 mM | 1.55 |
| NaCl | 58.44 | 150 mM | 8.77 |
| Sucrose | 342.3 | 5 mM | 1.71 |
| Croda super refined Tween 80 | n.a. | 0.003% (w/w) | 0.03 |
| Purified water | | add to 1 kg | |
| pH value | | target: 7.0 ± 0.1 | |

TABLE 37

Buffer Formulation 14

| Excipient | MW [g/mol] | Concentration | g/kg buffer |
|---|---|---|---|
| L-histidine | 155.2 | 10 mM | 1.55 |
| NaCl | 58.44 | 180 mM | 10.52 |
| Sucrose | 342.3 | 5 mM | 1.71 |
| Croda super refined Tween 80 | n.a. | 0.003% (w/w) | 0.03 |
| Purified water | | add to 1 kg | |
| pH value | | target: 7.0 ± 0.1 | |

TABLE 38

| Buffer Formulation 15 | | | |
|---|---|---|---|
| Excipient | MW [g/mol] | Concentration | g/kg buffer |
| L-histidine | 155.2 | 10 mM | 1.55 |
| NaCl | 58.44 | 200 mM | 11.69 |
| Sucrose | 342.3 | 5 mM | 1.71 |
| Croda super refined Tween 80 | n.a. | 0.003% (w/w) | 0.03 |
| Purified water | | add to 1 kg | |
| pH value | | target: 7.0 ± 0.1 | |

TABLE 39

| Buffer Formulation 16 | | | |
|---|---|---|---|
| Excipient | MW [g/mol] | Concentration | g/kg buffer |
| L-histidine | 155.2 | 10 mM | 1.55 |
| NaCl | 58.44 | 225 mM | 13.15 |
| Sucrose | 342.3 | 5 mM | 1.71 |
| Croda super refined Tween 80 | n.a. | 0.003% (w/w) | 0.03 |
| Purified water | | add to 1 kg | |
| pH value | | target: 7.0 ± 0.1 | |

TABLE 40

| Buffer Formulation 17 | | | |
|---|---|---|---|
| Excipient | MW [g/mol] | Concentration | g/kg buffer |
| L-histidine | 155.2 | 10 mM | 1.55 |
| NaCl | 58.44 | 250 mM | 14.61 |
| Sucrose | 342.3 | 5 mM | 1.71 |
| Croda super refined Tween 80 | n.a. | 0.003% (w/w) | 0.03 |
| Purified water | | add to 1 kg | |
| pH value | | target: 7.0 ± 0.1 | |

TABLE 41

| Buffer Formulation 18 | | | |
|---|---|---|---|
| Excipient | MW [g/mol] | Concentration | g/kg buffer |
| L-histidine | 155.2 | 50 mM | 7.76 |
| Croda super refined Tween 80 | n.a. | 0.003% (w/w) | 0.03 |
| Purified water | | add to 1 kg | |
| pH value | | target: 7.0 ± 0.1 | |

TABLE 42

| Buffer Formulation 19 | | | |
|---|---|---|---|
| Excipient | MW [g/mol] | Concentration | g/kg buffer |
| L-histidine | 155.2 | 50 mM | 7.76 |
| NaCl | 58.44 | 30 mM | 1.75 |
| Croda super refined Tween 80 | n.a. | 0.003% (w/w) | 0.03 |
| Purified water | | add to 1 kg | |
| pH value | | target: 7.0 ± 0.1 | |

TABLE 43

| Buffer Formulation 20 | | | |
|---|---|---|---|
| Excipient | MW [g/mol] | Concentration | g/kg buffer |
| L-histidine | 155.2 | 50 mM | 7.76 |
| NaCl | 58.44 | 60 mM | 3.51 |
| Croda super refined Tween 80 | n.a. | 0.003% (w/w) | 0.03 |
| Purified water | | add to 1 kg | |
| pH value | | target: 7.0 ± 0.1 | |

TABLE 44

| Buffer Formulation 21 | | | |
|---|---|---|---|
| Excipient | MW [g/mol] | Concentration | g/kg buffer |
| L-histidine | 155.2 | 50 mM | 7.76 |
| NaCl | 58.44 | 80 mM | 4.68 |
| Croda super refined Tween 80 | n.a. | 0.003% (w/w) | 0.03 |
| Purified water | | add to 1 kg | |
| pH value | | target: 7.0 ± 0.1 | |

TABLE 45

| Buffer Formulation 22 | | | |
|---|---|---|---|
| Excipient | MW [g/mol] | Concentration | g/kg buffer |
| L-histidine | 155.2 | 50 mM | 7.76 |
| NaCl | 58.44 | 100 mM | 5.84 |
| Croda super refined Tween 80 | n.a. | 0.003% (w/w) | 0.03 |
| Purified water | | add to 1 kg | |
| pH value | | target: 7.0 ± 0.1 | |

TABLE 46

| Buffer Formulation 23 | | | |
|---|---|---|---|
| Excipient | MW [g/mol] | Concentration | g/kg buffer |
| L-histidine | 155.2 | 50 mM | 7.76 |
| NaCl | 58.44 | 120 mM | 7.01 |
| Croda super refined Tween 80 | n.a. | 0.003% (w/w) | 0.03 |
| Purified water | | add to 1 kg | |
| pH value | | target: 7.0 ± 0.1 | |

TABLE 47

| Buffer Formulation 24 | | | |
|---|---|---|---|
| Excipient | MW [g/mol] | Concentration | g/kg buffer |
| L-histidine | 155.2 | 50 mM | 7.76 |
| NaCl | 58.44 | 150 mM | 8.77 |
| Croda super refined Tween 80 | n.a. | 0.003% (w/w) | 0.03 |
| Purified water | | add to 1 kg | |
| pH value | | target: 7.0 ± 0.1 | |

TABLE 48

Buffer Formulation 25

| Excipient | MW [g/mol] | Concentration | g/kg buffer |
|---|---|---|---|
| L-histidine | 155.2 | 50 mM | 7.76 |
| NaCl | 58.44 | 180 mM | 10.52 |
| Croda super refined Tween 80 | n.a. | 0.003% (w/w) | 0.03 |
| Purified water | | add to 1 kg | |
| pH value | | target: 7.0 ± 0.1 | |

TABLE 49

Buffer Formulation 26

| Excipient | MW [g/mol] | Concentration | g/kg buffer |
|---|---|---|---|
| L-histidine | 155.2 | 50 mM | 7.76 |
| NaCl | 58.44 | 200 mM | 11.69 |
| Croda super refined Tween 80 | n.a. | 0.003% (w/w) | 0.03 |
| Purified water | | add to 1 kg | |
| pH value | | target: 7.0 ± 0.1 | |

TABLE 50

Buffer Formulation 27

| Excipient | MW [g/mol] | Concentration | g/kg buffer |
|---|---|---|---|
| L-histidine | 155.2 | 50 mM | 7.76 |
| NaCl | 58.44 | 225 mM | 13.15 |
| Croda super refined Tween 80 | n.a. | 0.003% (w/w) | 0.03 |
| Purified water | | add to 1 kg | |
| pH value | | target: 7.0 ± 0.1 | |

TABLE 51

Buffer Formulation 28

| Excipient | MW [g/mol] | Concentration | g/kg buffer |
|---|---|---|---|
| L-histidine | 155.2 | 50 mM | 7.76 |
| NaCl | 58.44 | 250 mM | 14.61 |
| Croda super refined Tween 80 | n.a. | 0.003% (w/w) | 0.03 |
| Purified water | | add to 1 kg | |
| pH value | | target: 7.0 ± 0.1 | |

TABLE 52

Buffer Formulation 29

| Excipient | MW [g/mol] | Concentration | g/kg buffer |
|---|---|---|---|
| Na Citrate | 258.07 | 10 mM | 2.58 |
| Croda super refined Tween 80 | n.a. | 0.003% (w/w) | 0.03 |
| Purified water | | add to 1 kg | |
| pH value | | target: 7.0 ± 0.1 | |

TABLE 53

Buffer Formulation 30

| Excipient | MW [g/mol] | Concentration | g/kg buffer |
|---|---|---|---|
| Na Citrate | 258.07 | 10 mM | 2.58 |
| NaCl | 58.44 | 30 mM | 1.75 |
| Croda super refined Tween 80 | n.a. | 0.003% (w/w) | 0.03 |
| Purified water | | add to 1 kg | |
| pH value | | target: 7.0 ± 0.1 | |

TABLE 54

Buffer Formulation 31

| Excipient | MW [g/mol] | Concentration | g/kg buffer |
|---|---|---|---|
| Na Citrate | 258.07 | 10 mM | 2.58 |
| NaCl | 58.44 | 60 mM | 3.51 |
| Croda super refined Tween 80 | n.a. | 0.003% (w/w) | 0.03 |
| Purified water | | add to 1 kg | |
| pH value | | target: 7.0 ± 0.1 | |

TABLE 55

Buffer Formulation 32

| Excipient | MW [g/mol] | Concentration | g/kg buffer |
|---|---|---|---|
| Na Citrate | 258.07 | 10 mM | 2.58 |
| NaCl | 58.44 | 80 mM | 4.68 |
| Croda super refined Tween 80 | n.a. | 0.003% (w/w) | 0.03 |
| Purified water | | add to 1 kg | |
| pH value | | target: 7.0 ± 0.1 | |

TABLE 56

Buffer Formulation 33

| Excipient | MW [g/mol] | Concentration | g/kg buffer |
|---|---|---|---|
| Na Citrate | 258.07 | 10 mM | 2.58 |
| NaCl | 58.44 | 100 mM | 5.84 |
| Croda super refined Tween 80 | n.a. | 0.003% (w/w) | 0.03 |
| Purified water | | add to 1 kg | |
| pH value | | target: 7.0 ± 0.1 | |

TABLE 57

Buffer Formulation 34

| Excipient | MW [g/mol] | Concentration | g/kg buffer |
|---|---|---|---|
| Na Citrate | 258.07 | 10 mM | 2.58 |
| NaCl | 58.44 | 120 mM | 7.01 |
| Croda super refined Tween 80 | n.a. | 0.003% (w/w) | 0.03 |
| Purified water | | add to 1 kg | |
| pH value | | target: 7.0 ± 0.1 | |

TABLE 58

| Buffer Formulation 35 | | | |
|---|---|---|---|
| Excipient | MW [g/mol] | Concentration | g/kg buffer |
| Na Citrate | 258.07 | 10 mM | 2.58 |
| NaCl | 58.44 | 154 mM | 9 |
| Croda super refined Tween 80 | n.a. | 0.003% (w/w) | 0.03 |
| Purified water | | add to 1 kg | |
| pH value | | target: 7.0 ± 0.1 | |

TABLE 59

| Buffer Formulation 36 | | | |
|---|---|---|---|
| Excipient | MW [g/mol] | Concentration | g/kg buffer |
| Na Citrate | 258.07 | 10 mM | 2.58 |
| NaCl | 58.44 | 180 mM | 10.52 |
| Croda super refined Tween 80 | n.a. | 0.003% (w/w) | 0.03 |
| Purified water | | add to 1 kg | |
| pH value | | target: 7.0 ± 0.1 | |

TABLE 60

| Buffer Formulation 37 | | | |
|---|---|---|---|
| Excipient | MW [g/mol] | Concentration | g/kg buffer |
| Na Citrate | 258.07 | 10 mM | 2.58 |
| NaCl | 58.44 | 200 mM | 11.69 |
| Croda super refined Tween 80 | n.a. | 0.003% (w/w) | 0.03 |
| Purified water | | add to 1 kg | |
| pH value | | target: 7.0 ± 0.1 | |

TABLE 61

| Buffer Formulation 38 | | | |
|---|---|---|---|
| Excipient | MW [g/mol] | Concentration | g/kg buffer |
| Na Citrate | 258.07 | 10 mM | 2.58 |
| NaCl | 58.44 | 225 mM | 13.15 |
| Croda super refined Tween 80 | n.a. | 0.003% (w/w) | 0.03 |
| Purified water | | add to 1 kg | |
| pH value | | target: 7.0 ± 0.1 | |

TABLE 62

| Buffer Formulation 39 | | | |
|---|---|---|---|
| Excipient | MW [g/mol] | Concentration | g/kg buffer |
| Na Citrate | 258.07 | 10 mM | 2.58 |
| NaCl | 58.44 | 250 mM | 14.61 |
| Croda super refined Tween 80 | n.a. | 0.003% (w/w) | 0.03 |
| Purified water | | add to 1 kg | |
| pH value | | target: 7.0 ± 0.1 | |

TABLE 63

| Buffer Formulation 40 | | | |
|---|---|---|---|
| Excipient | MW [g/mol] | Concentration | g/kg buffer |
| NaHCO$_3$ | 84.007 | 20 mM | 1.68 |
| Croda super refined Tween 80 | n.a. | 0.003% (w/w) | 0.03 |
| Purified water | | add to 1 kg | |
| pH value | | target: 7.0 ± 0.1 | |

TABLE 64

| Buffer Formulation 41 | | | |
|---|---|---|---|
| Excipient | MW [g/mol] | Concentration | g/kg buffer |
| NaHCO$_3$ | 84.007 | 20 mM | 1.68 |
| NaCl | 58.44 | 30 mM | 1.75 |
| Croda super refined Tween 80 | n.a. | 0.003% (w/w) | 0.03 |
| Purified water | | add to 1 kg | |
| pH value | | target: 7.0 ± 0.1 | |

TABLE 65

| Buffer Formulation 42 | | | |
|---|---|---|---|
| Excipient | MW [g/mol] | Concentration | g/kg buffer |
| NaHCO$_3$ | 84.007 | 20 mM | 1.68 |
| NaCl | 58.44 | 60 mM | 3.51 |
| Croda super refined Tween 80 | n.a. | 0.003% (w/w) | 0.03 |
| Purified water | | add to 1 kg | |
| pH value | | target: 7.0 ± 0.1 | |

TABLE 66

| Buffer Formulation 43 | | | |
|---|---|---|---|
| Excipient | MW [g/mol] | Concentration | g/kg buffer |
| NaHCO$_3$ | 84.007 | 20 mM | 1.68 |
| NaCl | 58.44 | 80 mM | 4.68 |
| Croda super refined Tween 80 | n.a. | 0.003% (w/w) | 0.03 |
| Purified water | | add to 1 kg | |
| pH value | | target: 7.0 ± 0.1 | |

TABLE 67

| Buffer Formulation 44 | | | |
|---|---|---|---|
| Excipient | MW [g/mol] | Concentration | g/kg buffer |
| NaHCO$_3$ | 84.007 | 20 mM | 1.68 |
| NaCl | 58.44 | 100 mM | 5.84 |
| Croda super refined Tween 80 | n.a. | 0.003% (w/w) | 0.03 |
| Purified water | | add to 1 kg | |
| pH value | | target: 7.0 ± 0.1 | |

TABLE 68

| Buffer Formulation 45 | | | |
|---|---|---|---|
| Excipient | MW [g/mol] | Concentration | g/kg buffer |
| NaHCO$_3$ | 84.007 | 20 mM | 1.68 |
| NaCl | 58.44 | 150 mM | 8.77 |
| Croda super refined Tween 80 | n.a. | 0.003% (w/w) | 0.03 |
| Purified water | | add to 1 kg | |
| pH value | | target 7.0 ± 0.1 | |

TABLE 69

| Buffer Formulation 46 | | | |
|---|---|---|---|
| Excipient | MW [g/mol] | Concentration | g/kg buffer |
| NaHCO$_3$ | 84.007 | 20 mM | 1.68 |
| NaCl | 58.44 | 154 mM | 9 |
| Croda super refined Tween 80 | n.a. | 0.003% (w/w) | 0.03 |
| Purified water | | add to 1 kg | |
| pH value | | target 7.0 ± 0.1 | |

TABLE 70

| Buffer Formulation 47 | | | |
|---|---|---|---|
| Excipient | MW [g/mol] | Concentration | g/kg buffer |
| NaHCO$_3$ | 84.007 | 20 mM | 1.68 |
| NaCl | 58.44 | 180 mM | 10.52 |
| Croda super refined Tween 80 | n.a. | 0.003% (w/w) | 0.03 |
| Purified water | | add to 1 kg | |
| pH value | | target 7.0 ± 0.1 | |

TABLE 71

| Buffer Formulation 48 | | | |
|---|---|---|---|
| Excipient | MW [g/mol] | Concentration | g/kg buffer |
| NaHCO$_3$ | 84.007 | 20 mM | 1.68 |
| NaCl | 58.44 | 200 mM | 11.69 |
| Croda super refined Tween 80 | n.a. | 0.003% (w/w) | 0.03 |
| Purified water | | add to 1 kg | |
| pH value | | target 7.0 ± 0.1 | |

TABLE 72

| Buffer Formulation 49 | | | |
|---|---|---|---|
| Excipient | MW [g/mol] | Concentration | g/kg buffer |
| NaHCO$_3$ | 84.007 | 20 mM | 1.68 |
| NaCl | 58.44 | 225 mM | 13.15 |
| Croda super refined Tween 80 | n.a. | 0.003% (w/w) | 0.03 |
| Purified water | | add to 1 kg | |
| pH value | | target 7.0 ± 0.1 | |

TABLE 73

| Buffer Formulation 50 | | | |
|---|---|---|---|
| Excipient | MW [g/mol] | Concentration | g/kg buffer |
| NaHCO$_3$ | 84.007 | 20 mM | 1.68 |
| NaCl | 58.44 | 250 mM | 14.61 |
| Croda super refined Tween 80 | n.a. | 0.003% (w/w) | 0.03 |
| Purified water | | add to 1 kg | |
| pH value | | target 7.0 ± 0.1 | |

TABLE 74

| Buffer Formulation 51 | | | |
|---|---|---|---|
| Excipient | MW [g/mol] | Concentration | g/kg buffer |
| L-histidine | 155.2 | 10 mM | 1.55 |
| Glucose | 180.16 | 5 mM | 0.9 |
| Croda super refined Tween 80 | n.a. | 0.003% (w/w) | 0.03 |
| Purified water | | add to 1 kg | |
| pH value | | target: 7.0 ± 0.1 | |

TABLE 75

| Buffer Formulation 52 | | | |
|---|---|---|---|
| Excipient | MW [g/mol] | Concentration | g/kg buffer |
| L-histidine | 155.2 | 10 mM | 1.55 |
| NaCl | 58.44 | 30 mM | 1.75 |
| Glucose | 180.16 | 5 mM | 0.9 |
| Croda super refined Tween 80 | n.a. | 0.003% (w/w) | 0.03 |
| Purified water | | add to 1 kg | |
| pH value | | target: 7.0 ± 0.1 | |

TABLE 76

| Buffer Formulation 53 | | | |
|---|---|---|---|
| Excipient | MW [g/mol] | Concentration | g/kg buffer |
| L-histidine | 155.2 | 10 mM | 1.55 |
| NaCl | 58.44 | 60 mM | 3.51 |
| Glucose | 180.16 | 5 mM | 0.9 |
| Croda super refined Tween 80 | n.a. | 0.003% (w/w) | 0.03 |
| Purified water | | add to 1 kg | |
| pH value | | target: 7.0 ± 0.1 | |

TABLE 77

| Buffer Formulation 54 | | | |
|---|---|---|---|
| Excipient | MW [g/mol] | Concentration | g/kg buffer |
| L-histidine | 155.2 | 10 mM | 1.55 |
| NaCl | 58.44 | 80 mM | 4.68 |
| Glucose | 180.16 | 5 mM | 0.9 |
| Croda super refined Tween 80 | n.a. | 0.003% (w/w) | 0.03 |
| Purified water | | add to 1 kg | |
| pH value | | target: 7.0 ± 0.1 | |

TABLE 78

Buffer Formulation 55

| Excipient | MW [g/mol] | Concentration | g/kg buffer |
|---|---|---|---|
| L-histidine | 155.2 | 10 mM | 1.55 |
| NaCl | 58.44 | 100 mM | 5.84 |
| Glucose | 180.16 | 5 mM | 0.9 |
| Croda super refined Tween 80 | n.a. | 0.003% (w/w) | 0.03 |
| Purified water | | add to 1 kg | |
| pH value | | target: 7.0 ± 0.1 | |

TABLE 79

Buffer Formulation 56

| Excipient | MW [g/mol] | Concentration | g/kg buffer |
|---|---|---|---|
| L-histidine | 155.2 | 10 mM | 1.55 |
| NaCl | 58.44 | 120 mM | 7.01 |
| Glucose | 180.16 | 5 mM | 0.9 |
| Croda super refined Tween 80 | n.a. | 0.003% (w/w) | 0.03 |
| Purified water | | add to 1 kg | |
| pH value | | target: 7.0 ± 0.1 | |

TABLE 80

Buffer Formulation 57

| Excipient | MW [g/mol] | Concentration | g/kg buffer |
|---|---|---|---|
| L-histidine | 155.2 | 10 mM | 1.55 |
| NaCl | 58.44 | 150 mM | 8.77 |
| Glucose | 180.16 | 5 mM | 0.9 |
| Croda super refined Tween 80 | n.a. | 0.003% (w/w) | 0.03 |
| Purified water | | add to 1 kg | |
| pH value | | target: 7.0 ± 0.1 | |

TABLE 81

Buffer Formulation 58

| Excipient | MW [g/mol] | Concentration | g/kg buffer |
|---|---|---|---|
| L-histidine | 155.2 | 10 mM | 1.55 |
| NaCl | 58.44 | 180 mM | 10.52 |
| Glucose | 180.16 | 5 mM | 0.9 |
| Croda super refined Tween 80 | n.a. | 0.003% (w/w) | 0.03 |
| Purified water | | add to 1 kg | |
| pH value | | target: 7.0 ± 0.1 | |

TABLE 82

Buffer Formulation 59

| Excipient | MW [g/mol] | Concentration | g/kg buffer |
|---|---|---|---|
| L-histidine | 155.2 | 10 mM | 1.55 |
| NaCl | 58.44 | 200 mM | 11.69 |
| Glucose | 180.16 | 5 mM | 0.9 |
| Croda super refined Tween 80 | n.a. | 0.003% (w/w) | 0.03 |
| Purified water | | add to 1 kg | |
| pH value | | target: 7.0 ± 0.1 | |

TABLE 83

Buffer Formulation 60

| Excipient | MW [g/mol] | Concentration | g/kg buffer |
|---|---|---|---|
| L-histidine | 155.2 | 10 mM | 1.55 |
| NaCl | 58.44 | 225 mM | 13.15 |
| Glucose | 180.16 | 5 mM | 0.9 |
| Croda super refined Tween 80 | n.a. | 0.003% (w/w) | 0.03 |
| Purified water | | add to 1 kg | |
| pH value | | target: 7.0 ± 0.1 | |

TABLE 84

Buffer Formulation 61

| Excipient | MW [g/mol] | Concentration | g/kg buffer |
|---|---|---|---|
| L-histidine | 155.2 | 10 mM | 1.55 |
| NaCl | 58.44 | 250 mM | 14.61 |
| Glucose | 180.16 | 5 mM | 0.9 |
| Croda super refined Tween 80 | n.a. | 0.003% (w/w) | 0.03 |
| Purified water | | add to 1 kg | |
| pH value | | target: 7.0 ± 0.1 | |

All references, including publications, patent applications, and patents, cited herein are hereby incorporated by reference to the same extent as if each reference were individually and specifically indicated to be incorporated by reference and were set forth in its entirety herein.

All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed:

1. A storage stable aqueous composition comprising an adeno-associated virus (AAV) vector and a buffer formulation consisting of:
   (a) about 30 mM to about 50 mM of L-histidine;
   (b) about 100 mM to about 160 mM of sodium chloride;
   (c) about 0.0001% (w/w) to about 0.01% (w/w) of polysorbate 80 (PS80); and
   (d) water,
wherein the composition does not comprise sugar, sugar alcohol, or a combination thereof,
wherein the composition has a pH of 6.9 to 7.4, and wherein the AAV vector has a titer that is stable when stored at a temperature range of about −60° C. to about 5° C. for at least 6 months.

2. The aqueous composition of claim 1, wherein the composition has a pH of about 7.0.

3. The aqueous composition of claim 1, wherein the PS80 is about 0.0005% to about 0.006% w/w.

4. The aqueous composition of claim 1, comprising the AAV vector and the buffer formulation consisting of: (a) about 50 mM of L-histidine, (b) about 154 mM of sodium chloride, (c) about 0.003% w/w of PS80, and (d) water.

5. The aqueous composition of claim 1, comprising: the AAV vector and the buffer formulation consisting of (a) about 30 mM of L-histidine; (b) about 154 mM of NaCl; (c) about 0.001% w/w to about 0.005% w/w of polysorbate 80 (PS80); and (d) water.

6. The aqueous composition of claim 1, wherein the AAV vector is an AAV1, AAV2, AAV3, AAV4, AAV5, AAV6, AAV7, AAV8, AAV9, or AAV10 vector.

7. The aqueous composition of claim 1, wherein the AAV vector is genetically and/or chemically modified.

8. A lyophilized storage stable composition, wherein the lyophilized storage stable composition is dehydrated composition of the aqueous composition of claim 1.

9. The aqueous composition of claim 1, wherein the composition has an osmolality of 200 to 320 mOsmol/kg.

10. The aqueous composition of claim 1, wherein the AAV vector has a titer that is stable when stored at a temperature range of about −20° C. to about 4° C. for at least 6 months.

* * * * *